United States Patent
Takahashi et al.

(10) Patent No.: US 8,750,631 B2
(45) Date of Patent: Jun. 10, 2014

(54) IMAGE PROCESSING DEVICE AND METHOD

(75) Inventors: Yoshitomo Takahashi, Kanagawa (JP); Takuya Kitamura, Tokyo (JP); Yoichi Yagasaki, Tokyo (JP); Teruhiko Suzuki, Kanagawa (JP); Jun Yonemitsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 417 days.

(21) Appl. No.: 13/131,896

(22) PCT Filed: Dec. 9, 2009

(86) PCT No.: PCT/JP2009/070578
§ 371 (c)(1),
(2), (4) Date: May 31, 2011

(87) PCT Pub. No.: WO2010/067810
PCT Pub. Date: Jun. 17, 2010

(65) Prior Publication Data
US 2011/0242105 A1    Oct. 6, 2011

(30) Foreign Application Priority Data
Dec. 9, 2008    (JP) ................... 2008 313133

(51) Int. Cl.
*G06K 9/36* (2006.01)
(52) U.S. Cl.
USPC ....................................... 382/232
(58) Field of Classification Search
CPC ......... G06T 7/00; G06T 7/0022; G06T 11/00; G06T 11/003; G06T 13/00; G06T 13/20; G06T 13/80; G06T 15/00; G06T 15/20; G06T 15/205; G06K 9/00; G06K 9/209; G06K 9/40; H04N 7/12; H04N 7/24; H04N 11/02; H04N 13/00; H04N 13/0003; H04N 13/007; H04N 13/0011; H04N 13/0014; H04N 13/0048; H04N 13/0051; H04N 13/0055; H04N 13/0059; H04N 7/361; H04N 7/366
See application file for complete search history.

(56) References Cited

U.S. PATENT DOCUMENTS 6,327,381 B1 * 12/2001 Rogina et al. ................. 382/154
8,111,758 B2 * 2/2012 Yun et al. ................. 375/240.28
(Continued)

FOREIGN PATENT DOCUMENTS

CN    1703915 A    11/2005
(Continued)

OTHER PUBLICATIONS

International Search Report issued Mar. 16, 2010 in PCT/JP09/70578 filed Dec. 9, 2009.
(Continued)

*Primary Examiner* — Jose Couso
(74) *Attorney, Agent, or Firm* — Oblon, Spivak, McClelland, Maier & Neustadt, L.L.P.

(57) ABSTRACT

The present invention relates to an image processing device and method whereby an image and so forth that a contents producer intends can be displayed in a case where a stereoscopic image content is displayed as a 2D image.
A generating unit 13 generates multiplexed data including viewpoint image data for the left eye, and viewpoint image data for the right eye that are two viewpoints of image data, and a view switching flag for specifying image data used for display of a 2D image, of the viewpoint image data for the left eye and the viewpoint image data for the right eye thereof. With decoding of multiplexed data, a view switching flag is extracted from the multiplexed data, and image data used for display of a 2D image is selected from viewpoint image data for the left eye and viewpoint image data for the right eye following the view switching flag thereof. The present invention may be applied to an encoding device or the like for encoding a stereoscopic vision image made up of a multiple-viewpoint image, for example.

20 Claims, 30 Drawing Sheets

(56) References Cited

U.S. PATENT DOCUMENTS

| | | | |
|---|---|---|---|
| 8,111,904 B2 * | 2/2012 | Wallack et al. | 382/152 |
| 8,139,150 B2 * | 3/2012 | Nakamura et al. | 348/409.1 |
| 2006/0126919 A1 | 6/2006 | Kitaura et al. | |
| 2007/0030264 A1 | 2/2007 | Song et al. | |
| 2008/0089428 A1 | 4/2008 | Nakamura et al. | |

FOREIGN PATENT DOCUMENTS

| | | |
|---|---|---|
| JP | 8 047001 | 2/1996 |
| JP | 2004-165710 | 6/2004 |
| JP | 2004 165710 | 6/2004 |
| JP | 2007-048293 | 2/2007 |
| JP | 2007 048293 | 2/2007 |
| JP | 2008 182669 | 8/2008 |
| JP | 08-047001 | 2/1996 |

OTHER PUBLICATIONS

Japanese Office Action issued Dec. 24, 2013 in Patent Application No. 2010-542113 (4 pgs.).

Chinese Office Action issued Mar. 21, 2014 in Patent Application No. 200980155980.X (w/ English Translation), (17 pages).

* cited by examiner

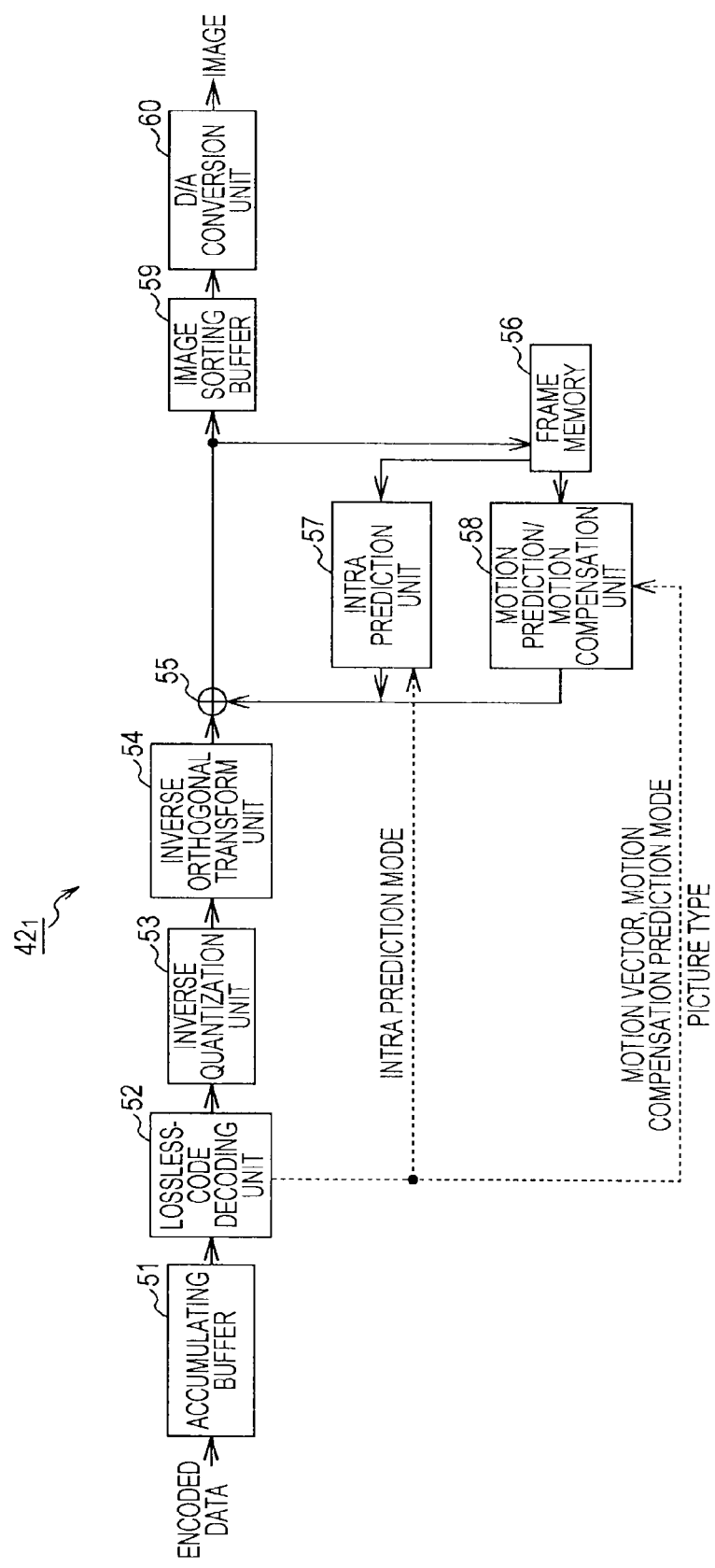

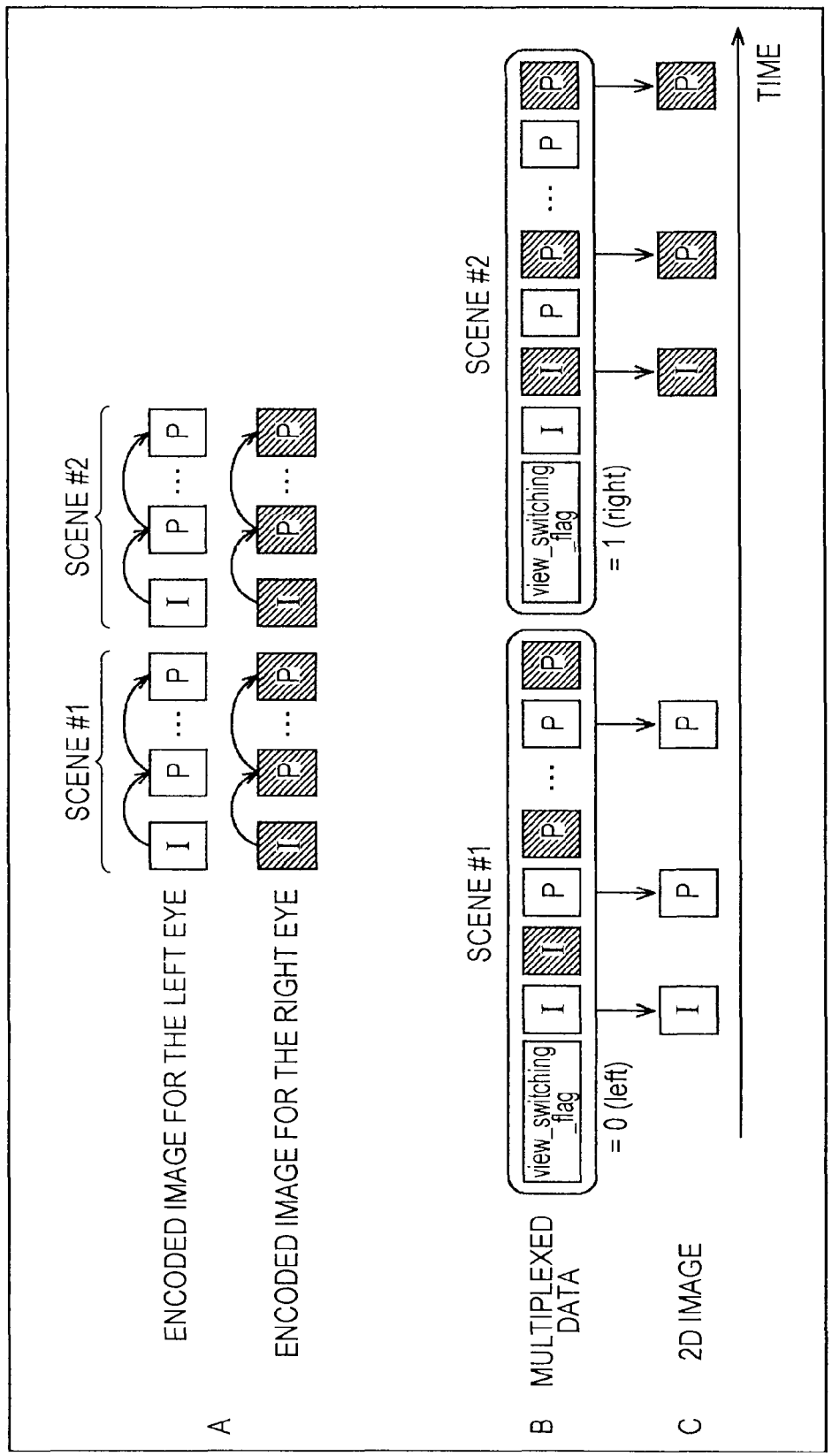

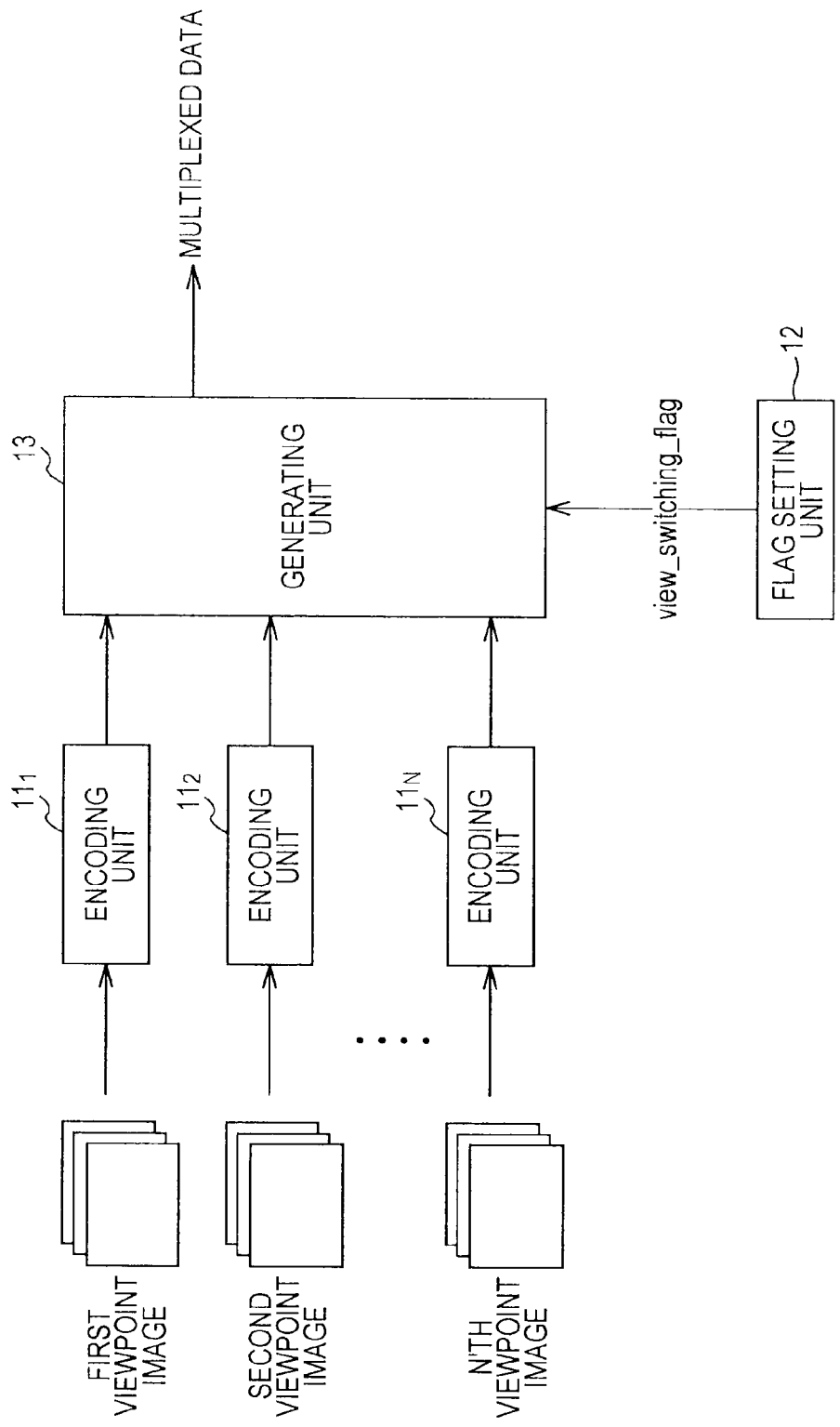

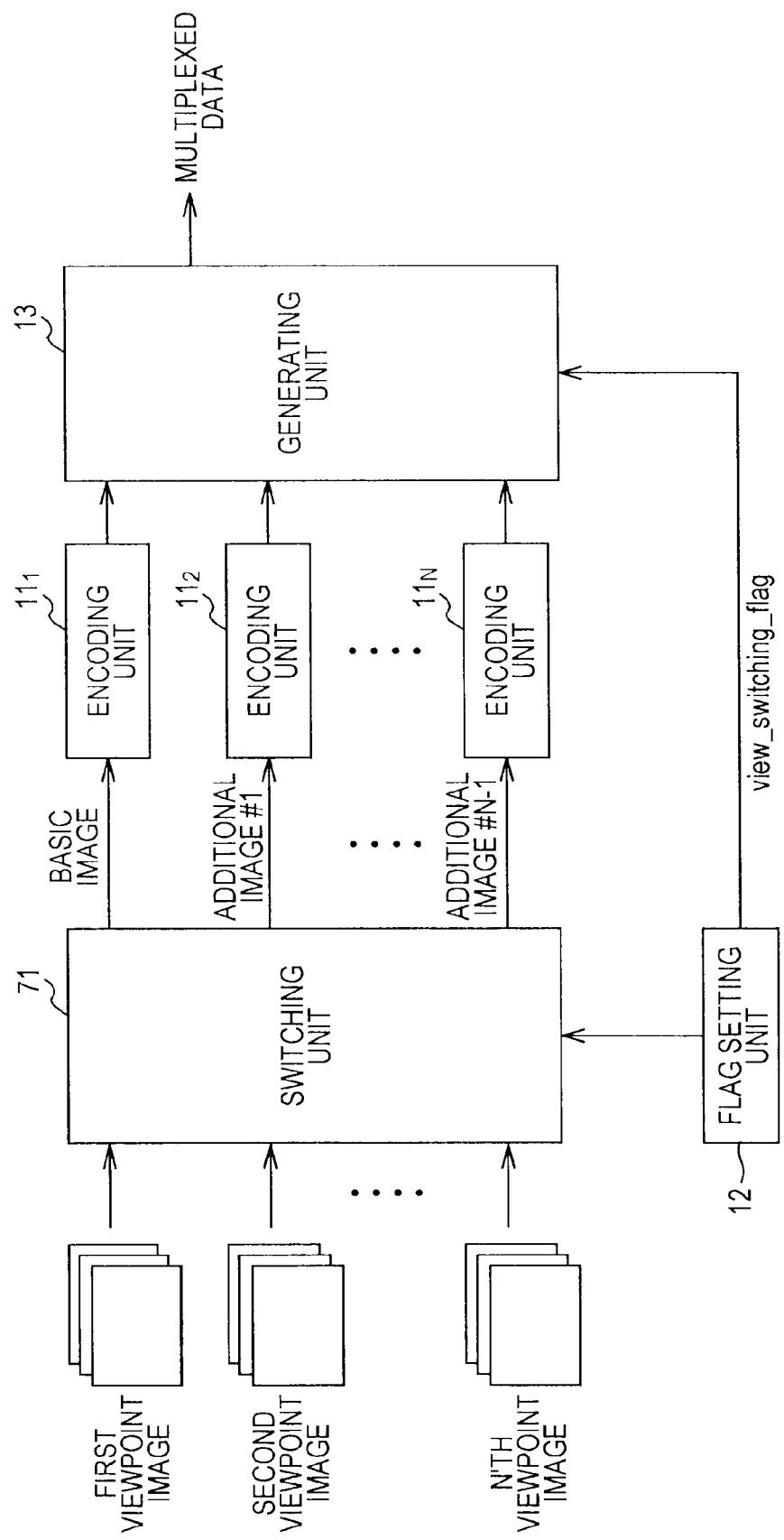

IMAGE PROCESSING DEVICE AND METHOD

TECHNICAL FIELD

The present invention relates to an image processing device and method, and specifically relates to an image processing device and method whereby an image and so forth that a contents producer intends can be displayed, for example, in a case where a content made up of multiple viewpoints of imaged data for stereoscopic vision is displayed as a 2D image.

BACKGROUND ART

In recent years, devices conforming to a system such as MPEG (Moving Picture Expert Group) for handling image information as digital signals, and taking advantage of redundancy peculiar to the image information with transmission and accumulation of high effective information as an object at that time to compress the image information by orthogonal transform such as discrete cosine transform or the like and motion compensation, or the like have are becoming more widespread in both information distribution such as broadcasting stations, and information reception in general homes.

Specifically, for example, there have become widespread encoding devices and decoding devices used at the time of receiving image information (bit stream) compressed by an encoding system such as MPEG, H.26x, or the like employing orthogonal transform such as discrete cosine transform, Karhunen-Loéve transform, or the like, and motion compensation, via a network medium such as satellite broadcasting, cable TV, the Internet, or the like, or at the time of processing the image information on a recording medium such as optical, magnetic disk, or flash memory.

For example, MPEG2 (ISO/IEC 13818-2) is defined as a general-purpose image encoding system, and is a standard encompassing both of interlaced scanning images and sequential-scanning images, and standard resolution images and high definition images, and has widely been employed now by broad range of applications for professional usage and for consumer usage. By employing the MPEG2 compression system, for example, code amount (bit rate) of 4 through 8 Mbps in the event of an interlaced scanning image of standard resolution having 720×480 pixels that are width×length, 18 through 22 Mbps in the event of an interlaced scanning image of high resolution having 1920×1088 pixels are allocated, whereby a high compression rate and excellent image quality can be realized.

With MPEG2, high image quality encoding adapted to broadcasting usage is the principal object, but lower code amount (bit rate) than the code amount of MPEG1, i.e., an coding system having a high compression rate is not handled. Personal digital assistants becoming widespread will most likely lead to increased needs for such an encoding system from now on, and in response to this, the MPEG4 encoding system has been standardized. With regard to an image encoding system, the specification thereof was confirmed as an international standard as ISO/IEC 14496-2 in December 1998.

Further, in recent years, standardization of a standard called H.264 (ITU-T Q6/16 VCEG) is being advanced with image encoding for television conference usage as an object. With H.264, it has been known that as compared to a conventional encoding system such as MPEG2 or MPEG4, though greater computation amount is required for encoding and decoding thereof, higher encoding efficiency is realized.

Also, currently, as part of the activities regarding MPEG4, standardization for taking advantage of a function that is not supported by H.264 with this H.264 as base to realize higher encoding efficiency has been done as a Joint Model of Enhanced-Compression Video Coding.

With regard to an encoding system (JVT Codec) wherein standardization is performed being performed by the Joint Video Team, in order to improve encoding efficiency as compared to existing techniques such as MPEG2, MPEG4, and so forth, various improvements have been studied. For example, with discrete cosine transform, transform to integer transform coefficients is performed with a block of 4×4 pixels as an object. Also, with regard to motion compensation, a block size is variable, and more optimal motion compensation can be performed. However, basic algorithms for encoding are the same as with the existing techniques, such as MPEG2, MPEG4, or the like.

Incidentally, as for image contents an object for encoding such as described above, in addition to 2D image contents, there are stereoscopic vision image contents wherein stereoscopic vision is available.

In order to display a stereoscopic vision image, a dedicated device (hereafter, device for stereoscopic vision) is needed, and as for such a device for stereoscopic vision, for example, there is an IP (Integral Photography) stereoscopic image system developed by NHK (Japan Broadcasting Corporation).

The image data of a stereoscopic vision image is made up of multiple viewpoints of image data (image data of images shot from multiple viewpoints), the greater the number of viewpoints is, and also the wider the range of viewpoints is, a subject can be viewed from various directions, as if it were, a "television which can be looked into" can be realized.

Here, an example of the image data of a stereoscopic vision image, i.e., encoding and decoding methods of multiple viewpoints of image data is described in PTL 1.

CITATION LIST

Patent Literature

PTL 1: Japanese Unexamined Patent Application Publication No. 2008-182669

SUMMARY OF INVENTION

Technical Problem

Of stereoscopic vision images, an image of which the number of viewpoints is the least is a stereo image of which the number of viewpoints is two viewpoints, and the image data of the stereo image is made up of the image data of an image to be observed by the left eye (hereafter, referred to as "image for the left eye"), and the image data of an image to be observed by the right eye (hereafter, referred to as "image for the right eye").

With regard to a stereoscopic vision images including a stereo image, a device for stereoscopic vision can perform stereoscopic vision, but even in the event of a device for displaying a 2D image (hereafter, also referred to as 2D display device), i.e., for example, a display such as a general TV (television receiver), can display as a 2D image.

Specifically, a stereoscopic vision image including a stereo image can be displayed as a 2D image by displaying a one-viewpoint image of a multiple-viewpoint image.

Incidentally, displaying a stereoscopic vision image at a 2D display device as a 2D image leads to a problem regarding which viewpoint of image of a multiple-viewpoint image is displayed.

Specifically, for example, the image for the left eye and the image for the right eye of a stereo image are images of the same scene with slightly different disparity, but differ in luminance (reflection of light), color, and so forth.

Therefore, for example, in the event of displaying a stereo image at a 2D display device as a 2D image, there is a request from a contents producer of the stereo image thereof to display the image for the left eye and the image for the right eye by switching in an adaptive manner in conformity with his/her own intention.

However, conventionally, in the event of displaying a stereoscopic vision image made up of a multiple-viewpoint image including a stereo image as a 2D image, an arrangement for controlling an image to be displayed as a 2D image has not been proposed regarding a multiple-viewpoint image.

Therefore, in the event of displaying a stereo image at a 2D display device as a 2D image, for example, it is predicted that one of the image for the left eye and the image for the right eye is continuously displayed regardless of intention of a contents producer according to the specification of the 2D display device.

The present invention has been made in light of such a situation, and enables an image and so forth that a contents producer intends to be displayed in the event of displaying a stereoscopic image content as a 2D image.

Solution to Problem

An image processing device according to a first aspect of the present invention is an image processing device including: transform means configured to transform, following a flag for specifying image data used for display of a 2D image from N, more than one, viewpoints of image data by switching one viewpoint of image data of the N viewpoints of image data with another viewpoint of image data, the N viewpoints of image data into one piece of basic image data that is image data used for display of a 2D image, and N−1 pieces of additional image data; and transmission means configured to transmit one piece of basic image data and the N−1 pieces of additional image data, transformed by the transform means, and the flag.

The image processing device may further include flag setting means configured to set a flag for specifying image data used for display of a 2D image from the N viewpoints of image data.

The transmission means may transmit the bit stream and the flag by connecting both.

The flag setting means may set the flag for each of one or more consecutive pictures.

The N viewpoints of image data may be viewpoint image data for the left eye to be observed by the left eye, and viewpoint image data for the right eye to be observed by the right eye.

The image processing device may further include encoding means configured to encode N viewpoints of image data to generate a bit stream.

An image processing method according to the first aspect of the present invention is an image processing method including: a transform step arranged to transform, following a flag for specifying image data used for display of a 2D image from N, more than one, viewpoints of image data, by switching one viewpoint of image data of the N viewpoints of image data with another viewpoint of image data, the N viewpoints of image data into one piece of basic image data that is image data used for display of a 2D image, and N−1 pieces of additional image data; and a transmission step arranged to transmit one piece of basic image data and the N−1 pieces of additional image data, transformed in the transform step, and the flag.

With the first aspect of the present invention, following a flag for specifying image data used for display of a 2D image from N, more than one, viewpoints of image data, by switching one viewpoint of image data of the N viewpoints of image data with another viewpoint of image data, the N viewpoints of image data are transformed into one piece of basic image data that is image data used for display of a 2D image, and N−1 pieces of additional image data, and one piece of basic image data and the N−1 pieces of additional image data, which are transformed, and the flag are transmitted.

An image processing device according to a second aspect of the present invention is an image processing device including: reception means configured to receive a flag for specifying image data used for display of a 2D image from N, more than one, viewpoints of image data, one piece of basic image data that is image data used for display of a 2D image, and N−1 pieces of additional image data, obtained by switching one viewpoint of image data of the N viewpoints of image data with another viewpoint of image data following the flag; and restoration means configured to restore one piece of basic image data and N−1 pieces of additional image data received by the reception means to N viewpoints of image data following the flag received by the reception means.

The image processing device may further include stereoscopic vision image transform means configured to transform the N viewpoints of image data into stereoscopic vision image data for stereoscopic vision.

An image processing method according to the second aspect of the present invention is an image processing method including: a reception step arranged to receive a flag for specifying image data used for display of a 2D image from N, more than one, viewpoints of image data, one piece of basic image data that is image data used for display of a 2D image, and N−1 pieces of additional image data, obtained by switching one viewpoint of image data of the N viewpoints of image data with another viewpoint of image data following the flag; and a restoration step arranged to restore one piece of basic image data and N−1 pieces of additional image data received in the reception step to N viewpoints of image data following the flag received in the reception step.

With the second aspect of the present invention, a flag for specifying image data used for display of a 2D image from N, more than one, viewpoints of image data, one piece of basic image data that is image data used for display of a 2D image, and N−1 pieces of additional image data, obtained by switching one viewpoint of image data of the N viewpoints of image data with another viewpoint of image data following the flag are received, and one piece of basic image data and N−1 pieces of additional image data similarly received are restored to N viewpoints of image data following the received flag thereof.

An image processing device according to a third aspect of the present invention is an image processing device including: flag setting means configured to set, following intention of a producer of N, more than one, viewpoints of image data, a flag for specifying image data used for display of a 2D image from the N viewpoints of image data; and transmission means configured to transmit a bit stream obtained by encoding the N viewpoints of image data, and the flag set by the setting means.

The transmission means may transmit the bit stream and the flag by connecting both.

The flag setting means may set the flag for each of one or more consecutive pictures.

The N viewpoints of image data may be viewpoint image data for the left eye to be observed by the left eye, and viewpoint image data for the right eye to be observed by the right eye.

The image processing device may further include encoding means configured to encode N viewpoints of image data to generate a bit stream.

An image processing method according to the third aspect of the present invention is an image processing method including: a flag setting step arranged to set, following intention of a producer of N, more than one, viewpoints of image data, a flag for specifying image data used for display of a 2D image from the N viewpoints of image data; and a transmission step arranged to transmit a bit stream obtained by encoding the N viewpoints of image data, and the flag set in the setting step.

With the third aspect of the present invention, following intention of a producer of N, more than one, viewpoints of image data, a flag for specifying image data used for display of a 2D image from the N viewpoints of image data is set, and a bit stream obtained by encoding the N viewpoints of image data, and the set flag are transmitted.

An image processing device according to a fourth aspect of the present invention is an image processing device including: reception means configured to receive a bit stream obtained by encoding N, more than one, viewpoints of image data, and a flag for specifying image data used for display of a 2D image from the N viewpoints of image data, set in accordance with intention of a producer of the N viewpoints of image data; and selecting means configured to select image data used for display of a 2D image from N viewpoints of image data included in the bit stream received by the reception means following the flag received by the reception means.

The bit stream and the flag may be connected.

The image processing device may further include decoding means configured to decode image data selected by the selecting means.

An image processing method according to the fourth aspect of the present invention is an image processing method including: a reception step arranged to receive a bit stream obtained by encoding N, more than one, viewpoints of image data, and a flag for specifying image data used for display of a 2D image from the N viewpoints of image data, set in accordance with intention of a producer of the N viewpoints of image data; and a selecting step arranged to select image data used for display of a 2D image from N viewpoints of image data included in the bit stream received in the reception step following the flag received in the reception step.

With the fourth aspect of the present invention, a bit stream obtained by encoding N, more than one, viewpoints of image data, and a flag for specifying image data used for display of a 2D image from the N viewpoints of image data, set in accordance with intention of a producer of the N viewpoints of image data are received, and image data used for display of a 2D image is selected from N viewpoints of image data included in the similarly received bit stream following the received flag thereof.

Note that the above image processing devices may be stand-alone devices or may be internal blocks making up a single device.

Advantageous Effects of Invention

According to the first through fourth aspects of the present invention, image data used for display of a 2D image can be specified. As a result thereof, for example, in the event of displaying a stereoscopic vision image content as a 2D image, an image and so forth that a content producer intends can be displayed.

BRIEF DESCRIPTION OF DRAWINGS

FIG. 6 is a block diagram illustrating a configuration example of a decoding unit $42_1$.

FIG. 7 is a diagram for describing processing of the decoding device in the event that a stereo image is displayed as a 2D image.

FIG. 14 is a block diagram illustrating a configuration example of a third embodiment of an encoding device to which the present invention has been applied.

FIG. 18 is a block diagram illustrating a configuration example of a fourth embodiment of an encoding device to which the present invention has been applied.

DESCRIPTION OF EMBODIMENTS

First Embodiment

First Embodiment of Encoding Device

Figure 1:
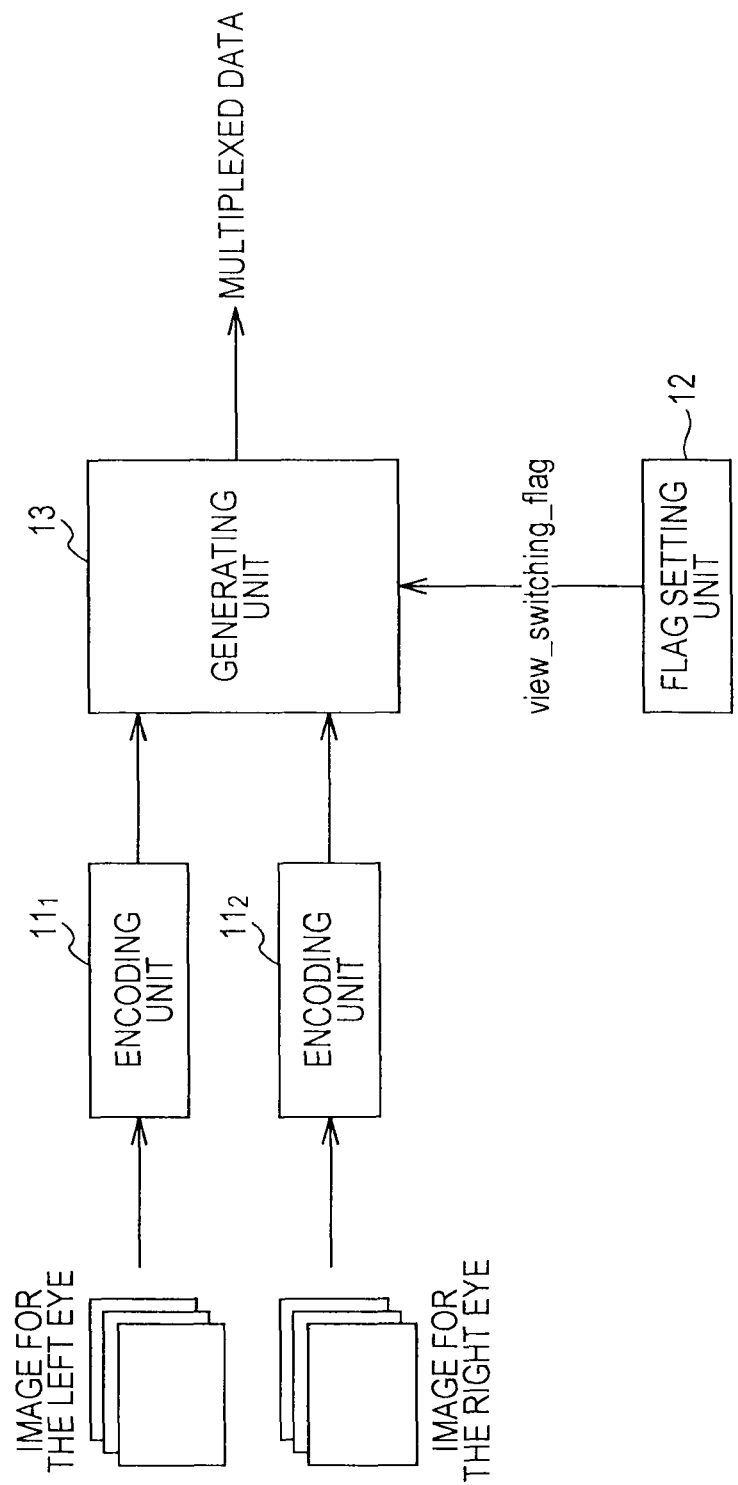
FIG. 1 is a block diagram illustrating a configuration example of a first embodiment of an encoding device to which the present invention has been applied.

FIG. 1 is a block diagram illustrating a configuration example of a first embodiment of an encoding device to which the present invention has been applied.

In FIG. 1, the encoding device encodes the image data of a stereo image made up of the image data of an image for the left eye (hereafter, also referred to as viewpoint image data for the left eye), and the image data of an image for the right eye (hereafter, also referred to as viewpoint image data for the right eye).

Specifically, in FIG. 1, the encoding device is configured of two, more than one, encoding units $11_1$ and $11_2$, a flag setting unit 12, and a generating unit 13.

The viewpoint image data for the left eye of a stereo image is supplied to the encoding units $11_1$.

The encoding units $11_1$ encodes the viewpoint image data for the left eye supplied thereto following a predetermined encoding system, for example, such as MPEG2, AVC/H.264 system, or the like, and supplies encoded data (hereafter, also referred to as "encoded data for the left eye") obtained as a result thereof to the generating unit 13.

The viewpoint image data for the right eye of the stereo image is supplied to the encoding units $11_2$.

The encoding units $11_2$ encodes the viewpoint image data for the right eye supplied thereto in the same way as with the encoding units $11_1$, for example, and supplies encoded data (hereafter, also referred to as "encoded data for the right eye") obtained as a result thereof to the generating unit 13.

For example, in response to the operations of a user such as a stereo image producer or the like, of the viewpoint image data for the left eye and the viewpoint image data for the right eye that are two viewpoints of the stereo image, the flag setting unit 12 sets, for example, a view switching flag (view_switching_flag) that is a flag for specifying image data used for display of a 2D image, for example, for each scene or the like, and supplies to the generating unit 13.

The generating unit 13 generates and outputs a bit stream including the image data of the stereo image, and the view switching flag.

Specifically, the generating unit 13 multiplexes the encoded data for the left eye from the encoding unit $11_1$, and the encoded data for the right eye from the encoding unit $11_2$ to generate multiplexed data, includes the view switching flag from the flag setting unit 12 in the header or the like of the multiplexed data, and outputs.

Configuration Example of Encoding Unit $11_1$

Figure 2:
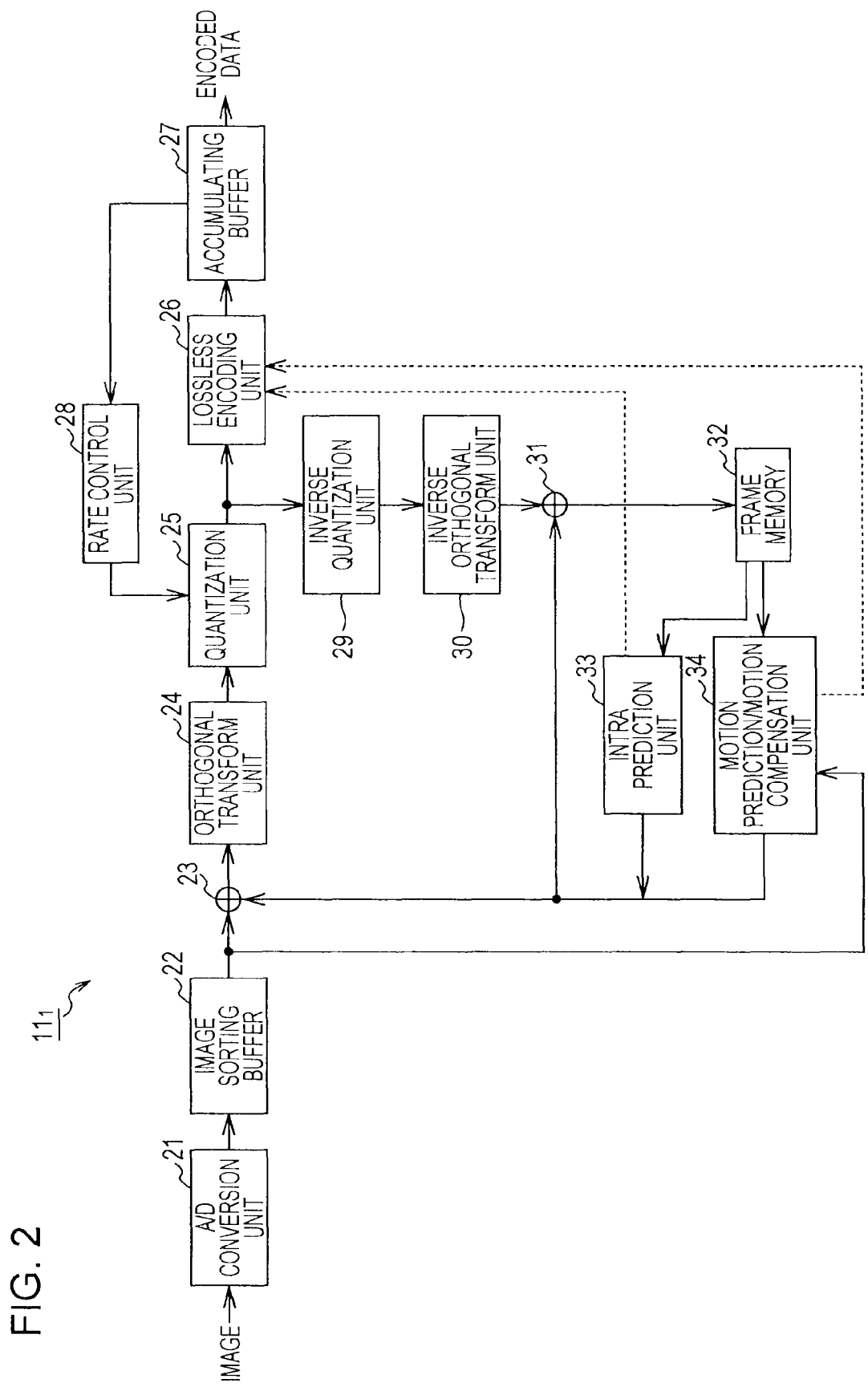
FIG. 2 is a block diagram illustrating a configuration example of an encoding unit $11_1$.

FIG. 2 is a block diagram illustrating a configuration example of the encoding unit $11_1$ in FIG. 1.

Note that the encoding unit $11_2$ in FIG. 1 is also configured in the same way as with the encoding unit $11_1$.

The encoding unit $11_1$ is an image information encoding device for realizing image compression by orthogonal transform, for example, such as discrete cosine transform, Karhunen-Loéve transform, or the like, and motion compensation.

The image data to be encoded is supplied to an A/D (Analog/Digital) conversion unit 21. In the event that the image data supplied thereto is the image data of an analog signal, the A/D conversion unit 21 converts the image data thereof into the image data of a digital signal by A/D conversion, and supplies to a screen sorting buffer 22.

The screen sorting buffer 22 temporarily stores the image data from the A/D conversion unit 21, and reads out this according to need, thereby performing sorting of the pictures (frames) (fields) of image data according to the GOP (Group of Picture) structure of encoded data that is output of the encoding unit $11_1$.

Of the pictures read out from the screen sorting buffer 22, an intra picture to be subjected to intra code is supplied to a computing unit 23.

The computing unit 23 subtracts a pixel value of a prediction image supplied from the intra prediction unit 33 from a pixel value of the intra picture supplied from the screen sorting buffer 22 according to need, and supplies to an orthogonal transform unit 24.

The orthogonal transform unit 24 subjects (a pixel value of) the intra picture (or the subtraction value from which the prediction image is subtracted) to orthogonal transform such as discrete cosine transform, Karhunen-Loéve transform, or the like, and supplies a transform coefficient obtained as a result thereof to a quantization unit 25.

The quantization unit 25 quantizes the transform coefficient from the orthogonal transform unit 24, and supplies a quantization value obtained as a result thereof to a lossless encoding unit 26.

The lossless encoding unit 26 subjects the quantization value from the quantization unit 25 to variable length coding, or lossless encoding such as arithmetic coding or the like, and supplies encoded data obtained as a result thereof to an accumulating buffer 27.

The accumulating buffer 27 temporarily stores the encoded data from the lossless encoding unit 26, and outputs with a predetermined rate.

A rate control unit 28 monitors the accumulation amount of the encoded data of the accumulating buffer 27, and controls the behavior of the quantization unit 25 such as quantization steps and so forth of the quantization unit 25 based on the accumulation amount thereof.

The quantization value obtained at the quantization unit 25 is supplied to the lossless encoding unit 26, and also supplied to an inverse quantization unit 29. The inverse quantization unit 29 inversely quantizes the quantization value from the quantization unit 25 into a transform coefficient, and supplies to an inverse orthogonal transform unit 30.

The inverse orthogonal transform unit 30 subjects the transform coefficient from the inverse quantization unit 29 to inverse orthogonal transform, and supplies to a computing unit 31.

The computing unit 31 obtains the decoded image of the intra picture by adding a pixel value of the prediction image supplied from the intra prediction unit 33 to the data supplied from the inverse orthogonal transform unit 30 according to need, and supplies to frame memory 32.

The frame memory 32 temporarily stores the decoded image supplied from the computing unit 31, and supplies the decoded image thereof to an intra prediction unit 33 and a prediction/motion compensation unit 34 as a reference image used for generating a prediction image according to need.

The intra prediction unit 33 generates, of pixels in the vicinity of a portion (block) serving as an object to be processed at the computing unit 23 within the intra picture, a prediction image from the pixels already stored in the frame memory 32, and supplies to the computing units 23 and 31.

With regard to a picture to be subjected to intra coding, as described above, in the event that a prediction image is supplied from the intra prediction unit 33 to the computing unit 23, the prediction image supplied from the intra prediction unit 33 is subtracted from the picture supplied from the image sorting buffer 22.

Also, with the computing unit 31, the prediction image subtracted at the computing unit 23 is added to the data supplied from the inverse orthogonal transform unit 30.

On the other hand, a non-intra picture to be subjected to inter coding is supplied from the image sorting buffer 22 to the computing unit 23, and a motion prediction/motion compensation unit 34.

The motion prediction/motion compensation unit 34 reads out, from the frame memory 32, the picture of a decoded image to be referenced at the time of motion prediction of the non-intra picture from the image sorting buffer 22, as a reference image. Further, the motion prediction/motion compensation unit 34 uses the reference image from the frame memory 32 to detect a motion vector regarding the non-intra picture from the image sorting buffer 22.

Subsequently, the motion prediction/motion compensation unit 34 generates the prediction image of the non-intra picture by subjecting the reference image to motion compensation following the motion vector, and supplies to the computing units 23 and 31.

With the computing unit 23, the prediction image supplied from the intra prediction unit 33 is subtracted from the non-intra picture supplied from the image sorting buffer 22, and hereafter, encoding is performed in the same way as with the case of an intra picture.

Note that an intra prediction mode that is a mode for the intra prediction unit 33 generating a prediction image is supplied from the intra prediction unit 33 to the lossless encoding unit 26. Also, a motion vector obtained at the motion prediction/motion compensation unit 34, and a motion compensation prediction mode that is a mode for the motion prediction/motion compensation unit 34 performing motion compensation are supplied from the motion prediction/motion compensation unit 34 to the lossless encoding unit 26.

With the lossless encoding unit 26, in addition to the intra prediction mode, motion vector, and motion compensation prediction mode, information necessary for decoding such as the picture type and so forth of each picture is encoded in a lossless manner, and is included in the header of the encoded data.

Description of Setting of View Switching Flag by Flag Setting Unit 12

Next, with reference to FIG. 3, description will be made regarding setting of the view switching flag by the flag setting unit 12 in FIG. 1.

Figure 3:
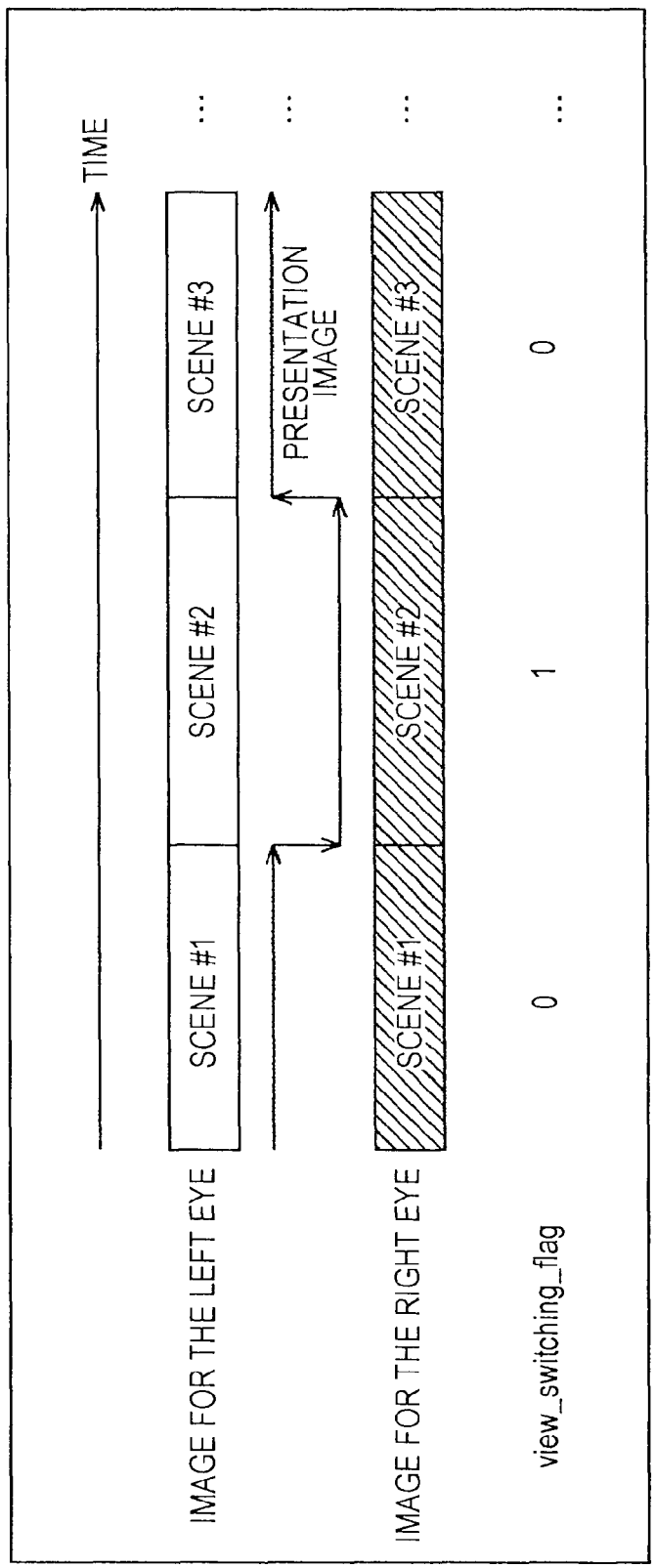
FIG. 3 is a diagram for describing setting of a view switching flag by a flag setting unit 12.

Now, let us say that a stereo image to be encoded at the encoding device in FIG. 1 is made up of scenes #1, #2, and #3 as illustrated in FIG. 3.

Further, in the event that the stereo image is displayed as a 2D image, let us say that the producer of the stereo image has operated the flag setting unit 12 so as to select the image for the left eye regarding the scene #1, and the image for the right eye regarding the scene #2, and the image for the left eye regarding the scene #3 as images to be displayed as a 2D image (hereafter, also referred to as "presentation image").

In this case, the flag setting unit 12 sets 0 that is a value for specifying the image for the left eye as a presentation image as the view switching flag regarding the scenes #1 and #3, for example.

Also, the flag setting unit 12 sets 1 that is a value for specifying the image for the right eye as a presentation image as the view switching flag regarding the scene #2, for example.

Accordingly, a one-bit flag may be employed here as the view switching flag.

Here, scenes are one or more (continuous) (group of) pictures, and for example, from a picture immediately after a scene change to a picture immediately before the next scene change, GOP, or the like may be taken as one scene.

Note that, in order to enable selection of a presentation image for each scene, with the encoding unit $11_1$ in FIG. 1, in the event that encoding is performed by AVC/H.264 system, the head picture of a scene is encoded as an IDR picture. The same applies to the encoding unit $11_2$.

Also, with the setting of a view switching flag at the flag setting unit 12 in FIG. 1, for example, one view switching flag may be set for each scene, or one view switching flag may be set for each picture.

Accordingly, setting of a view switching flag as to a scene may be performed by setting one view switching flag to a scene, or may be performed by setting a view switching flag to each picture making up a scene.

Note that, with the generating unit 13 in FIG. 1, a view switching flag is included in the header or the like of a system layer or picture layer of multiplexed data, for example. Specifically, for example, a view switching flag may be included in SEI (Supplemental Enhancement Information) that is user data, for example.

Description of Processing of Encoding Device

The processing (encoding processing) of the encoding device in FIG. 1 will be described with reference to FIG. 4.

With the encoding device in FIG. 1, upon the flag setting unit 12 being operated by the producer of a stereo image, in step S11 the flag setting unit 12 sets a view switching flag as to each scene of the stereo image following the operations of the producer of the stereo image, and supplies to the generating unit 13.

Subsequently, after awaiting the viewpoint image data for the left eye and the viewpoint image data for the right eye that are the image data of the stereo image being supplied to the encoding device, the processing proceeds from step S11 to step S12, where the encoding units $11_1$ and $11_2$ perform encoding.

Specifically, the encoding unit $11_1$ encodes the viewpoint image data for the left eye, and supplies the encoded data for the left eye obtained as a result thereof to the generating unit 13. Also, the encoding unit $11_2$ encodes the viewpoint image data for the right eye, and supplies the encoded data for the right eye obtained as a result thereof to the generating unit 13.

Subsequently, the processing proceeds from step S12 to step S13, where the generating unit 13 multiplexes the encoded data for the left eye from the encoding unit $11_1$, and the encoded data for the right eye from the encoding unit $11_2$ to obtain multiplexed data. Further, the generating unit 13 includes the view switching flag from the flag setting unit 12 in the header of the multiplexed data, and outputs the multiplexed data.

Subsequently, the processing proceeds from step S13 to step S14, where the encoding device determines whether or not there is the image data of a stereo image to be encoded, and in the event that determination is made that there is the image data, the processing returns to step S12, and hereafter, the processing in steps S12 through S14 is repeated.

Here, the processing in steps S12 through S14 is performed, for example, in increments of scenes to which a view switching flag is set, or the like.

On the other hand, in the event that determination is made in step S14 that there is no image data of a stereo image to be encoded, the encoding device ends the encoding processing.

As described above, a bit stream including the multiplexed data that the generating unit 13 outputs, i.e., (the encoded data encoded from) the image data of the stereo image, and view switching flag is transmitted via a transmission medium, or recorded in a recording medium, for example.

First Embodiment of Decoding Device

Figure 5:
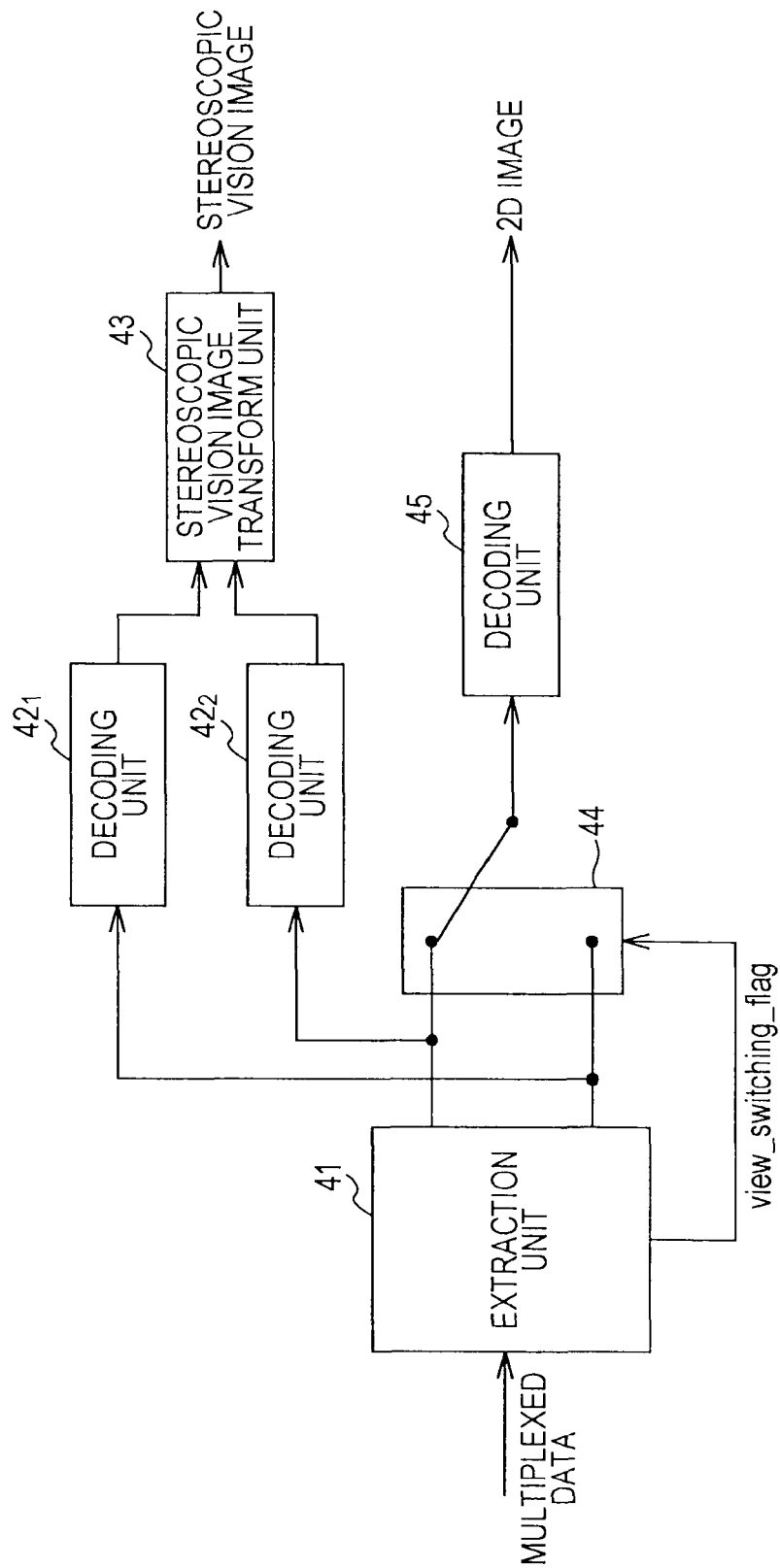
FIG. 5 is a block diagram illustrating a configuration example of the first embodiment of a decoding device to which the present invention has been applied.

FIG. 5 is a block diagram illustrating a configuration example of the first embodiment of a decoding device to which the present invention has been applied.

In FIG. 5, the decoding device decodes the multiplexed data that the encoding device in FIG. 1 outputs.

Specifically, in FIG. 5, the decoding device is configured of an extraction unit 41, two, more than one, decoding units $42_1$ and $42_2$, a stereoscopic vision image transform unit 43, a selecting unit 44, and a decoding unit 45.

The extraction unit 41 extracts a view switching flag from the multiplexed data, and supplies to the selecting unit 44.

Also, the extraction unit 41 separates (inversely multiplexes) the encoded data for the left eye, and the encoded data for the right eye from the multiplexed data, and supplies the encoded data for the left eye to the decoding unit $42_1$, and the encoded data for the right eye to the decoding unit $42_2$, respectively.

Further, the extraction unit 41 supplies the encoded data for the left eye, and the encoded data for the right eye to the selecting unit 44.

The decoding unit $42_1$ decodes the encoded data for the left eye from the extraction unit 41, and supplies the viewpoint image data for the left eye obtained as a result thereof to the stereoscopic vision image transform unit 43.

The decoding unit $42_2$ decodes the encoded data for the right eye from the extraction unit 41, and supplies the viewpoint image data for the right eye obtained as a result thereof to the stereoscopic vision image transform unit 43.

The stereoscopic vision image transform unit 43 transforms the viewpoint image data for the left eye from the decoding unit $42_1$, and the viewpoint image data for the right eye from the decoding unit $42_2$ into stereoscopic vision image data for stereoscopic vision having a format that can be handled at a device for stereoscopic vision, and supplies to an unshown device for stereoscopic vision.

The selecting unit 44 selects one of the encoded data for the left eye, and the encoded data for the right eye supplied from the extraction unit 41 following the view switching flag also supplied from the extraction unit 41 as the encoded data of image data to be used for display of a 2D image in increments of scenes or pictures or the like where a view switching flag is set, and supplies to the decoding unit 45.

The decoding unit 45 decodes the encoded data (encoded data for the left eye, or encoded data for the right eye) supplied from the selecting unit 44, and supplies the image data (viewpoint image data for the left eye, or viewpoint image data for the right eye) obtained as a result thereof to an unshown 2D display device.

Note that, in FIG. 5, the selecting unit 44 is configured to select the encoded data for the left eye, or the encoded data for the right eye that is the data before decoding, from the extraction unit 41, but in addition to this, for example, data after decoding, i.e., the viewpoint image data for the left eye obtained at the decoding unit $42_1$, or the viewpoint image data for the right eye obtained at the decoding unit $42_2$ may be selected at the selecting unit 44. In this case, the decoding device in FIG. 5 may be configured without providing the decoding unit 45. The same is applied to later-described FIG. 16.

Configuration Example of Decoding Unit $42_1$

FIG. 6 is a block diagram illustrating a configuration example of the decoding unit $42_1$ in FIG. 5.

Note that the decoding units $42_2$ and 45 in FIG. 5 are also configured in the same way as with the decoding unit $42_1$.

The decoding unit $42_1$ is, for example, an image information decoding device for decoding encoded data obtained at an image information encoding device which realizes image compression by orthogonal transform such as discrete cosine transform, Karhunen-Loéve transform, or the like, and motion compensation.

The encoded data to be decoded is supplied to an accumulating buffer 51. The accumulating buffer 51 temporarily stores the encoded supplied thereto, and supplies to a lossless-code decoding unit 52.

The lossless-code decoding unit 52 subjects the encoded data from the accumulating buffer 51 to processing such as variable length decoding, arithmetic decoding, or the like based on the format of the encoded data thereof, thereby decoding information necessary for decoding of an image, such as a quantization value, and the intra prediction mode, a motion vector, motion compensation prediction mode included in the header of the encoded data, in addition, the picture type of each picture, and so forth.

The quantization value obtained at the lossless-code decoding unit 52 is supplied to an inverse quantization unit 53, and the intra prediction mode is supplied to an intra prediction unit 57. Also, the motion vector (MV), motion compensation prediction mode, and picture type obtained at the lossless-code decoding unit 52 are supplied to a motion prediction/motion compensation unit 58.

The inverse quantization unit 53, inverse orthogonal transform unit 54, computing unit 55, frame memory 56, intra prediction unit 57, and motion prediction/motion compensation unit 58 perform the same processing as with the inverse quantization unit 29, inverse orthogonal transform unit 30, computing unit 31, frame memory 32, intra prediction unit 33, and motion prediction/motion compensation unit 34 in FIG. 2 respectively, whereby an image is decoded (a decoded image is obtained).

Specifically, the inverse quantization unit 53 inversely quantizes the quantization value from the lossless-code decoding unit 52 into a transform coefficient, and supplies to the inverse orthogonal transform unit 54.

The inverse orthogonal transform unit 54 subjects the transform coefficient from the inverse quantization unit 53 to inverse orthogonal transform, and supplies to the computing unit 55.

Of the data supplied from the inverse orthogonal transform unit 54, with regard to the data of an intra picture, the computing unit 55 obtains the decoded image of the intra picture by adding a pixel value of the prediction image supplied from the intra prediction unit 57 according to need. Also, of the data supplied from the inverse orthogonal transform unit 54, with regard to the data of a non-intra picture, the computing unit 55 obtains the decode image of the non-intra picture by adding a pixel value of the prediction image supplied from the motion prediction/motion compensation unit 58.

The decoded image obtained at the computing unit 55 is supplied to the frame memory 56 according to need, and also supplied to an image sorting buffer 59 as necessary.

The frame memory 56 temporarily stores the decoded image supplied from the computing unit 55, and supplies the decoded image thereof to the intra prediction unit 57 and motion prediction/motion compensation unit 34 as a reference image used for generating a prediction image.

In the event that the data to be processed at the computing unit 55 is the data of an intra picture, the intra prediction unit 57 uses the decoded image serving as the reference image from the frame memory 56 to generate the prediction image of the intra picture thereof as necessary, and supplies to the computing unit 55.

Specifically, the intra prediction unit 57 generates a prediction image from pixels already stored in the frame memory 56 of pixels in the vicinity of a portion (block) serving as an object to be processed at the computing unit 55 following the intra prediction mode from the lossless-code decoding unit 52, and supplies to the computing unit 55.

On the other hand, in the event that the data to be processed at the computing unit 55 is the data of a non-intra picture, the motion prediction/motion compensation unit 58 generates the prediction image of the non-intra picture thereof, and supplies to the computing unit 55.

Specifically, the motion prediction/motion compensation unit 58 reads out the picture of a decoded image used for generation of a prediction image from the frame memory 56 as a reference image following the picture type or the like from the lossless-code decoding unit 52. Further, the motion prediction/motion compensation unit 58 subjects the reference image from the frame memory 56 to motion compensation following the motion vector and motion compensation prediction mode from the lossless-code decoding unit 52, thereby generating a prediction image, and supplies to the computing unit 55.

With the computing unit 55, as described above, (the pixel values of) a picture is decoded by adding the prediction image supplied from the intra prediction unit 57 or motion prediction/motion compensation unit 58 to the data supplied from the inverse orthogonal transform unit 54.

The image sorting buffer 59 temporarily stores and reads out the picture (decoded image) from the computing unit 55, thereby sorting the row of the pictures into the original row, and supplies to the D/A (Digital/Analog) conversion unit 60.

In the event that there is a need to output the decoded image from the image sorting buffer 59 using analog signals, the D/A conversion unit 60 subjects the decoded image thereof to D/A conversion, and outputs this.

Processing of Decoding Device in Case of 2D Image Being Displayed

Next, description will be made regarding processing of the decoding device in FIG. 5 in the event that a stereo image is displayed as a 2D image, with reference to FIG. 7.

Note that, in FIG. 7, I represents an I (Intra) picture, and P represents a P (Predictive) picture.

A in FIG. 7 illustrates encoded data for the left eye, and encoded data for the right eye that the extraction unit 41 in FIG. 5 outputs.

With the encoded data for the left eye, the head picture of a scene is an I picture (IDR picture), and other pictures are P pictures. The same applies to the encoded data for the right eye.

B in FIG. 7 illustrates multiplexed data in a state in which the encoded data for the left eye, and the encoded data for the right eye in A in FIG. 7 are multiplexed.

In B in FIG. 7, the encoded data for the left eye, and the encoded data for the right eye are multiplexed for each scene. Further, in B in FIG. 7, a view switching flag set to a scene is included in the multiplexed data. In B in FIG. 7, a view switching flag of which the value is 0 is set to the scene #1, and a view switching flag of which the value is 1 is set to the scene #2.

C in FIG. 7 illustrates a picture to be displayed as a 2D image.

A view switching flag of which the value is 0 is set to the scene #1, and in this case, the selecting unit 44 in FIG. 5 selects the encoded data for the left eye of the encoded data for the left eye or the encoded data for the right eye supplied from the extraction unit 41, and supplies to the decoding unit 45.

Accordingly, in this case, with regard to the scene #1, the image for the left eye corresponding to image data obtained by decoding the encoded data for the left eye is displayed at a 2D display device.

On the other hand, a view switching flag of which the value is 1 is set to the scene #2, and in this case, the selecting unit 44 selects the encoded data for the right eye of the encoded data for the left eye or the encoded data for the right eye supplied from the extraction unit 41, and supplies to the decoding unit 45.

Accordingly, in this case, with regard to the scene #2, the image for the right eye corresponding to image data obtained by decoding the encoded data for the right eye is displayed at the 2D display device.

Description of Processing of Decoding Device

Processing (decoding processing) of the decoding device in FIG. 5 will be described with reference to FIG. 8A and FIG. 8B.

Figure 8A:
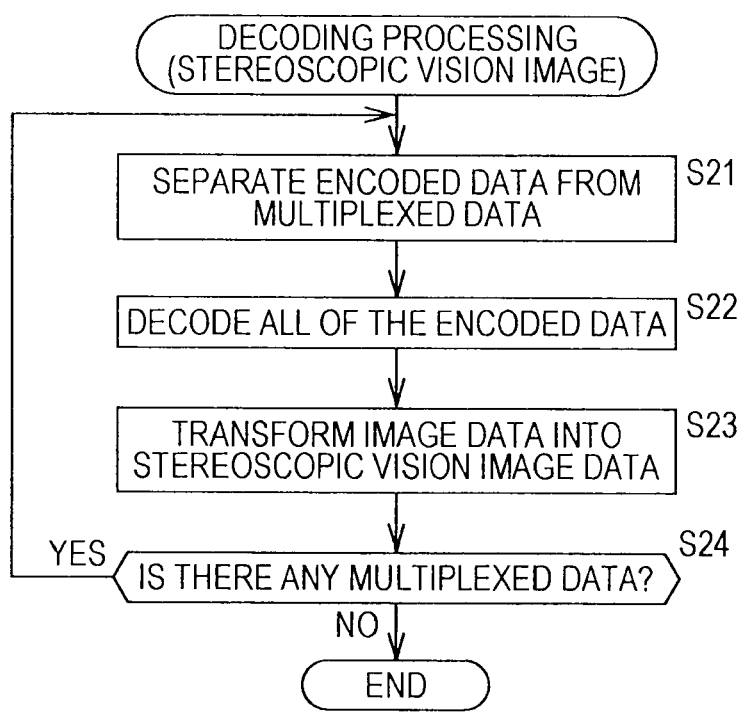
FIG. 8A is a flowchart for describing decoding processing according to the first embodiment.

FIG. 8A is a flowchart for describing decoding processing of the decoding device in FIG. 5 in the event that display of a stereoscopic vision image is performed.

In the event that display of a stereoscopic vision image is performed, in step S21 the extraction unit 41 separates encoded data for the left eye and encoded data for the right eye from multiplexed data supplied thereto. Further, the extraction unit 41 supplies the encoded data for the left eye to the decoding unit $42_1$, and the encoded data for the right eye to the decoding unit $42_2$ respectively, and the processing proceeds from step S21 to step S22.

In step S22, all of the encoded data multiplexed into multiplexed data are decoded, and the processing proceeds to step S23.

Specifically, the decoding unit $42_1$ decodes the encoded data for the left eye from the extraction unit 41, and supplies viewpoint image data for the left eye obtained as a result thereof to the stereoscopic vision image transform unit 43. Further, the decoding unit $42_2$ decodes the encoded data for the right eye from the extraction unit 41, and supplies viewpoint image data for the right eye obtained as a result thereof to the stereoscopic vision image transform unit 43.

In step S23, the stereoscopic vision image transform unit 43 transforms the viewpoint image data for the left eye from the decoding unit $42_1$, and the viewpoint image data for the right eye from the decoding unit $42_2$ into stereoscopic vision image data, supplies to an unshown device for stereoscopic vision, and the processing proceeds to step S24.

In step S24, the extraction unit 41 determines whether or not there is unprocessed multiplexed data, and determination is made that there is unprocessed multiplexed data, the processing returns to step S21, and hereafter, the processing in steps S21 through S24 is repeated.

Also, determination is made in step S24 that there is no unprocessed multiplexed data, the decoding device ends the decoding processing.

Figure 8B:
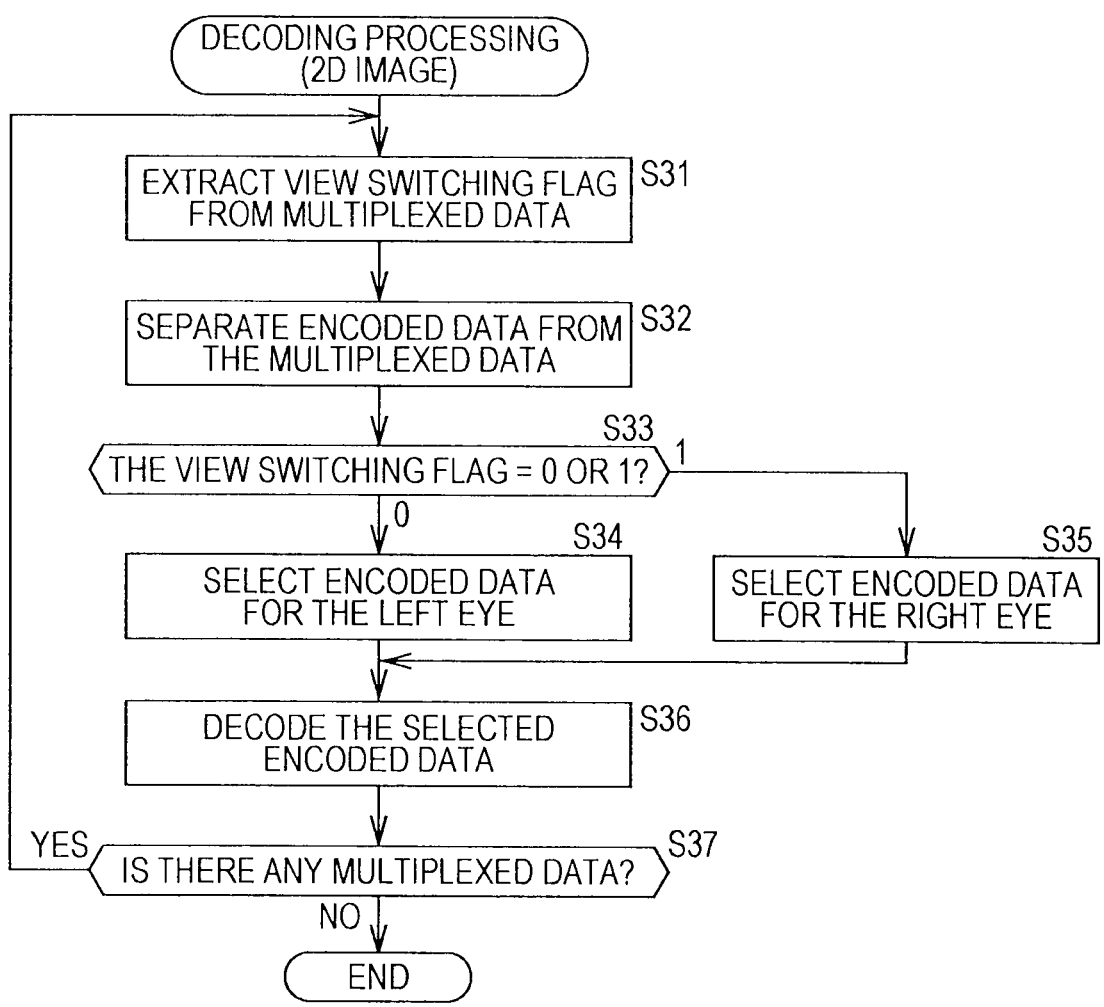
FIG. 8B is a flowchart for describing the decoding processing according to the first embodiment.

FIG. 8B is a flowchart for describing decoding processing of the decoding device in FIG. 5 in the event that display of a 2D image is performed.

In the event that display of a 2D image is performed, in step S31 the extraction unit 41 extracts a view switching flag from multiplexed data supplied thereto, supplies to the selecting unit 44, and the processing proceeds to step S32.

In step S32, the extraction unit 41 separates encoded data for the left eye, and encoded data for the right eye from the multiplexed data, supplies to the selecting unit 44, and the processing proceeds to step S33.

In step S33, the selecting unit 44 determines whether the view switching flag from the extraction unit 41 is 0 or 1.

In the event that determination is made in step S33 that the view switching flag is 0, i.e., in the event that image data for the left eye is specified as image data to be used for display of a 2D image, the processing proceeds to step S34, where the selecting unit 44 selects, of the encoded data for the left eye or the encoded data for the right eye from the extraction unit 41, the encoded data for the left eye as selected encoded data, supplies to the decoding unit 45, and the processing proceeds to step S36.

In this case, in step S36 the decoding unit 45 decodes the encoded data for the left eye (selected encoded data) supplied from the selecting unit 44, supplies viewpoint image data for the left eye obtained as a result thereof to an unshown 2D display device, and the processing proceeds to step S37.

Accordingly, in this case, the image for the left eye corresponding to the viewpoint image data for the left eye is displayed at the 2D display device as a 2D image.

On the other hand, in the event that determination is made in step S33 that the view switching flag is 1, i.e., in the event that the image data for the right eye is specified as image data to be used for display of a 2D image, the processing proceeds to step S35, where the selecting unit 44 selects, of the encoded data for the left eye or the encoded data for the right eye from the extraction unit 41, the encoded data for the right eye as selected encoded data, supplies to the decoding unit 45, and the processing proceeds to step S36.

In this case, in step S36 the decoding unit 45 decodes the encoded data for the right eye (selected encoded data) supplied from the selecting unit 44, supplies viewpoint image data for the right eye obtained as a result thereof to the unshown 2D display device, and the processing proceeds to step S37.

Accordingly, in this case, the image for the right eye corresponding to the viewpoint image data for the right eye is displayed at the 2D display device as a 2D image.

In step S37, the extraction unit 41 determines whether or not there is unprocessed multiplexed data, and in the event that determination is made that there is unprocessed multiplexed data, the processing returns to step S31, and hereafter, the processing in steps S31 through S37 is repeated.

Here, the processing in steps S31 through S37 is performed in increments of scenes or the like where a view switching flag is set.

On the other hand, in the determination is made in step S37 that there is no unprocessed multiplexed data, the decoding device ends the decoding processing.

As described above, with the encoding device in FIG. 1, multiplexed data including viewpoint image data for the left eye and viewpoint image data for the right eye that are two viewpoints of image data, and a view switching flag is generated. Subsequently, with the decoding device in FIG. 5, a view switching flag is extracted from the multiplexed data thereof, and image data used for display of a 2D image is selected from the viewpoint image data for the left eye and the viewpoint image data for the right eye in increments of scenes or the like following the view switching flag thereof.

Accordingly, image data used for display of a 2D image can be specified by a view switching flag in increments of scenes or the like, and accordingly, in the event that a stereo image content is displayed as a 2D image, of the image for the left eye, or the image for the right eye, an image that a content producer intends can be displayed in increments of scenes or the like.

Note that a view switching flag is a flag for specifying image data to be used for display of a 2D image, but with the decoding device in FIG. 5, an image to be displayed as a 2D image is switched to the image for the left eye or the image for the right eye following the view switching flag. Accordingly, with the decoding device in FIG. 5, a view switching flag serves as a flag for switching an image to be displayed as a 2D image.

Second Embodiment

Second Embodiment of Encoding Device

Figure 9:
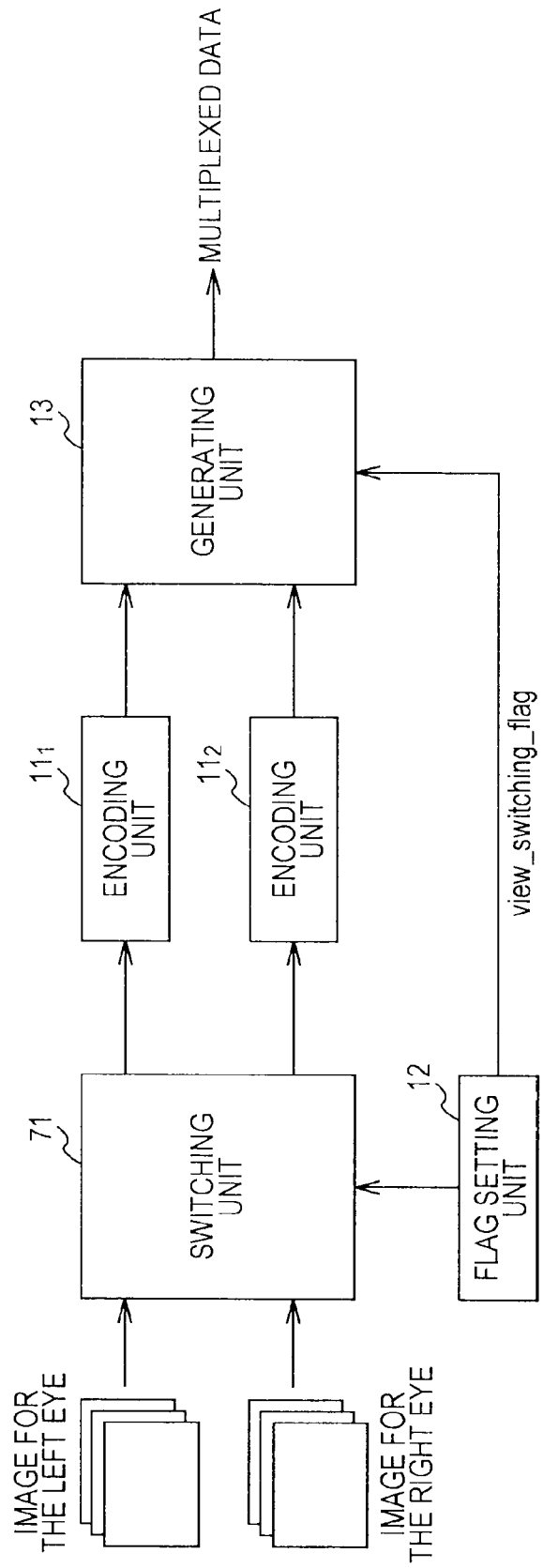
FIG. 9 is a block diagram illustrating a configuration example of a second embodiment of an encoding device to which the present invention has been applied.

FIG. 9 is a block diagram illustrating a configuration example of a second embodiment of the encoding device to which the present invention has been applied.

Note that, in the drawing, a portion corresponding to the case in FIG. 1 is denoted with the same reference numeral, and hereafter, description thereof will be omitted as appropriate.

The encoding device in FIG. 9 is common to the case in FIG. 1 in that the encoding device includes the encoding units $11_1$ and $11_2$, flag setting unit 12, and generating unit 13, and differs from the case in FIG. 1 in that the encoding device further includes a switching unit 71.

The viewpoint image data for the left eye, and the viewpoint image data for the right eye of a stereo image are supplied to the switching unit 71.

Also, a view switching flag is supplied from the flag setting unit 12 to the switching unit 71.

The switching unit 71 switches one viewpoint of image data of the viewpoint image data for the left eye and the viewpoint image data for the right eye that are two viewpoints of image data with another viewpoint of image data following the view switching flag from the flag setting unit 12, thereby transforming the two viewpoints of image data into one piece of basic image data that is image data to be used for display of a 2D image, and one piece of additional image data that is image data not to be used for display of a 2D image.

Note that the switching unit 71 supplies the basic image data to the encoding unit $11_1$, and supplies the additional image data to the encoding unit $11_2$.

Therefore, in FIG. 9, the encoding unit $11_1$ encodes the basic image data from the switching unit 71 instead of the viewpoint image data for the left eye, and supplies encoded data obtained as a result thereof (hereafter, also referred to as "basic encoded data") to the generating unit 13.

Also, the encoding unit $11_2$ encodes the additional image data from the switching unit 71 instead of the viewpoint image data for the right eye, and supplies encoded data obtained as a result thereof (hereafter, also referred to as "additional encoded data") to the generating unit 13.

Subsequently, the generating unit 13 multiplexes the basic encoded data from the encoding unit 11$_1$, and the additional encoded data from the encoding unit 11$_2$ to obtain multiplexed data, and includes the view switching flag from the flag setting unit 12 in the header or the like of the multiplexed data thereof.

That is to say, in FIG. 9, the multiplexed data obtained at the generating unit 13 includes basic image data, additional image data, and view switching flag.

Description of Processing of Switching Unit 71

Processing of the switching unit 71 in FIG. 9 will be described with reference to FIG. 10.

Now, let us say that a stereo image to be encoded at the encoding device in FIG. 9 is made up of scenes #1, #2, and #3 as illustrated in FIG. 3.

Further, in the event that a stereo image is displayed as a 2D image, let us say that the producer of the stereo image has operated the flag setting unit 12 so as to select each of the image for the left eye regarding the scene #1, and the image for the right eye regarding the scene #2, and the image for the left eye regarding the scene #3 as images to be displayed as a 2D image (presentation image).

In this case, the flag setting unit 12 sets 0 that is a value for specifying the image for the left eye as a presentation image as the view switching flag regarding the scenes #1 and #3, for example.

Also, the flag setting unit 12 sets 1 that is a value for specifying the image for the left eye as a presentation image as the view switching flag regarding the scene #2, for example.

Here, the above description is the same as description in FIG. 3.

The switching unit 71 switches, as described above, one viewpoint of image data of the viewpoint image data for the left eye and the viewpoint image data for the right eye that are two viewpoints of image data with another viewpoint of image data following a view switching flag, thereby transforming the two viewpoints of image data into one piece of basic image data that is image data to be used for display of a 2D image, and one piece of additional image data that is image data not to be used for display of a 2D image.

That is to say, the switching unit 71 switches, of the scenes of the viewpoint image data for the left eye that is one viewpoint of image data for the left eye and the viewpoint image data for the right eye, a scene of which the view switching flag does not specify the viewpoint image data for the left eye, i.e., regarding a scene where the viewpoint image data for the right eye is specified, the viewpoint image data for the left eye for that scene is switched with the viewpoint image data for the right eye (mutually switches the viewpoint image data for the left eye, and the viewpoint image data for the right eye).

Figure 10:
FIG. 10 is a diagram for describing processing of a switching unit 71 according to the second embodiment.

In FIG. 10, of the scenes #1 through #3 of the viewpoint image data for the left eye, the scene #2 is a scene where the viewpoint image data for the right eye is specified by the view switching flag, and accordingly, of the scenes #1 through #3 of the viewpoint image data for the left eye, the data of the scene #2 is switched with the data of the scene #2 of the viewpoint image data for the right eye, and the image data after switching thereof is taken as the basic image data.

Subsequently, of the scenes #1 through #3 of the viewpoint image data for the right eye, the data of the scene #2 is switched with the data of the scene #2 of the viewpoint image data for the left eye, and the image data after switching thereof is taken as the additional image data.

In this case, with the basic image data, the data of the scenes #1 and #3 is the viewpoint image data for the left eye, and the data of the scene #2 is the viewpoint image data for the right eye. The basic image data is data specified by the view switching flag as image data to be used for display of a 2D image.

Accordingly, in the event that a stereo image is displayed as a 2D image, the image corresponding to the basic image data is displayed, whereby an image that a contents producer intends can be displayed in increments of scenes or the like.

On the other hand, with the additional image data, the data of the scenes #1 and #3 is the viewpoint image data for the right eye, and the data of the scene #2 is the viewpoint image data for the left eye.

The additional image data is not used for display of a 2D image, and is used along with the basic image data at the time of displaying a stereoscopic vision image (stereo image).

Description of Processing of Encoding Device

Figure 11:
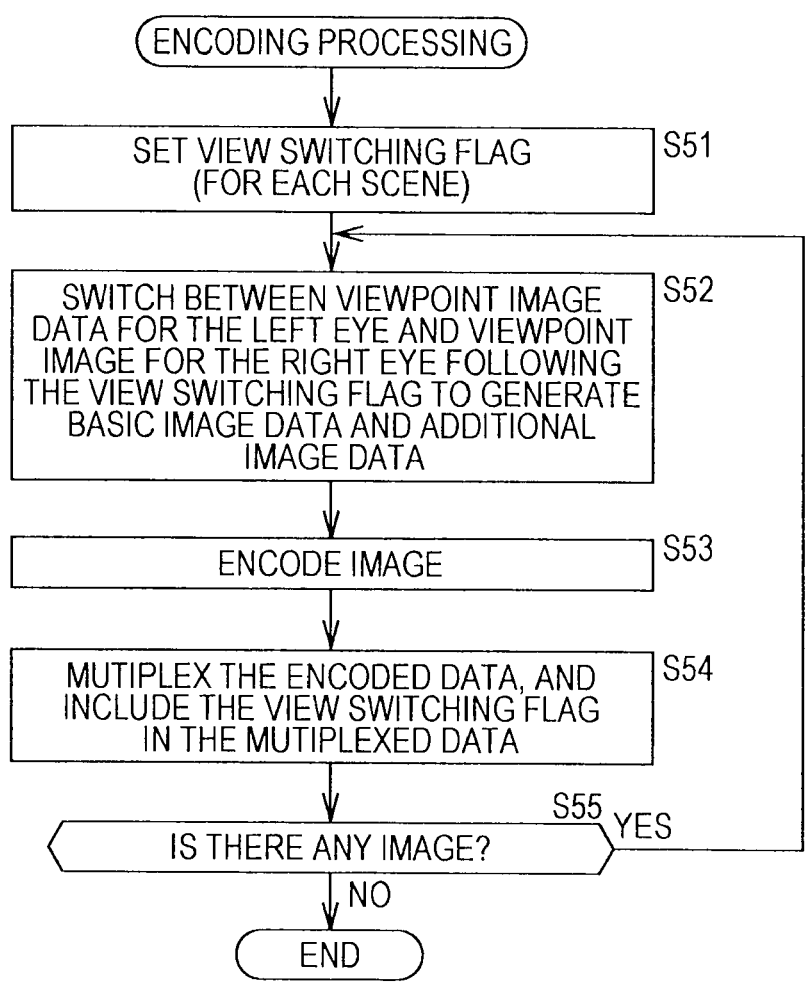
FIG. 11 is a flowchart for describing encoding processing according to the second embodiment.

Processing (Encoding Processing) of the encoding device in FIG. 9 will be described with reference to FIG. 11.

With the encoding device in FIG. 9, upon the flag setting unit 12 being operated by the producer of a stereo image, in step S51 the flag setting unit 12 sets a view switching flag as to each scene of the stereo image following the operation of the producer of the stereo image, and supplies to the generating unit 13 and the switching unit 71.

Subsequently, after awaiting the viewpoint image data for the left eye, and the viewpoint image data for the right eye that are the image data of the stereo image being supplied to the encoding device, the processing proceeds from step S51 to step S52, where the switching unit 71 switches the viewpoint image data for the left eye with the image data for the right eye following the view switching flag from the flag setting unit 12 as described in FIG. 10, thereby transforming the viewpoint image data for the left eye, and the image data for the right eye into one piece of basic image data, and one piece of additional image data (generating basic image data and additional image data from the viewpoint image data for the left eye, and the image data for the right eye).

Note that description has been made here wherein the viewpoint image data for the left eye is switched with the image data for the right eye, thereby transforming the viewpoint image data for the left eye, and the image for the right eye into basic image data and additional image data, but conversely, an arrangement may be made wherein the viewpoint image data for the right eye is switched with the image data for the left eye, thereby transforming the viewpoint image data for the left eye, and the image for the right eye into basic image data and additional image data.

Also, switching between the viewpoint image data for the left eye, and the image data for the right eye may be performed in the same scene increments as the increments where a view switching flag is set, for example.

After the processing in step S52, the switching unit 71 supplies the basic image data to the encoding unit 11$_1$, and also supplies the additional image data to the encoding unit 11$_2$.

Figure 4:
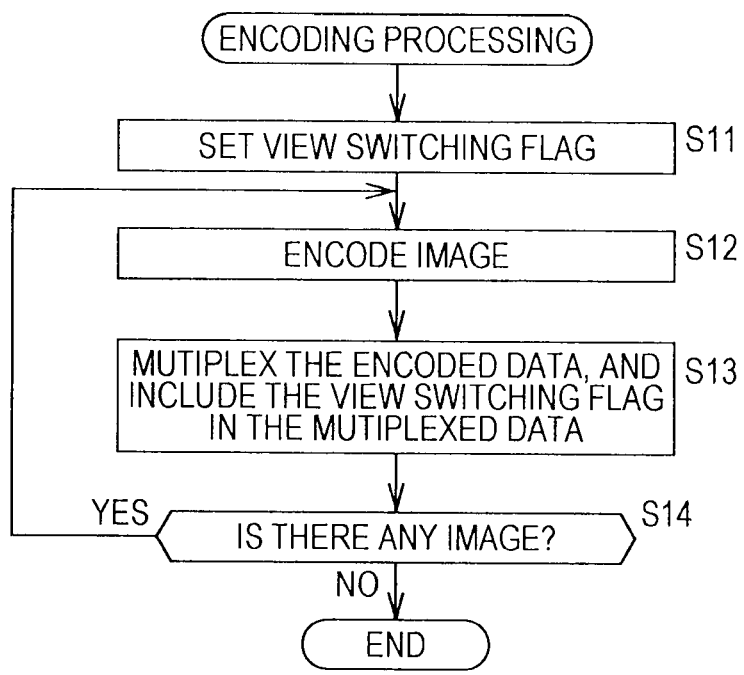
FIG. 4 is a flowchart for describing encoding processing according to the first embodiment.

Subsequently, the processing sequentially proceeds to steps S53 through S55, where the same processing as with the case of steps S12 through S14 in FIG. 4 is performed.

Specifically, in step S53, the encoding unit 11$_1$ encodes the based image data from the switching unit 71, and supplies basic encoded data obtained as a result thereof to the generating unit 13. Further, in step S53, the encoding unit 11$_2$ encodes the additional image data from the switching unit 71, and supplies additional encoded data obtained as a result thereof to the generating unit 13, and the processing proceeds to step S54.

In step S54, the generating unit 13 multiplexes the basic encoded data from the encoding unit 11₁, and the additional encoded data from the encoding unit 11₂ to obtain multiplexed data. Further, the generating unit 13 includes the view switching flag from the flag setting unit 12 in the header of the multiplexed data, and outputs the multiplexed data.

Subsequently, the processing proceeds from step S54 to step S55, where the encoding device determines whether or not there is the image data of a stereo image to be encoded, and in the event that determination is made that there is the image data of a stereo image to be encoded, the processing returns to step S52, and hereafter, the processing in steps S52 through S55 is repeated.

On the other hand, in the event that determination is made in step S55 that there is no image data of a stereo image to be encoded, the encoding device ends the encoding processing.

As described above, a bit stream including the multiplexed data that the generating unit 13 outputs, i.e., (the encoded data encoded from) the basic image data and additional image data transformed from the image data of the stereo image, and a view switching flag is transmitted via a transmission medium, or recorded in a recording medium, for example.

Second Embodiment of Decoding Device

Figure 12:
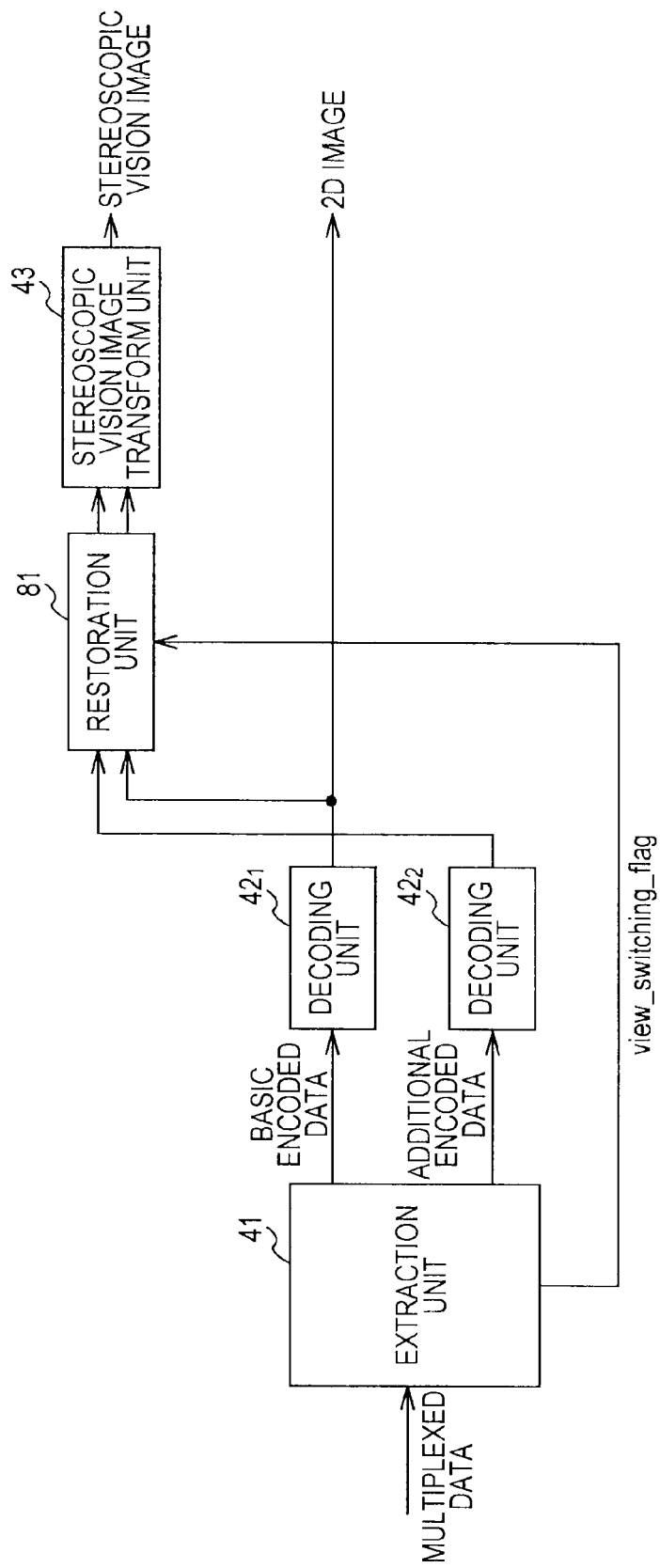
FIG. 12 is a block diagram illustrating a configuration example of the second embodiment of a decoding device to which the present invention has been applied.

FIG. 12 is a block diagram illustrating a configuration example of the second embodiment of the decoding device to which the present invention has been applied.

Note that, in the drawing, a portion corresponding to the case in FIG. 5 is denoted with the same reference numeral, and hereafter, description thereof will be omitted as appropriate.

The decoding device in FIG. 12 is common to the case in FIG. 5 in that the decoding device includes the extraction unit 41, decoding units 42₁ and 42₂, and stereoscopic vision image transform unit 43. However, the decoding device in FIG. 12 differs from the case in FIG. 5 in that neither the selecting unit 44 nor the decoding unit 45 in FIG. 5 is provided, and in that a restoration unit 81 is newly provided.

In FIG. 12, the decoding device decodes multiplexed data that the encoding device in FIG. 9 outputs.

Here, the multiplexed data that the encoding device in FIG. 9 outputs includes basic encoded data and additional encoded data instead of the encoded data for the left eye, and the encoded data for the right eye.

Therefore, with the decoding device in FIG. 12, the extraction unit 41 separates basic encoded data and additional encoded data from the multiplexed data. Subsequently, the extraction unit 41 supplies the basic encoded data to the decoding unit 42₁, and supplies the additional encoded data to the decoding unit 42₂, respectively.

The decoding unit 42₁ decodes the basic encoded data from the extraction unit 41 instead of the encoded data for the left eye. Also, the decoding unit 42₂ decodes the additional encoded data from the extraction unit 41 instead of the encoded data for the right eye.

The basic image data obtained by the decoding unit 42₁ decoding the basic encoded data, and the additional image data obtained by the decoding unit 42₂ decoding the additional encoded data are supplied to the restoration unit 81.

Here, in the event that a stereo image is displayed as a 2D image, the basic image data obtained by the decoding unit 42₁ decoding the basic encoded data is supplied to the unshown 2D display device. Subsequently, the image corresponding to the basic image data from the decoding unit 42₁ is displayed at the 2D display device.

As described above, the basic image data is supplied to the restoration unit 81 from the decoding unit 42₁, and also the additional image data is supplied from the decoding unit 42₂, and additionally, a view switching flag extracted from the multiplexed data is supplied from the extraction unit 41.

The restoration unit 81 switches between the basic image data form the decoding unit 42₁ and the additional image data from the decoding unit 42₂ following the view switching flag from the extraction unit 41, thereby transforming the basic image data and additional image data into the original imaged data for the left eye and image data for the right eye.

Specifically, the restoration unit 81 performs inverse switching of the case of the switching unit 71 in FIG. 9 with the basic image data and additional image data as objects following the view switching flag from the extraction unit 41, thereby restoring the image data for the left eye and image data for the right eye.

Subsequently, the restoration unit 81 supplies the image data for the left eye and the image data for the right eye to the stereoscopic vision image transform unit 43.

Description of Processing of Decoding Device

Processing (decoding processing) of the decoding device in FIG. 12 will be described with reference to FIG. 13A and FIG. 13B.

Figure 13A:
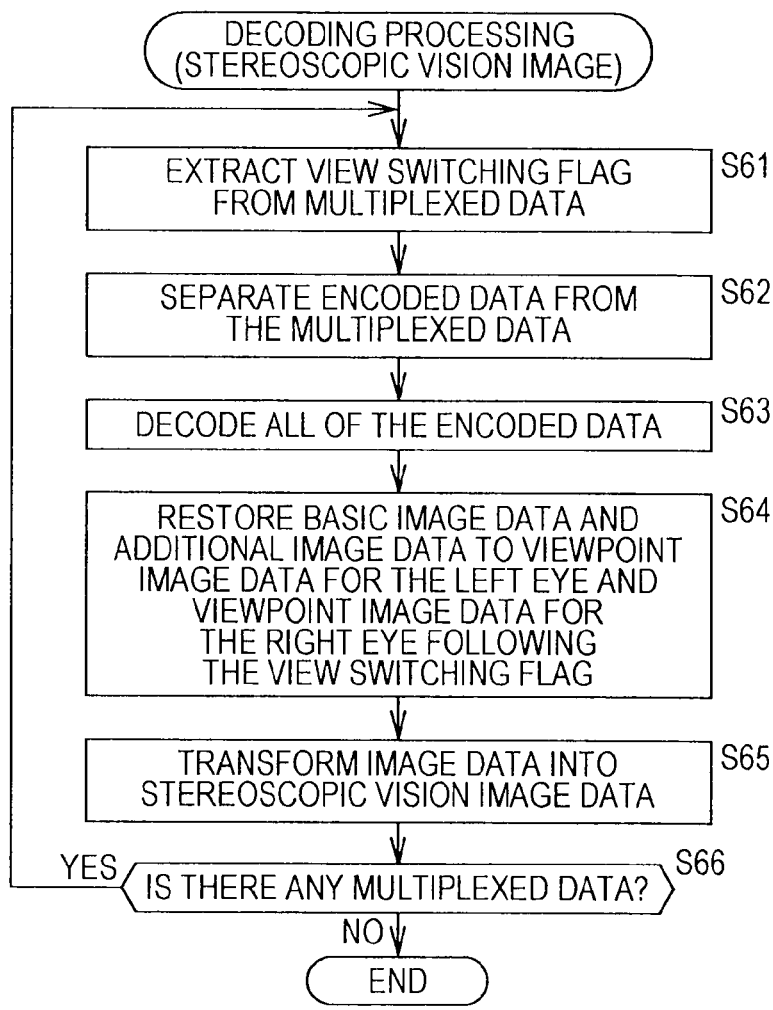
FIG. 13A is a flowchart for describing decoding processing according to the second embodiment.

FIG. 13A is a flowchart for describing the decoding processing of the decoding device in FIG. 12 in the event that display of a stereoscopic vision image is performed.

In the event that display of a stereoscopic vision image is performed, in step S61 the extraction unit 41 extracts a view switching flag from the multiplexed data supplied thereto, supplies to the restoration unit 81, and the processing proceeds to step S62.

In step S62, the extraction unit 41 separates basic encoded data and additional encoded data from the multiplexed data, supplies the basic encoded data to the decoding unit 42₁, and the additional encoded data to the decoding unit 42₂ respectively, and the processing proceeds to step S63.

In step S63, all of the encoded data multiplexed in the multiplexed data are decoded, and the processing proceeds to step S64.

Specifically, the decoding unit 42₁ decodes the basic encoded data from the extraction unit 41, and supplies basic image data obtained as a result thereof to the restoration unit 81. Further, the decoding unit 42₂ decodes the additional encoded data from the extraction unit 41, and supplies additional image data obtained as a result thereof to the restoration unit 81.

In step S64, the restoration unit 81 performs inverse switching of the case of the switching unit 71 in FIG. 9 with the basic image data and additional image data as objects following the view switching flag from the extraction unit 41, thereby restoring the image data for the left eye and image data for the right eye.

Subsequently, the restoration unit 81 supplies the image data for the left eye and the image data for the right eye to the stereoscopic vision image transform unit 43.

Subsequently, the processing sequentially proceeds from step S64 to steps S65 and S66, where the same processing in the case of steps S23 and S24 in FIG. 8A is performed, respectively.

Specifically, in step S65 the stereoscopic vision image transform unit 43 transforms the viewpoint image data for the left eye and viewpoint image data for the right eye from the restoration unit 81 into stereoscopic vision image data, supplies to the unshown device for stereoscopic vision, and the processing proceeds to step S66.

In step S66, the extraction unit 41 determines whether or not there is unprocessed multiplexed data, and in the event that determination is made that there is unprocessed multiplexed data, the processing returns to step S61, and hereafter, the processing in steps S61 through S66 is repeated.

Also, in the event that determination is made in step S66 that there is no unprocessed multiplexed data, the decoding device ends the decoding processing.

Figure 13B:
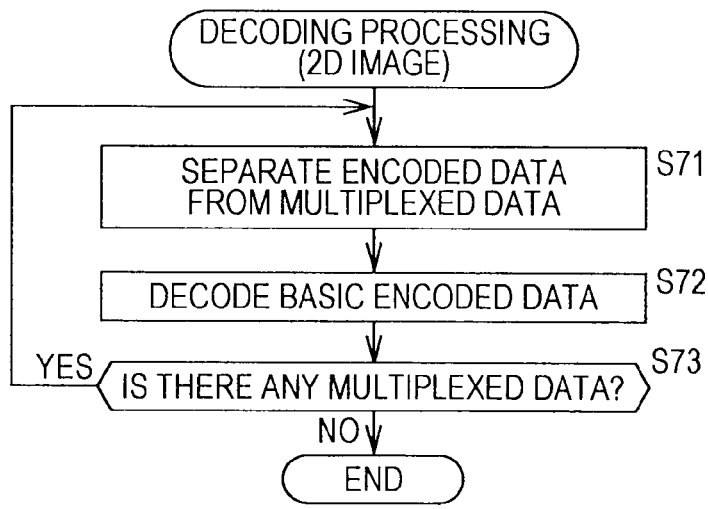
FIG. 13B is a flowchart for describing the decoding processing according to the second embodiment.

FIG. 13B is a flowchart for describing the decoding processing of the decoding device in FIG. 12 in the event that display of a 2D image is performed.

In the event that display of a 2D image is performed, in step S71 the extraction unit 41 separates basic encoded data from the multiplexed data supplied thereto, supplies to the decoding unit $42_1$, and the processing proceeds to step S72.

In step S72, the decoding unit $42_1$ decodes the basic encoded data supplied from the extraction unit 41, and supplies basic image data obtained as a result thereof to the unshown 2D display device.

Accordingly, the image corresponding to the basic image data is displayed as a 2D image at the 2D display device.

Subsequently, the processing proceeds from step S72 to step S73, where the extraction unit 41 determines whether or not there is unprocessed multiplexed data, and in the event that determination is made that there is unprocessed multiplexed data, the processing returns to step S71, and hereafter, the processing in steps S71 through S73 is repeated.

On the other hand, in the event that determination is made in step S73 that there is no unprocessed multiplexed data, the decoding device ends the decoding processing.

As described above, with the encoding device in FIG. 9, one of the image data for the left eye and the image data for the right eye is switched with the other following the view switching flag for specifying image data to be used for display of a 2D image, whereby the image data for the left eye and the image data for the right eye are transformed into basic image data and additional image data, and multiplexed data including the basic image data and additional image data and a view switching flag is generated.

Accordingly, with the decoding device in FIG. 12, in the event that a stereo image content is displayed as a 2D image, of the image for the left eye, and the image for the right eye, an image that the producer of the content intends can be displayed in increments of scenes or the like by displaying the image corresponding to the basic image data.

Also, with the decoding device in FIG. 12, a view switching flag is extracted from the multiplexed data thereof, and following the view switching flag thereof, basic image data and additional image data are restored to the original viewpoint image data for the left eye and viewpoint image data for the right eye.

Accordingly, a stereo image can be displayed at the device for stereoscopic vision.

Note that a view switching flag is a flag for specifying image data to be used for display of a 2D image, but with the decoding device in FIG. 12, viewpoint image data for the left eye, and viewpoint image data for the right eye are separated from basic image data, and additional image data following the view switching flag, respectively. Accordingly, with the decoding device in FIG. 12, the view switching flag serves as a flag for specifying, of the basic image data and additional image data, the viewpoint image data for the left eye and the viewpoint image data for the right eye, respectively.

Also, with the encoding device in FIG. 9, the viewpoint image data for the left eye and the viewpoint image data for the right eye that are the image data of a stereo image are transformed into basic image data and additional image data, and then each of the basic image data and additional image data thereof is encoded.

Accordingly, with regard to the entirety of the basic image data, encoding can be performed by employing encoding parameters so as to suppress deterioration in the image quality of a decoded image (quantization parameter, entropy coding system, and so forth).

Specifically, in the event of encoding each of the viewpoint image data for the left eye, and the viewpoint image data for the right eye, even if encoding parameters for suppressing deterioration in the image quality of a decoded image are employed regarding one of the viewpoint image data for the left eye, and the viewpoint image data for the right eye, deterioration in the image quality of the whole of an image to be displayed as a 2D image is not necessarily suppressed at the decoding device.

On the other hand, with the encoding device in FIG. 9, in order to encode each of the basic image data and the additional image data, encoding parameters for suppressing deterioration in the image quality of a decoded image are employed for encoding of the basic image data to be used for display of a 2D image, whereby deterioration in the image quality of the whole of the image to be displayed as a 2D image can be suppressed at the decoding device.

As described above, with the first and second embodiments, the image data of a stereo image made up of viewpoint image data for the left eye, and viewpoint image data for the right eye that are two viewpoints of image data have been taken as objects to be encoded, but N viewpoints exceeding two of image data can be employed as an object to be encoded.

Therefore, hereafter, embodiments will be described wherein N, exceeding two viewpoints of image data, are taken as an object to be encoded.

Third Embodiment

Third Embodiment of Encoding Device

FIG. 14 is a block diagram illustrating a configuration example of a third embodiment of the encoding device to which the present invention has been applied.

Note that, in FIG. 14, a portion corresponding to the case in FIG. 1 is denoted with the same reference numeral, and hereafter, description thereof will be omitted as appropriate.

The encoding device in FIG. 14 is configured in the same way as with the case in FIG. 1 except that N encoding units $11_1, 11_2, \ldots, 11_N$ are provided instead of the two encoding units $11_1$ and $11_2$.

In FIG. 14, the encoding device encodes the image data of a stereoscopic vision image made up of N, three or more, viewpoints of image data (hereafter, also referred to as viewpoint image data).

That is to say, of the image data of a stereoscopic vision image, the n'th viewpoint image data that is the n'th viewpoint image data is supplied to the encoding unit $11_n$.

The encoding unit $11_n$ encodes the n'th viewpoint image data supplied thereto in accordance with a predetermined coding system, for example, such as MPEG2, AVC/H.264 system, or the like, and supplies encoded data obtained as a result thereof (hereafter, also referred to as "the n'th viewpoint encoded data") to the generating unit 13.

The flag setting unit 12 sets a view switching flag that is a flag for specifying, of N viewpoints of image data of the stereoscopic vision image, image data to be used for display of a 2D image, for example, in response to operations by a user such as a producer of the stereoscopic vision image, and supplies to the generating unit 13.

Note that, with the first embodiment and the second embodiment, as for a view switching flag, as described above, a one-bit flag may be employed, but with the third embodiment (and a later-described fourth embodiment), as for a view switching flag, a flag of which the number of bits is $\log_2 N$ or more may be employed.

Now, in the event that image data to be used for display of a 2D image is the n'th viewpoint image data, let us say that the value of a view switching flag is set to n−1, for example. Note that, in the event that as to a camera whereby the n'th viewpoint image data was shot, an index for identifying the camera thereof is appended, as for the value of a view switching flag for specifying the n'th viewpoint image data as image data to be used for display of a 2D image, the index of the camera whereby the n'th viewpoint image data thereof was shot may be employed.

The generating unit 13 generates and outputs a bit stream including the image data of the stereoscopic vision image, and the view switching flag.

That is to say, the generating unit 13 multiplexes the first viewpoint encoded data through the N'th viewpoint encoded data from the encoding units $11_1$ through $11_N$ respectively to obtain multiplexed data, and includes the view switching flag from the flag setting unit 12 in the header or the like of the multiplexed data thereof.

Description of Processing of Encoding Device

Figure 15:
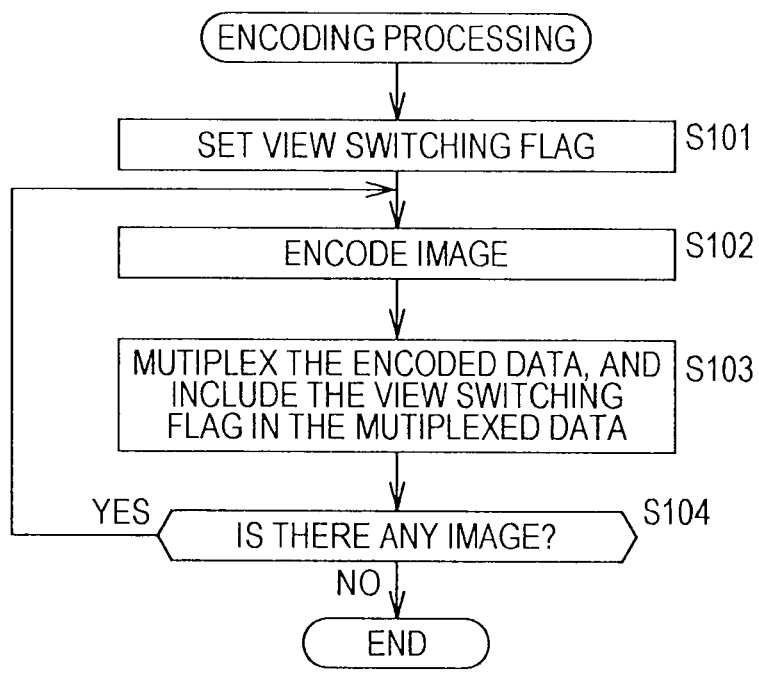
FIG. 15 is a flowchart for describing encoding processing according to the third embodiment.

Processing (encoding processing) of the encoding device in FIG. 14 will be described with reference to FIG. 15.

With the encoding device in FIG. 14, upon the flag setting unit 12 being operated by the producer of a stereoscopic image, in step S101 the flag setting unit 12 sets a view switching flag as to each scene of the stereoscopic vision image following the operations of the producer of the stereoscopic vision image, and supplies to the generating unit 13.

Subsequently, after awaiting the first viewpoint image data through the N'th viewpoint image data that are the image data of the stereoscopic vision image being supplied to the encoding device, the processing proceeds from step S101 to step S102, where the encoding units $11_1$ through $11_N$ perform encoding.

Specifically, the encoding unit $11_n$ encodes the n'th viewpoint image data, and supplies the n'th viewpoint encoded data obtained as a result thereof to the generating unit 13.

Subsequently, the processing proceeds from step S102 to step S103, where the generating unit 13 multiplexes the first viewpoint encoded data through the N'th viewpoint encoded data from the encoding units $11_1$ through $11_N$ respectively to obtain multiplexed data. Further, the generating unit 13 includes the view switching flag from the flag setting unit 12 in the header of the multiplexed data, and outputs the multiplexed data.

Subsequently, the processing proceeds from step S103 to step S104, where the encoding device determines whether or not there is the image data of a stereoscopic vision image to be encoded, and in the event that determination is made that there is the image data, the processing returns to step S102, and hereafter, the processing in steps S102 through S104 is repeated.

On the other hand, in the event that determination is made in step S104 that there is no image data of a stereoscopic vision image to be encoded, the encoding device ends the encoding processing.

In this way, a bit stream including the multiplexed data that the generating unit 13 outputs, i.e., (encoded data encoded from) the image data of a stereoscopic vision image, and a view switching flag are transmitted via a transmission medium or recorded in a recording medium, for example.

Third Embodiment of Decoding Device

Figure 16:
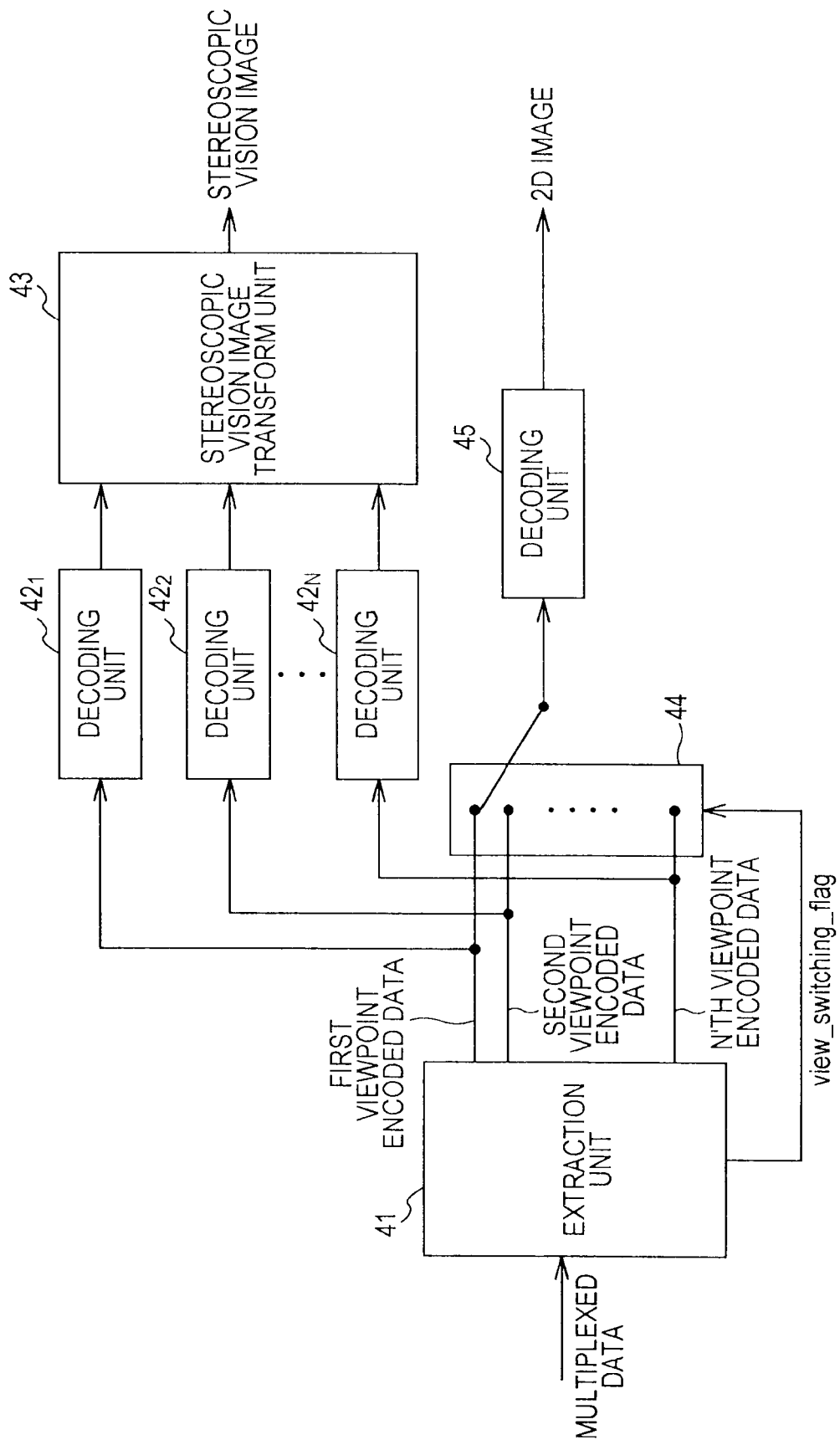
FIG. 16 is a block diagram illustrating a configuration example of the third embodiment of a decoding device to which the present invention has been applied.

FIG. 16 is a block diagram illustrating a configuration example of the third embodiment of the decoding device to which the present invention has been applied.

Note that, in FIG. 16, a portion corresponding to the case in FIG. 5 is denoted with the same reference numeral, and hereafter, description thereof will be omitted as appropriate.

The decoding device in FIG. 16 is configured in the same way as with the case in FIG. 5 except that N decoding units $42_1, 42_2, \ldots, 42_N$ are provided instead of the decoding units $42_1$ and $42_2$.

In FIG. 16, the decoding device decodes the multiplexed data that the encoding device in FIG. 14 outputs.

Specifically, the extraction unit 41 extracts a view switching flag from the multiplexed data supplied thereto, and supplies to the selecting unit 44.

Also, the extraction unit 41 separates the first viewpoint encoded data through the N'th viewpoint encoded data from the multiplexed data, and supplies the n'th viewpoint encoded data to the decoding unit $42_n$.

Further, the extraction unit 41 supplies all of the first viewpoint encoded data through the N'th viewpoint encoded data to the selecting unit 44.

The decoding unit $42_n$ decodes the n'th viewpoint encoded data from the extraction unit 41, and supplies the n'th viewpoint image data obtained as a result thereof to the stereoscopic vision image transform unit 43.

The stereoscopic vision image transform unit 43 transforms the first viewpoint image data through the N'th viewpoint image data supplied from the decoding units $42_1$ through $42_N$ respectively into stereoscopic vision image data, and supplies to the unshown device for stereoscopic vision.

The selecting unit 44 selects, following the view switching flag for each scene or the like supplied from the extraction unit 41, one piece of the first viewpoint encoded data through the N'th viewpoint encoded data similarly supplied from the extraction unit 41 as the encoded data of image data to be used for display of a 2D image, and supplies to the decoding unit 45 as selected encoded data.

The decoding unit 45 decodes the selected encoded data supplied from the selecting unit 44, and supplies image data obtained as a result thereof (one of the first viewpoint encoded data through the N'th viewpoint encoded data) to the unshown 2D display device.

Description of Processing of Decoding Device

Processing (decoding processing) of the decoding device in FIG. 16 will be described with reference to FIG. 17A and FIG. 17B.

Figure 17A:
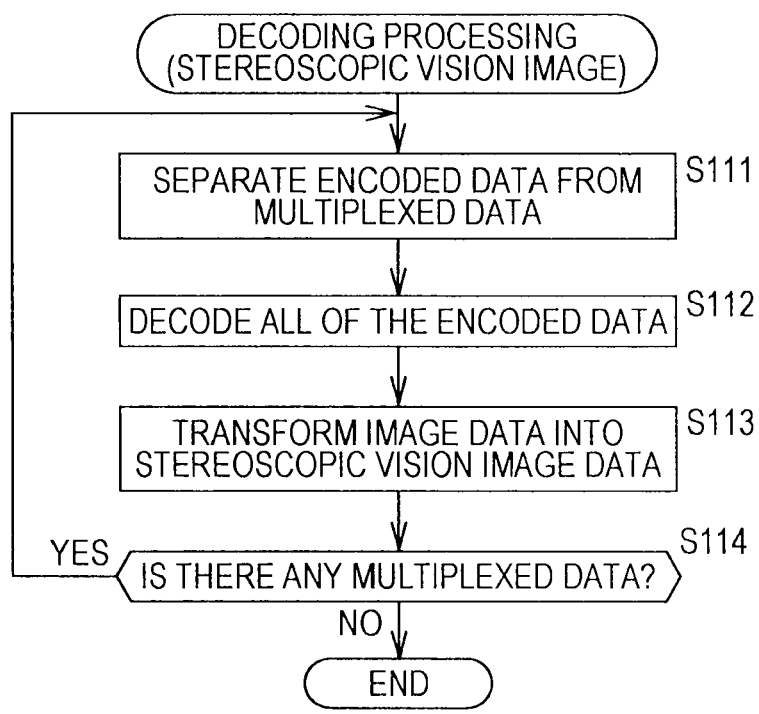
FIG. 17A is a flowchart for describing decoding processing according to the third embodiment.

FIG. 17A is a flowchart for describing the decoding processing of the decoding device in FIG. 16 in the event that display of a stereoscopic vision image is performed.

In the event that display of a stereoscopic vision image is performed, in step S111 the extraction unit 41 separates each of the first viewpoint encoded data through the N'th viewpoint encoded data from multiplexed data supplied thereto. Further, the extraction unit 41 supplies the n'th viewpoint encoded data to the decoding unit $42_n$, and the processing proceeds from step S111 to step S112.

In step S112, all of the first viewpoint encoded data through the N'th viewpoint encoded data multiplexed into the multiplexed data are decoded, and the processing proceeds to step S113.

Specifically, the decoding unit $42_n$ decodes the n'th viewpoint encoded data from the extraction unit 41, and supplies n'th viewpoint image data obtained as a result thereof to the stereoscopic vision image transform unit 43.

In step S113, the stereoscopic vision image transform unit 43 transforms the first viewpoint image data through the N'th viewpoint image data supplied from the decoding unit $42_1$ through $42_N$ respectively into stereoscopic vision image data, supplies to an unshown device for stereoscopic vision, and the processing proceeds to step S114.

In step S114, the extraction unit 41 determines whether or not there is unprocessed multiplexed data, and determination is made that there is unprocessed multiplexed data, the processing returns to step S111, and hereafter, the processing in steps S111 through S114 is repeated.

Also, determination is made in step S114 that there is no unprocessed multiplexed data, the decoding device ends the decoding processing.

Figure 17B:
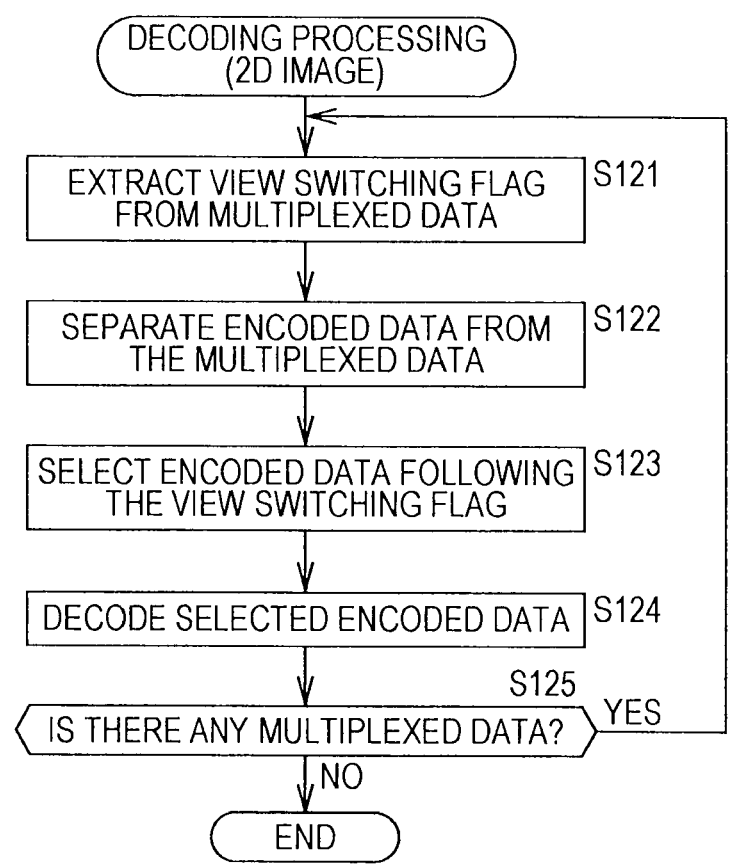
FIG. 17B is a flowchart for describing the decoding processing according to the third embodiment.

FIG. 17B is a flowchart for describing decoding processing of the decoding device in FIG. 16 in the event that display of a 2D image is performed.

In the event that display of a 2D image is performed, in step S121 the extraction unit 41 extracts a view switching flag from multiplexed data supplied thereto, supplies to the selecting unit 44, and the processing proceeds to step S122.

In step S122, the extraction unit 41 separates the first viewpoint encoded data through the N'th viewpoint encoded data from the multiplexed data, supplies to the selecting unit 44, and the processing proceeds to step S123.

In step S123, the selecting unit 44 selects, following the view switching flag from the extraction unit 41, one of the first viewpoint encoded data through the N'th viewpoint encoded data from the extraction unit 41 as selected encoded data.

Specifically, in the event that the value of the view switching flag from the extraction unit 41 is n−1, the selecting unit 44 selects, of the first viewpoint encoded data through the N'th viewpoint encoded data from the extraction unit 41, the n'th viewpoint encoded data as selected encoded data.

Subsequently, the selecting unit 44 supplies the selected encoded data to the decoding unit 45, and the processing proceeds from step S123 to step S124.

In step S124, the decoding unit 45 decodes the selected encoded data supplied from the selecting unit 44, supplies image data obtained as a result thereof to the unshown 2D display device, and the processing proceeds to step S125.

In step S125, the extraction unit 41 determines whether or not there is unprocessed multiplexed data, and in the event that determination is made that there is unprocessed multiplexed data, the processing returns to step S121, and hereafter, the processing in steps S121 through S125 is repeated.

On the other hand, in the event that determination is made in step S125 that there is no unprocessed multiplexed data, the decoding device ends the decoding processing.

In this way, with the decoding device in FIG. 14, multiplexed data including the first viewpoint image data through the N'th viewpoint image data that are N viewpoints of image data, and a view switching flag is generated. Subsequently, with the decoding device in FIG. 16, the view switching flag is extracted from the multiplexed data thereof, and following the view switching flag thereof, image data to be used for display of a 2D image is selected from the first viewpoint image data through the N'th viewpoint image data in increments of scenes or the like.

Accordingly, image data to be used for display of a 2D image can be specified by a view switching flag, and accordingly, in the event that a stereoscopic vision image content is displayed as a 2D image, of the first viewpoint image data through the N'th viewpoint image data, an image that the producer of the content intends can be displayed in increments of scenes or the like.

Fourth Embodiment

Fourth Embodiment of Encoding Device

FIG. 18 is a block diagram illustrating a configuration example of a fourth embodiment of the encoding device to which the present invention has been applied.

Note that, in the drawing, a portion corresponding to the case in FIG. 9 or FIG. 14 is denoted with the same reference numeral, and hereafter, description thereof will be omitted as appropriate.

The encoding device in FIG. 18 is configured in the same way as with the case in FIG. 9 except that N encoding units $11_1, 11_2, \ldots, 11_N$ are provided instead of the encoding units $11_1$ and $11_2$.

The first viewpoint image data through the N'th viewpoint image data of a stereoscopic vision image are supplied to the switching unit 71.

The switching unit 71 switches, following the view switching flag from the flag setting unit 12, one viewpoint of image data of the first viewpoint image data through the N'th viewpoint image data that are N viewpoints of image data with another viewpoint of image data, thereby transforming the N pieces of the first viewpoint image data through the N'th viewpoint image data into one piece of basic image data that is image data to be used for display of a 2D image, and N−1 pieces of additional image data #1 through #N−1 that are image data not to be used for display of a 2D image.

Note that the switching unit 71 supplies the basic image data to the encoding unit $11_1$, and supplies the additional image data #n to the encoding unit $11_{n+1}$.

Therefore, in FIG. 18, the encoding unit $11_1$ encodes the basic image data from the switching unit 71, and supplies encoded data obtained as a result thereof (basic encoded data) to the generating unit 13.

Also, the encoding unit $11_{n+1}$ encodes the additional image data #n from the switching unit 71, and supplies encoded data obtained as a result thereof (hereafter, also referred to as "additional encoded data #n") to the generating unit 13.

Subsequently, the generating unit 13 multiplexes the basic encoded data from the encoding unit $11_1$, and the additional encoded data #1 through #N−1 from the encoding units $11_2$ through $11_N$ to obtain multiplexed data, and includes the view switching flag from the flag setting unit 12 in the header or the like of the multiplexed data thereof.

Accordingly, in FIG. 18, the multiplexed data obtained at the generating unit 13 includes one piece of basic image data, N−1 pieces of additional image data #1 through #N−1, and a view switching flag.

Description of Processing of Switching Unit 71

Processing of the switching unit 71 in FIG. 18 will be described with reference to FIG. 19.

Note that, hereafter, an image corresponding to the n'th viewpoint image data will also be referred to as the n'th viewpoint image.

Now, let us say that a stereoscopic vision image to be encoded at the encoding device in FIG. 18 is made up of, for example, the scene #1, #2, #3, #4, and #5, and also, the image data is made up of first viewpoint image data, second viewpoint image data, and third viewpoint image data that are three viewpoints of image data.

Further, in the event that a stereoscopic vision image is displayed as a 2D image, let us say that the producer of the stereoscopic vision image has operated the flag setting unit 12 so as to select the first viewpoint image regarding the scene #1 and scene #4, the second viewpoint image regarding the scenes #2 and #3, the third viewpoint image regarding the scene #5 as images (presentation images) to be displayed as 2D images, as illustrated by being surrounded with a thick frame in the drawing.

In this case, with regard to the scenes #1 and #4, the flag setting unit 12 sets, for example, 0 as a view switching flag, which is a value for specifying the first viewpoint image as a presentation image.

Also, with regard to the scenes #2 and #3, the flag setting unit 12 sets, for example, 1 as a view switching flag, which is a value for specifying the second viewpoint image as a presentation image.

Further, with regard to the scene #5, the flag setting unit 12 sets, for example, 2 as a view switching flag, which is a value for specifying the third viewpoint image as a presentation image.

The switching unit 71 switches, as described above, following the view switching flag, one viewpoint of image data of the first viewpoint image data through the third viewpoint image data that are three viewpoints of image data with another viewpoint of image data, thereby transforming the three pieces of the first viewpoint image data through the third viewpoint image data into one piece of basic image data and two pieces of additional image data #1 and #2, by switching in increments of scenes set with view switching flags, or the like.

Specifically, for example, with the second viewpoint image data that is one piece of the three pieces of the first viewpoint image data through the third viewpoint image data, as a reference, with regard to a scene of the second viewpoint image data of which the view switching flag does not specify the second viewpoint image data that is the reference, i.e., a scene of which the view switching flag specifies the first viewpoint image data or the third viewpoint image data, the switching unit 71 switches the second viewpoint image data of the scene thereof with the image data specified by the view switching flag.

Figure 19:
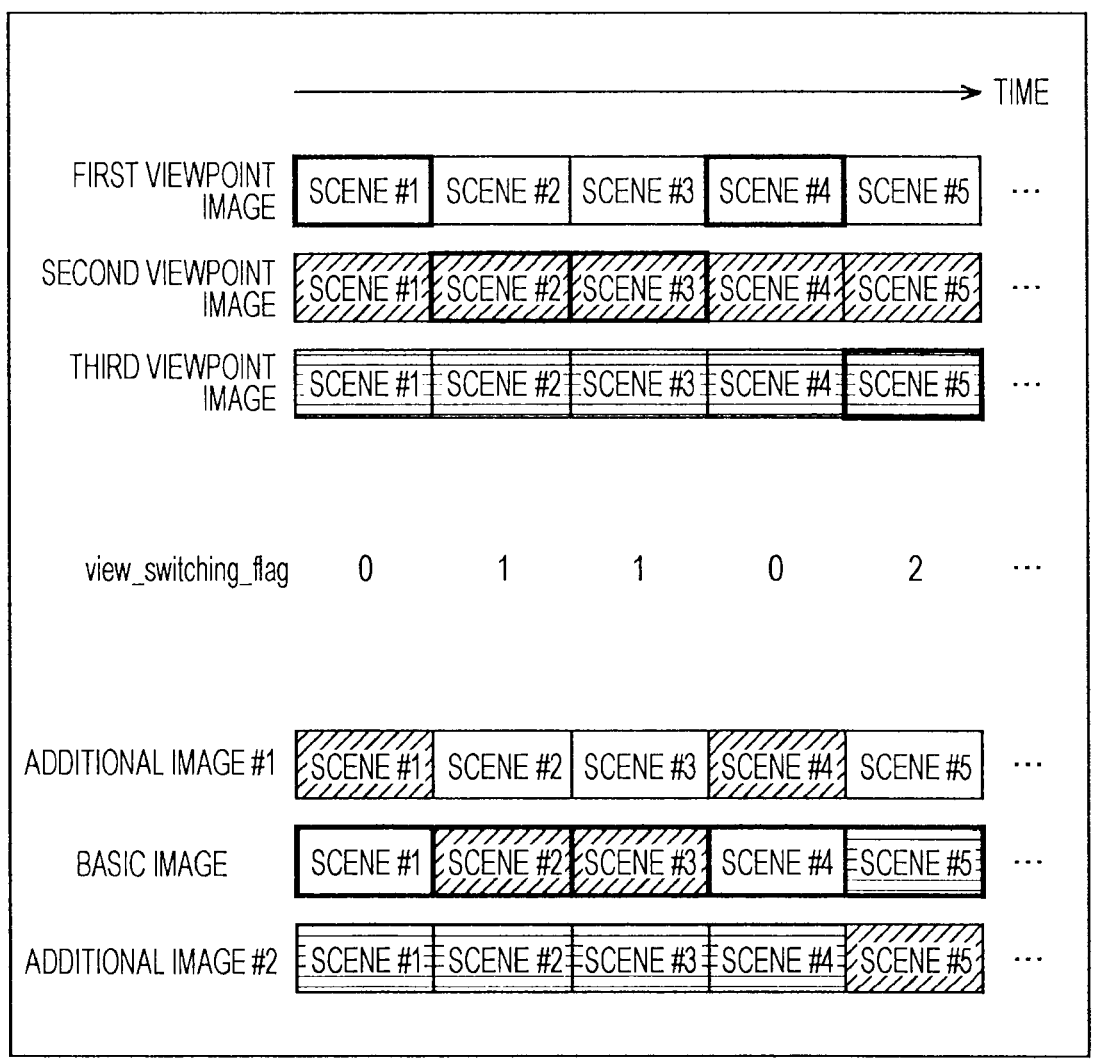
FIG. 19 is a diagram for describing the processing of a switching unit 71 according to the fourth embodiment.

In FIG. 19, of the scenes #1 through #5 of the second viewpoint image data that is the reference, the scenes #1 and #4 are scenes of which the view switching flags do not specify the second viewpoint image data but the first viewpoint image data. Accordingly, of the scenes #1 through #5 of the second viewpoint image data, the data of the scenes #1 and #4 are switched with the data of the scenes #1 and #4 of the first viewpoint image data, respectively.

Further, in FIG. 19, of the scenes #1 through #5 of the second viewpoint image data that is the reference, the scene #5 is a scene of which the view switching flag does not specify the second viewpoint image data but the third viewpoint image data. Accordingly, of the scenes #1 through #5 of the second viewpoint image data, the data of the scene #5 is switched with the data of the scene #5 of the third viewpoint image data.

Subsequently, with regard to the second viewpoint image data, image data obtained by switching the image data of a scene with the first viewpoint image data or third viewpoint image data other than the reference is taken as basic image data.

Also, with regard to the first viewpoint image data, image data obtained by switching the image data of a scene with the second viewpoint image data that is the reference is taken as additional image data #1. Further, with regard to the third viewpoint image data, image data obtained by switching the image data of a scene with the second viewpoint image data that is the reference is taken as additional image data #2.

In this case, with the basic image data, the data of the scenes #1 and #4 are taken as the first viewpoint image data, the data of the scenes #2 and #3 are taken as the second viewpoint image data, and the data of the scene #5 is taken as the third viewpoint image data, respectively.

That is to say, the basic image data is data that the view switching flag specifies as image data to be used for display of a 2D image.

Accordingly, in the event that a stereoscopic vision image is displayed as a 2D image, an image that a contents producer intends can be displayed in increments of scenes or the like just by displaying the image corresponding to the basic image data.

On the other hand, with the additional image data #1, the data of the scenes #1 and #4 are the second viewpoint image data, and the data of the scenes #2, #3, and #5 are the first viewpoint image data, respectively.

Further, with the additional image data #2, the data of the scenes #1 through #4 are the third viewpoint image data, and the data of the scene #5 is the second viewpoint image data, respectively.

The additional image data #1 and #2 are unnecessary for display of a 2D image, and are used at the time of displaying a stereoscopic vision image (stereoscopic vision image) along with basic image data.

Description of Processing of Encoding Device

Figure 20:
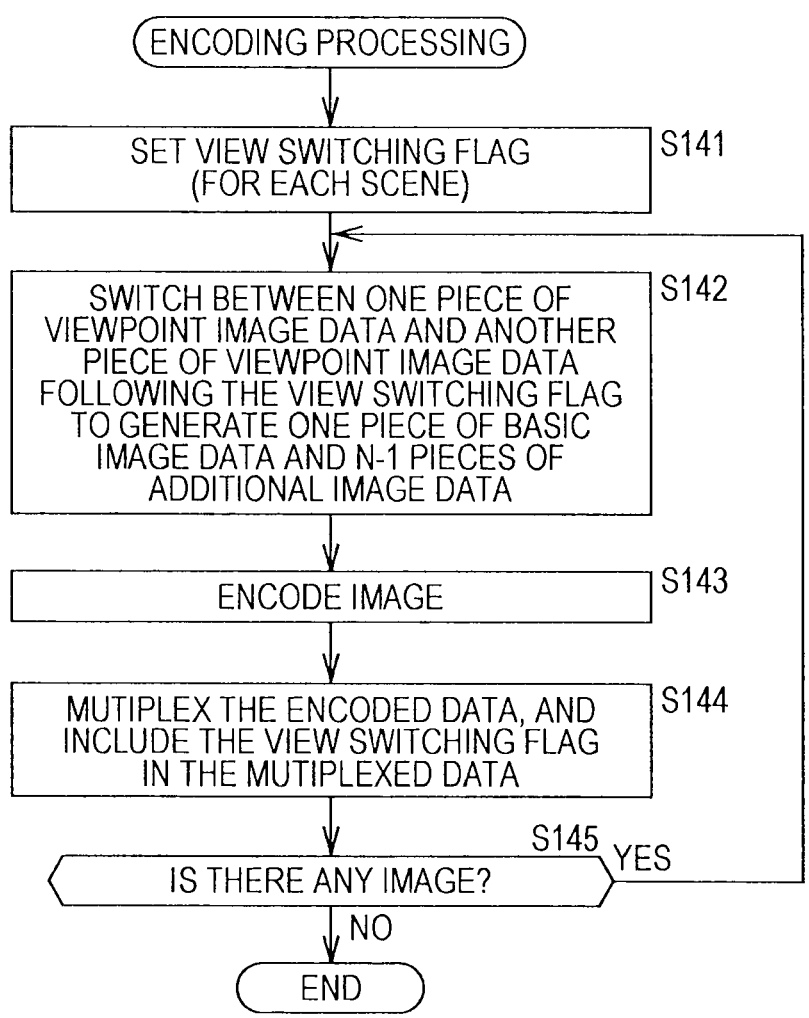
FIG. 20 is a flowchart for describing encoding processing according to the fourth embodiment.

Processing (encoding processing) of the encoding device in FIG. 18 will be described with reference to FIG. 20.

With the encoding device in FIG. 18, upon the flag setting unit 12 being operated by the producer of a stereoscopic vision image, in step S141 the flag setting unit 12 sets a view switching flag as to each scene of the stereoscopic vision image following the operation of the producer of the stereoscopic vision image, and supplies to the generating unit 13 and the switching unit 71.

Subsequently, after awaiting the first viewpoint image data through the N'th viewpoint image data, that are the image data of the stereoscopic vision image, to be supplied to the encoding device, the processing proceeds from step S141 to step S142, where the switching unit 71 switches one viewpoint of image data of the first viewpoint image data through the N'th viewpoint image data with another viewpoint of image data following the view switching flag from the flag setting unit 12 as described in FIG. 19, thereby transforming the first viewpoint image data through the N'th viewpoint image data into one piece of basic image data, and N−1 pieces of additional image data #1 through #N−1 (generating one piece of basic image data and N−1 pieces of additional image data #1 through #N−1 from the first viewpoint image data through the N'th viewpoint image data).

After the processing in step S142, the switching unit 71 supplies the basic image data to the encoding unit 11$_1$, and also supplies the additional image data #n to the encoding unit 11$_{n+1}$.

Subsequently, the processing proceeds to step S143, where the encoding unit 11$_1$ encodes the based image data from the switching unit 71, and supplies basic encoded data obtained as a result thereof to the generating unit 13. Further, in step S143, the encoding unit 11$_{n+1}$ encodes the additional image data #n from the switching unit 71, and supplies additional encoded data #n obtained as a result thereof to the generating unit 13, and the processing proceeds to step S144.

In step S144, the generating unit 13 multiplexes the basic encoded data from the encoding unit 11$_1$, and the additional encoded data #1 through #N−1 from the encoding units 11$_2$ through $11_N$ to obtain multiplexed data from each. Further, the generating unit 13 includes the view switching flag from the flag setting unit 12 in the header of the multiplexed data, and outputs the multiplexed data.

Subsequently, the processing proceeds from step S144 to step S145, where the encoding device determines whether or not there is the image data of a stereoscopic vision image to be encoded, and in the event that determination is made that there is the image data of a stereoscopic vision image to be encoded, the processing returns to step S142, and hereafter, the processing in steps S142 through S145 is repeated.

On the other hand, in the event that determination is made in step S145 that there is no image data of a stereoscopic vision image to be encoded, the encoding device ends the encoding processing.

As described above, a bit stream including the multiplexed data that the generating unit 13 outputs, i.e., (the encoded data encoded from) the one piece of basic image data and N−1 pieces of additional image data transformed from the image data of the stereoscopic vision image, and a view switching flag is transmitted via a transmission medium, or recorded in a recording medium, for example.

Fourth Embodiment of Decoding Device

Figure 21:
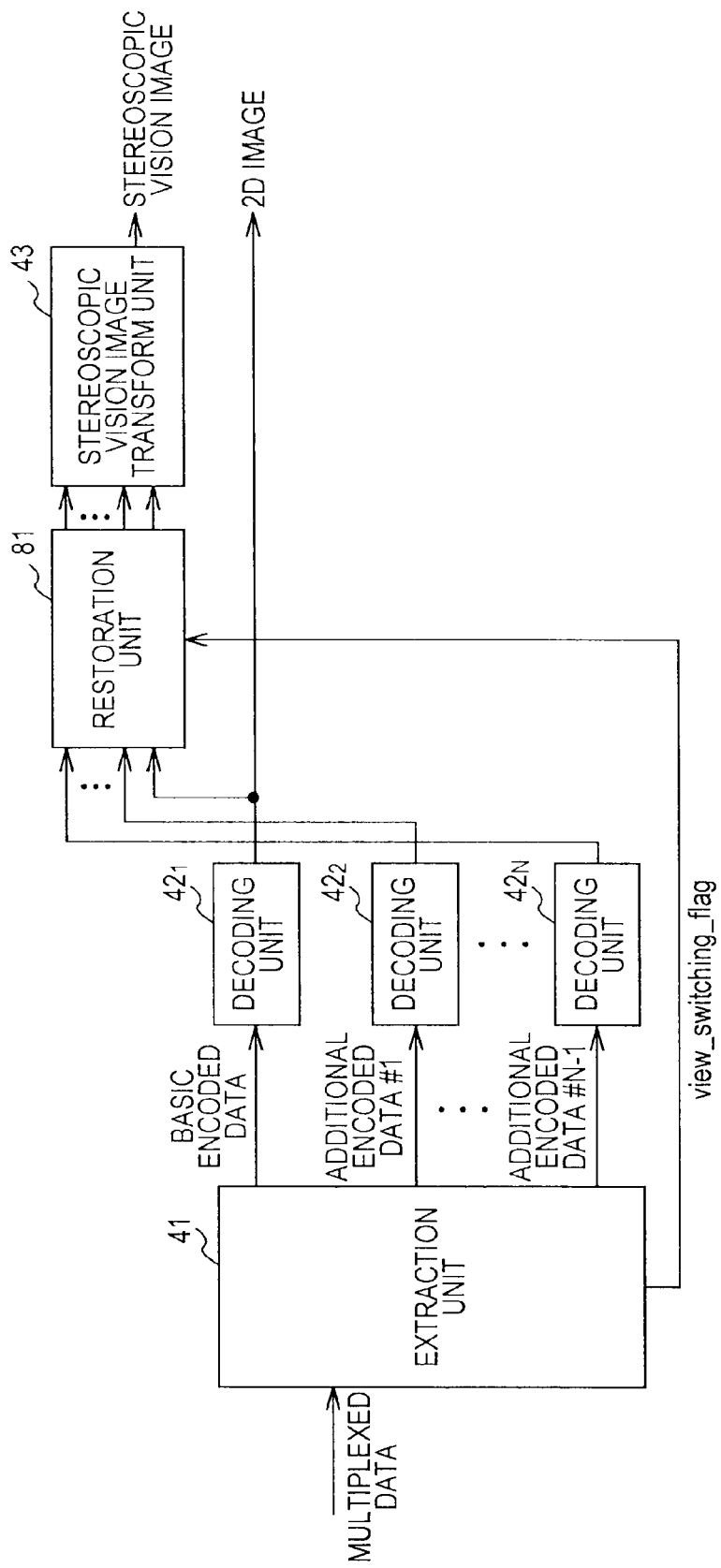
FIG. 21 is a block diagram illustrating a configuration example of the fourth embodiment of a decoding device to which the present invention has been applied.

FIG. 21 is a block diagram illustrating a configuration example of the fourth embodiment of the decoding device to which the present invention has been applied.

Note that, in the drawing, a portion corresponding to the case in FIG. 12 or FIG. 16 is denoted with the same reference numeral, and hereafter, description thereof will be omitted as appropriate.

The decoding device in FIG. 21 is configured in the same way as with the case in FIG. 12 except that N decoding units $42_1$ and $42_N$ are provided instead of the decoding units $42_1$ and $42_2$.

In FIG. 21, the decoding device decodes multiplexed data that the encoding device in FIG. 18 outputs.

Here, the multiplexed data that the encoding device in FIG. 18 outputs includes one piece of basic encoded data and N−1 pieces of additional encoded data #1 through #N−1.

Therefore, with the decoding device in FIG. 21, the extraction unit 41 separates the one piece of basic encoded data and each of the N−1 pieces of additional encoded data #1 through #N−1 from the multiplexed data. Subsequently, the extraction unit 41 supplies the basic encoded data to the decoding unit $42_1$, and supplies the additional encoded data #n to the decoding unit $42_{n+1}$, respectively.

The decoding unit $42_1$ decodes the basic encoded data from the extraction unit 41, and the decoding unit $42_{n+1}$ decodes the additional encoded data #n from the extraction unit 41.

The basic image data obtained by the decoding unit $42_1$ decoding the basic encoded data, and the additional image data #n obtained by the decoding unit $42_{n+1}$ decoding the additional encoded data #n are supplied to the restoration unit 81.

Here, in the event that a stereoscopic vision image is displayed as a 2D image, the basic image data obtained by the decoding unit $42_1$ decoding the basic encoded data is supplied to the unshown 2D display device. Subsequently, the image corresponding to the basic image data from the decoding unit $42_1$ is displayed at the 2D display device.

As described above, the basic image data is supplied to the restoration unit 81 from the decoding unit $42_1$, and also the additional image data #n is supplied from the decoding unit $42_{n+1}$, and additionally, a view switching flag extracted from the multiplexed data is supplied from the extraction unit 41.

The restoration unit 81 switches between the basic image data form the decoding unit $42_1$ and the additional image data #n from the decoding unit $42_{n+1}$ following the view switching flag from the extraction unit 41, thereby transforming the basic image data and N−1 pieces of additional image data #1 through #N−1 into the original N pieces of the first viewpoint image data through the N'th viewpoint image data.

Specifically, the restoration unit 81 performs inverse switching of the case of the switching unit 71 in FIG. 18 with the basic image data and N−1 pieces of additional image data #1 through #N−1 as objects following the view switching flag from the extraction unit 41, thereby restoring the N pieces of the first viewpoint image data through the N'th viewpoint image data.

Subsequently, the restoration unit 81 supplies the first viewpoint image data through the N'th viewpoint image data to the stereoscopic vision image transform unit 43.

The stereoscopic vision image transform unit 43 transforms the first viewpoint image data through the N'th viewpoint image data from the restoration unit 81 into stereoscopic vision image data, and supplies the unshown device for stereoscopic vision.

Description of Processing of Decoding Device

Processing (decoding processing) of the decoding device in FIG. 21 will be described with reference to FIG. 22A and FIG. 22B.

Figure 22A:
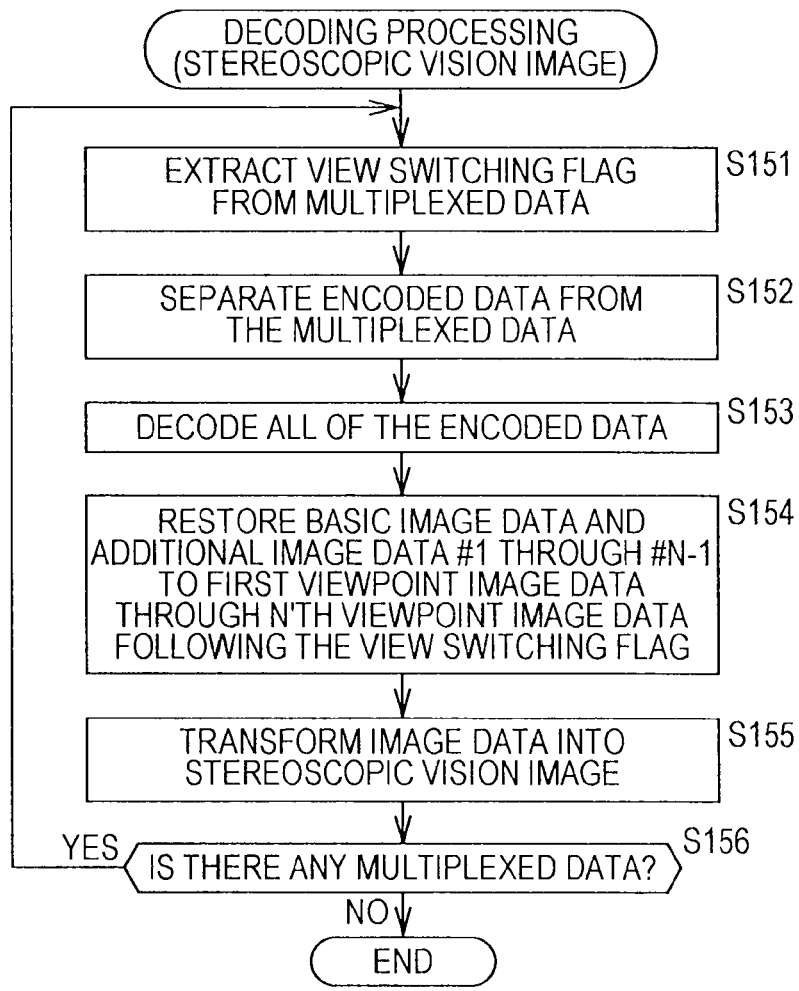
FIG. 22A is a flowchart for describing decoding processing according to the fourth embodiment.

FIG. 22A is a flowchart for describing the decoding processing of the decoding device in FIG. 21 in the event that display of a stereoscopic vision image is performed.

In the event that display of a stereoscopic vision image is performed, in step S151 the extraction unit 41 extracts a view switching flag from the multiplexed data supplied thereto, supplies to the restoration unit 81, and the processing proceeds to step S152.

In step S152, the extraction unit 41 separates basic encoded data and N−1 pieces of additional encoded data #1 through #N−1 from the multiplexed data, supplies the basic encoded data to the decoding unit $42_1$, and the additional encoded data #n to the decoding unit $42_{n+1}$ respectively, and the processing proceeds to step S153.

In step S153, all of the encoded data multiplexed in the multiplexed data are decoded, and the processing proceeds to step S154.

Specifically, the decoding unit $42_1$ decodes the basic encoded data from the extraction unit 41, and supplies basic image data obtained as a result thereof to the restoration unit 81. Further, the decoding unit decodes the additional encoded data #n from the extraction unit 41, and supplies additional image data #n obtained as a result thereof to the restoration unit 81.

In step S154, the restoration unit 81 performs inverse switching of the case of the switching unit 71 in FIG. 18 with the basic image data and N−1 pieces of additional image data #1 through #N−1 as objects following the view switching flag from the extraction unit 41, thereby restoring the N pieces of the first viewpoint image data through the N'th viewpoint image data.

Subsequently, the restoration unit 81 supplies the first viewpoint image data through the N'th viewpoint image data to the stereoscopic vision image transform unit 43.

Subsequently, the processing sequentially proceeds from step S154 to step S155, where the stereoscopic vision image transform unit 43 transforms the first viewpoint image data through the N'th viewpoint image data from the restoration unit 81 into stereoscopic vision image data, supplies to the unshown device for stereoscopic vision, and the processing proceeds to step S156.

In step S156, the extraction unit 41 determines whether or not there is unprocessed multiplexed data, and determination is made that there is unprocessed multiplexed data, the processing returns to step S151, and hereafter, the processing in steps S151 through S156 is repeated.

Also, determination is made in step S156 that there is no unprocessed multiplexed data, the decoding device ends the decoding processing.

Figure 22B:
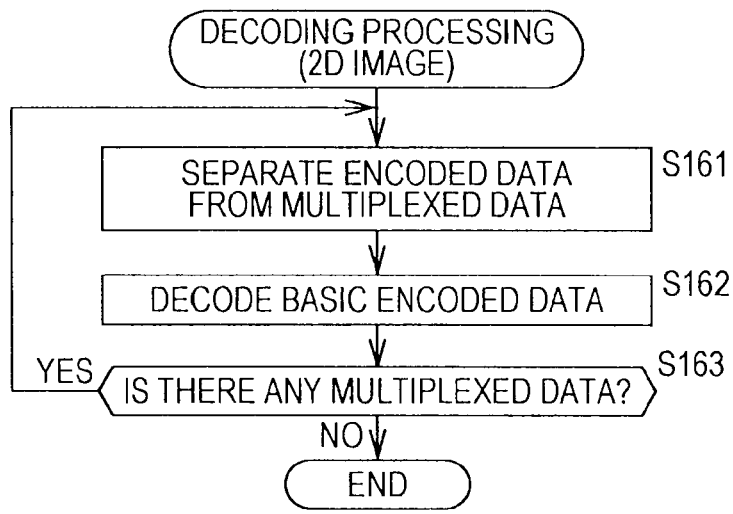
FIG. 22B is a flowchart for describing the decoding processing according to the fourth embodiment.

FIG. 22B is a flowchart for describing decoding processing of the decoding device in FIG. 21 in the event that display of a 2D image is performed.

In the event that display of a 2D image is performed, in step S161 the extraction unit 41 separates basic encoded data from multiplexed data supplied thereto, supplies to the decoding unit $42_1$, and the processing proceeds to step S162.

In step S162, the decoding unit $42_1$ decodes the basic encoded data supplied from the extraction unit 41, and supplies basic image data obtained as a result thereof to the unshown 2D display device.

Accordingly, with the 2D display device, the image corresponding to the basic image data is displayed as a 2D image.

Subsequently, the processing proceeds from step S162 to step S163, where the extraction unit 41 determines whether or not there is unprocessed multiplexed data, and in the event that determination is made that there is unprocessed multiplexed data, the processing returns to step S161, and hereafter, the processing in steps S161 through S163 is repeated.

On the other hand, in the event that determination is made in step S163 that there is no unprocessed multiplexed data, the decoding device ends the decoding processing.

As described above, with the encoding device in FIG. 18, of the N pieces of the first viewpoint image data through the N'th viewpoint image data, one viewpoint of image data is switched with another viewpoint of image data following the a view switching flag for specifying image data to be used for display of a 2D image, whereby the N pieces of the first viewpoint image data through the N'th viewpoint image data are transformed into one piece of basic image data, and N−1 pieces of additional image data #1 through #N−1, and multiplexed data including the basic image data, additional image data #1 through #N−1, and view switching flag is generated.

Accordingly, with the decoding device in FIG. 21, in the event that a stereoscopic vision image content is displayed as a 2D image, of the N pieces of the first viewpoint image data through the N'th viewpoint image data, an image that the contents producer intends can be displayed in increments of scenes or the like by displaying the image corresponding to the basic image data.

Also, with the decoding device in FIG. 21, a view switching flag is extracted from the multiplexed data thereof, and following the view switching flag thereof, basic image data and N−1 pieces of additional image data #1 through #N−1 are restored to the original N pieces of the first viewpoint image data through the N'th viewpoint image data.

Accordingly, a stereoscopic vision image can be displayed at the device for stereoscopic vision.

Note that, with the above encoding device and decoding device, processing may also be performed with a multiple-viewpoint image other than a stereoscopic vision image as an object.

Specifically, with the above encoding device and decoding device, for example, processing may be performed with a two-viewpoint image VB of an image obtained by a camera which takes an image with a certain actor A as the main, and an image VA obtained by the camera which takes an image with another actor B as the main, as an object.

In this case, for example, means for selecting one of the images VA and VB according to the user's operation are provided to the decoding device, whereby the user can view an image with an actor who the user is interested as the main.

However, in this case, the images VA and VB are not stereoscopic vision images, and accordingly, display of an image is restricted to display of a 2D image, and display of a stereoscopic vision image is not allowed.

Embodiment of Computer to Which Present Invention Has Been Applied

Next, the above series of processing may be performed by hardware, or may be performed by software. In the event that the series of processing are preformed by software, a program making up the software thereof is installed into a general-purpose computer or the like.

Figure 23:
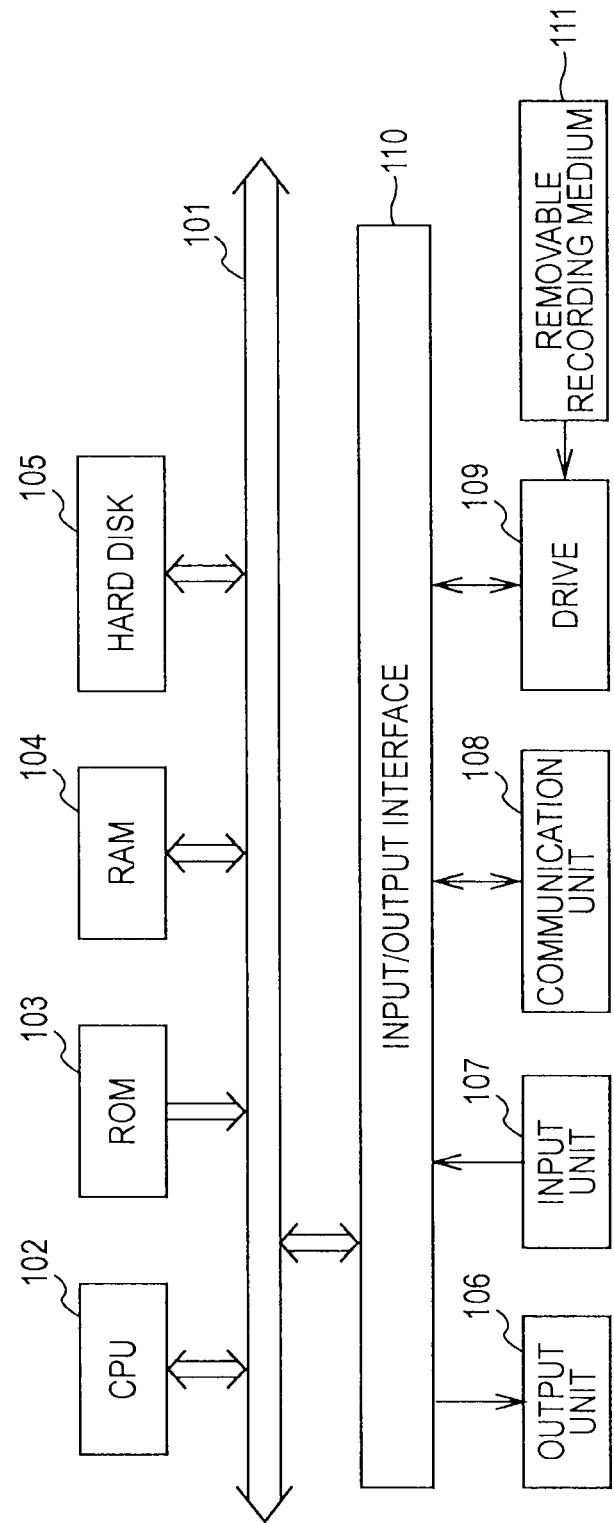
FIG. 23 is a block diagram illustrating a configuration example of an embodiment of a computer to which the present invention has been applied.

Therefore, FIG. 23 illustrates a configuration example of an embodiment of a computer into which the program which executes the above series of processing is installed.

The program may be recorded in a hard disk 105 or ROM 103 serving as a recording medium built into the computer beforehand.

Alternatively, the program may be stored (recorded) in a removable recording medium 111. Such a removable recording medium 111 may be provided as so-called package software. Here, examples of the removable recording medium 111 include flexible disks, CD-ROM (Compact Disc Read Only Memory), MO (Magneto Optical) disks, DVD (Digital Versatile Disc), magnetic disks, semiconductor memory, and so forth.

Note that the program may be installed into the computer from the removable recording medium 111 such as described above, and also may be downloaded to the computer via a communication network or broadcasting network, and installed into the built-in hard disk 105. That is to say, the program may wirelessly be transferred to the computer via an artificial satellite for digital satellite broadcasting from a download site, or may be transferred to the computer by cable via a network such as an LAN (Local Area Network) or the Internet.

The computer houses the CPU (Central Processing Unit) 102, and an input/output interface 110 is connected to the CPU 102 via a bus 101.

Upon a command being input by an input unit 107 being operated by the user via the input/output interface 110, the CPU 102 executes the program stored in the ROM (Read Only Memory) 103 according thereto. Alternatively, the CPU 102 loads the program stored in the hard disk 105 to the RAM (Random Access Memory) 104, and executes this.

Thus, the CPU 102 performs processing following the above flowcharts, or processing to be performed by the configuration of the above block diagram. Subsequently, the CPU 102 outputs processing results thereof from the output unit 106 via the input/output interface 110, or transmits from a communication unit 108 and further records in the hard disk 105, according to need, for example.

Note that the input unit 107 is configured of a keyboard, mouse, microphone, and so forth. Also, the output unit 106 is configured of an LCD (Liquid Crystal Display), speaker, and so forth.

Now, with the present Specification, processing that the computer performs following the program is not necessarily performed in time sequence along the sequence described as the flowcharts. That is to say, the processing that the computer performs following the program includes processing to be executed in parallel or individually (e.g., parallel processing or processing by an object).

Also, the program may be processed by a single computer (processor), or may be subjected to dispersion processing by multiple computers. Further, the program may be a program to be transferred to a remote computer for execution.

Note that the embodiments of the present invention are not restricted to the above embodiments, and various modifications can be made without departing from the essence of the present invention.

Specifically, for example, with the present embodiment, image data has been encoded and decoded by AVC/H.264 system or the like, but encoding and decoding of image data may not be performed.

Also, with the present embodiment, description has been made wherein a flag is multiplexed (described) into a bit stream, but in addition to being multiplexed, the flag and image data (or bit stream) may be transmitted (recorded). Further, there may be a mode wherein the flag and image data (or bit stream) are connected.

With the present embodiment, connection will be defined as follows. Connection may be a state in which image data (or bit stream) and the flag are mutually linked. For example, image data (or bit stream) and the flag may be transmitted by a separate transmission path. Alternatively, image data (or bit stream) and the flag may be recorded in a mutually different recording medium (or separate recording area within the same recording medium). Note that increments to link between image data (or bit stream) and a flag may be set to encoding processing increments (such as one frame, multiple frames, or the like).

Now, with the encoding device in FIG. 1 or the like, it can be considered that the encoding units $11_1$ and $11_2$, and the generating unit 13 serve as encoding means for encoding N, more than one, viewpoints of image data to generate a bit stream. Also, it can be considered that the flag setting unit 12 serves as generating means for generating a view switching flag for specifying image data to be used for display of a 2D image of the N viewpoints of image data. Further, it can be considered that the generating unit 13 serves as transmission means for transmitting a bit stream obtained by encoding the N viewpoints of image data, and a view switching flag.

Also, with the decoding device in FIG. 5 or the like, it can be considered that the extraction unit 41 serves as reception means for receiving a bit stream to be obtained by encoding N, more than one, viewpoints of image data, and a view switching flag for specifying image data to be used for display of a 2D image of the N-viewpoint image. Further, it can be considered that the selecting unit 44 serves as selecting means for selecting image data to be used for display of a 2D image out of N viewpoints of image data included in a bit stream following a view switching flag.

Embodiment of Electronic Device to Which Present Invention Has Been Applied

For example, the above encoding devices and decoding devices can be applied to an arbitrary electronic device. Hereafter, an example thereof will be described.

Figure 24:
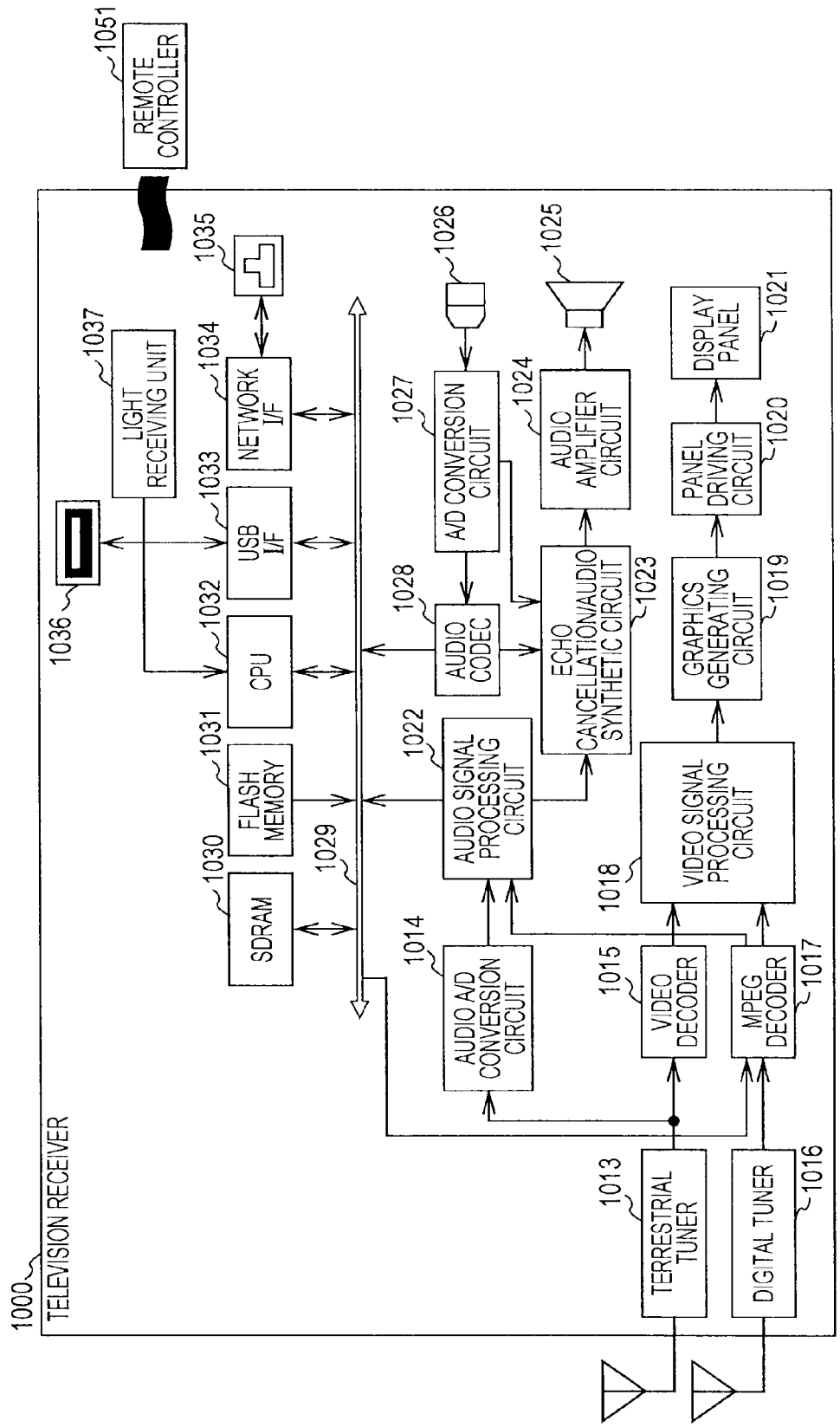
FIG. 24 is a block diagram illustrating a principal configuration example of a television receiver to which the present invention has been applied.

FIG. 24 is a block diagram illustrating a principal configuration example of a television receiver using the decoding device to which the present invention has been applied.

The television receiver 1000 illustrated in FIG. 24 includes a terrestrial tuner 1013, a video decoder 1015, a video signal processing circuit 1018, a graphics generating circuit 1019, a panel driving circuit 1020, and a display panel 1021.

The terrestrial tuner 1013 receives broadcast wave signals of ground analog broadcasting via an antenna, demodulates, obtains video signals, and supplies these to the video decoder 1015. The video decoder 1015 subjects the video signals supplied from the terrestrial tuner 1013 to decoding processing, and supplies obtained digital component signals to the video signal processing circuit 1018.

The video signal processing circuit 1018 subjects the video data supplied from the video decoder 1015 to predetermined processing such as noise removal, and supplies obtained video data to the graphics generating circuit 1019.

The graphics generating circuit 1019 generates video data of a program to be displayed on the display panel 1021, image data due to processing based on an application to be supplied via a network, or the like, and supplies the generated video data or image data to the panel driving circuit 1020. Also, the graphics generating circuit 1019 also performs processing for supplying, to the panel driving circuit 1020, video data obtained by generating video data (graphics) for displaying a screen to be used for selection of an item or the like by the user, and superimposing this on the video data of a program, as appropriate.

The panel driving circuit 1020 drives the display panel 1021 based on the data supplied from the graphics generating circuit 1019 to display the video of a program or the above various types of screens on the display panel 1021.

The display panel 1021 is made up of an LCD (Liquid Crystal Display) or the like, and displays a program video or the like in accordance with the control by the panel driving circuit 1020.

Also, the television receiver 1000 also includes an audio A/D (Analog/Digital) conversion circuit 1014, an audio signal processing circuit 1022, an echo cancellation/audio synthetic circuit 1023, an audio amplifier circuit 1024, and a speaker 1025.

The terrestrial tuner 1013 demodulates the received broadcast wave signal, thereby obtaining not only video signals but also audio signals. The terrestrial tuner 1013 supplies the obtained audio signals to the audio A/D conversion circuit 1014.

The audio A/D conversion circuit 1014 subjects the audio signals supplied from the terrestrial tuner 1013 to A/D conversion processing, and supplies the obtained digital audio signals to the audio signal processing circuit 1022.

The audio signal processing circuit 1022 subjects the audio data supplied from the audio A/D conversion circuit 1014 to predetermined processing such as noise removal or the like, and supplies the obtained audio data to the echo cancellation/audio synthetic circuit 1023.

The echo cancellation/audio synthetic circuit 1023 supplies the audio data supplied from the audio signal processing circuit 1022 to the audio amplifier circuit 1024.

The audio amplifier circuit 1024 subjects the audio data supplied from the echo cancellation/audio synthetic circuit 1023 to D/A conversion processing and amplification processing, adjusts to predetermined volume, and then outputs the audio from the speaker 1025.

Further, the television receiver 1000 also includes a digital tuner 1016, and an MPEG decoder 1017.

The digital tuner 1016 receives the broadcast wave signals of digital broadcasting (ground digital broadcasting, BS (Broadcasting Satellite)/CS (Communication Satellite) digital broadcasting) via the antenna, demodulates, obtains MPEG-TS (Moving Picture Experts Group-Transport Stream), and supplies this to the MPEG decoder 1017.

The MPEG decoder 1017 descrambles scrambling subjected to the MPEG-TS supplied from the digital tuner 1016, and extracts a stream including the data of a program serving as a playback object (viewing object). The MPEG decoder 1017 decodes an audio packet making up the extracted stream, supplies the obtained audio data to the audio signal processing circuit 1022, and also decodes an audio packet making up the stream, and supplies the obtained video data to the video signal processing circuit 1018. Also, the MPEG decoder 1017 supplies EPG (Electronic Program Guide) data extracted from the MPEG-TS to the CPU 1032 via an unshown route.

The television receiver 1000 uses the decoding device described above with reference to FIG. 5, FIG. 12, FIG. 16, or FIG. 21 as the MPEG decoder 1017 for decoding video packets in this way. Note that the MPEG-TS to be transmitted by a broadcasting station or the like has been encoded by the encoding device as described above with reference to FIG. 1, FIG. 9, FIG. 14, or FIG. 18, wherein a plurality of image data are encoded in a single bit stream.

The MPEG decoder 1017 selects and decodes the image data of encoded data to be displayed as a 2D image based on a view switching flag in the same way as with the case of the decoding device in FIG. 5, FIG. 12, FIG. 16, or FIG. 21, or decodes basic encoded data obtained by encoding basic image data to be used for 2D image display, which the encoding device has generated while switching images based on specification by a view switching flag. Accordingly, the MPEG decoder 1017 enables an image that the producer of a content made up of multiple viewpoints of image data intends to be displayed.

The video data supplied from the MPEG decoder 1017 is, in the same way as with the case of the video data supplied from the video decoder 1015, subjected to predetermined processing at the video signal processing circuit 1018, on which generated video data and so forth are superimposed as appropriate at the graphics generating circuit 1019, and is supplied to the display panel 1021 via the panel driving circuit 1020, and image thereof is displayed.

The audio data supplied from the MPEG decoder 1017 is, in the same way as with the case of the audio data supplied from the audio A/D conversion circuit 1014, subjected to predetermined processing at the audio signal processing circuit 1022, supplied to the audio amplifier circuit 1024 via the echo cancellation/audio synthetic circuit 1023, and subjected to D/A conversion processing or amplifier processing. As a result thereof, audio adjusted to predetermined volume is output from the speaker 1025.

Also, the television receiver 1000 includes a microphone 1026, and an A/D conversion circuit 1027.

The A/D conversion circuit 1027 receives the user's audio signals loaded by the microphone 1026 provided to the television receiver 1000 as an object for speech conversation, subjects the received audio signals to A/D conversion processing, and supplies the obtained digital audio data to the echo cancellation/audio synthetic circuit 1023.

In the event that the audio data of a user (user A) of the television receiver 1000 is supplied from the A/D conversion circuit 1027, the echo cancellation/audio synthetic circuit 1023 performs echo cancellation with the user A's audio data as an object, and outputs audio data obtained by synthesizing with another piece of audio data to the speaker 1025 via the audio amplifier circuit 1024.

Further, the television receiver 1000 also includes an audio codec 1028, an internal bus 1029, SDRAM (Synchronous Dynamic Random Access Memory) 1030, flash memory 1031, CPU 1032, a USB (Universal Serial Bus) I/F 1033, and a network I/F 1034.

The A/D conversion circuit 1027 receives the user's audio signals loaded by the microphone 1026 provided to the television receiver 1000 as an object for speech conversation, subjects the received audio signals to A/D conversion processing, and supplies the obtained digital audio data to the audio codec 1028.

The audio codec 1028 converts the audio data supplied from the A/D conversion circuit 1027 into data in a predetermined format for transmitting via a network, and supplies to the network I/F 1034 via the internal bus 1029.

The network I/F 1034 is connected to a network via a cable connected to a network terminal 1035. The network I/F 1034 transmits the audio data supplied from the audio codec 1028 to another device connected to the network thereof, for example. Also, the network I/F 1034 receives, for example, the audio data transmitted from another device connected via the network, via the network terminal 1035, and supplies this to the audio codec 1028 via the internal bus 1029.

The audio codec 1028 converts the audio data supplied from the network I/F 1034 into data in a predetermined format, and supplies this to the echo cancellation/audio synthetic circuit 1023.

The echo cancellation/audio synthetic circuit 1023 performs echo cancellation with the audio data supplied from the audio codec 1028 as an object, and outputs audio data obtained by synthesizing with another piece of audio data to the speaker 1025 via the audio amplifier circuit 1024.

The SDRAM 1030 stores various types of data necessary for the CPU 1032 performing processing.

The flash memory 1031 stores a program to be executed by the CPU 1032. The program stored in the flash memory 1031 is read out by the CPU 1032 at predetermined timing such as at the time of activation of the television receiver 1000. The flash memory 1031 also stores EPG data obtained via digital broadcasting, data obtained from a predetermined server via the network, and so forth.

For example, the MPEG-TS including a content data obtained from a predetermined server via the network under the control of the CPU 1032 is stored in the flash memory 1031. The flash memory 1031 supplies the MPEG-TS thereof to the MPEG decoder 1017 via the internal bus 1029 by the control of the CPU 1032, for example.

The MPEG decoder 1017 processes, in the same way as with the case of the MPEG-Ts supplied from the digital tuner 1016, the MPEG-TS thereof. In this way, the television receiver 1000 receives content data made up of video, audio, and so forth via the network, decodes using the MPEG decoder 1017, whereby the video thereof can be displayed, or the audio thereof can be output.

Also, the television receiver 1000 also includes a light receiving unit 1037 for receiving the infrared signal transmitted from a remote controller 1051.

The light receiving unit 1037 receives the infrared light from the remote controller 1051, demodulates, and outputs a control code representing the content of the user's operation to the CPU 1032.

The CPU 1032 executes the program stored in the flash memory 1031 to control the entire operation of the television receiver 1000 according to the control code and so forth supplied from the light receiving unit 1037. The CPU 1032, and each unit of the television receiver 1000 are connected via an unshown route.

The USB I/F 1033 performs transmission/reception of data with an external device of the television receiver 1000 to be connected via a USB cable connected to a USB terminal 1036. The network I/F 1034 is connected to the network via a cable connected to the network terminal 1035, and also performs transmission/reception of data other than audio data with various types of device to be connected to the network.

The television receiver 1000 uses the decoding device described above with reference to FIG. 5, FIG. 12, FIG. 16, or FIG. 21 as the MPEG decoder 1017, whereby an image that the producer of a content made up of multiple viewpoints of image data intends can be displayed.

Figure 25:
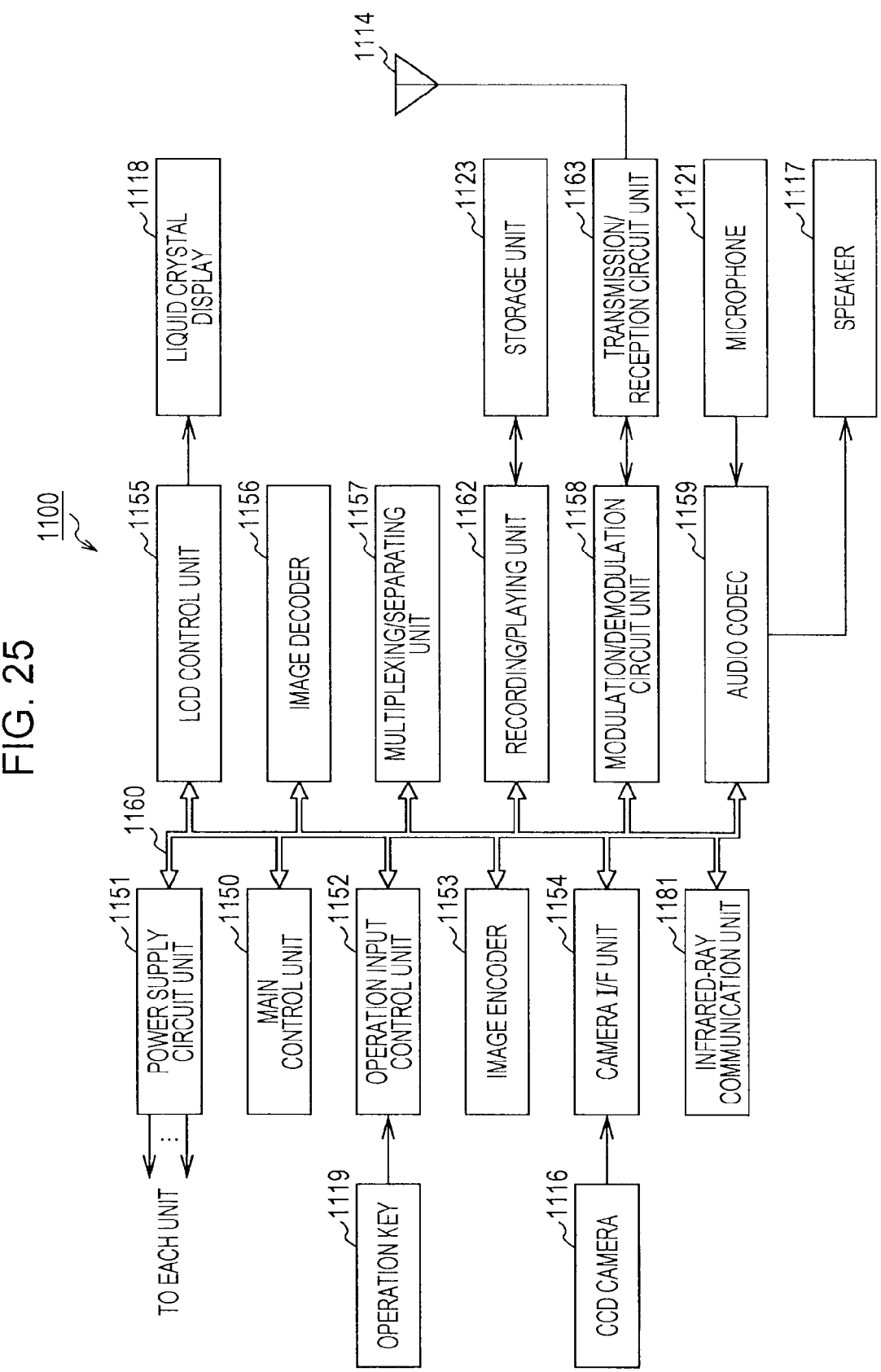
FIG. 25 is a block diagram illustrating a principal configuration example of a cellular phone to which the present invention has been applied.

FIG. 25 is a block diagram illustrating a principal configuration example of a cellular phone using the encoding device and decoding device to which the present invention has been applied.

The cellular phone 1100 illustrated in FIG. 25 includes a main control unit 1150 configured to integrally control each unit, a power supply circuit unit 1151, an operation input control unit 1152, an image encoder 1153, a camera I/F unit 1154, an LCD control unit 1155, an image decoder 1156, a multiplexing/separating unit 1157, a recording/playing unit 1162, a modulation/demodulation circuit unit 1158, and an audio codec 1159. These are mutually connected via a bus 1160.

Also, the cellular phone 1100 includes an operation key 1119, a CCD (Charge Coupled Devices) camera 1116, a liquid crystal display 1118, a storage unit 1123, a transmission/reception circuit unit 1163, an antenna 1114, a microphone (MIC) 1121, and a speaker 1117.

Upon a call-ending and power key being set to an on state by the user's operation, power is supplied to each unit from a battery pack, whereby the power supply circuit unit 1151 activates the cellular phone 1100 in an operable state.

The cellular phone 1100 performs various types of operation such as transmission/reception of audio signals, transmission/reception of e-mail or image data, image shooting, data recording, and so forth in various types of mode such as an audio call mode, a data communication mode, and so forth based on the control of the main control unit 1150 made up of the CPU, ROM, RAM, and so forth.

For example, with the audio call mode, the cellular phone 1100 converts audio signals collected as the microphone (MIC) 1121 into digital audio data by the audio codec 1159, subjects this to spectrum spread processing at the modulation/demodulation circuit unit 1158, and subjects this to digital/analog conversion processing and frequency conversion processing at the transmission/reception circuit unit 1163. The cellular phone 1100 transmits the signal for transmission obtained by conversion processing thereof to an unshown base station via the antenna 1114. The signal for transmission (audio signal) transmitted to the base station is supplied to a call-partner's cellular phone via a dial-up line network.

Also, for example, with the audio call mode, the cellular phone 1100 amplifies the reception signal received at the antenna 1114, at the transmission/reception circuit unit 1163, and further subjects to frequency conversion processing and analog/digital conversion processing, subjects to spectrum inverse spread processing at the modulation/demodulation circuit unit 1158, and converts into an analog audio signal at the audio codec 1159. The cellular phone 1100 outputs the analog audio signal obtained by conversion thereof to the speaker 1117.

Further, for example, in the event that an e-mail is transmitted in the data communication mode, the cellular phone 1100 accepts the text data of the e-mail input by the operations of the operation key 1119 at the operation input control unit 1152. The cellular phone 1100 processes the text data thereof at the main control unit 1150, and displays on the liquid crystal display 1118 via the LCD control unit 1155 as an image.

Also, the cellular phone 1100 generates e-mail data at the main control unit 1150 based on text data or user instruction or the like accepted at the operation input control unit 1152. The cellular phone 1100 subjects the e-mail data thereof to spectrum spread processing at the modulation/demodulation circuit unit 1158, and subjects to digital/analog conversion processing and frequency conversion processing at the transmission/reception circuit unit 1163. The cellular phone 1100 transmits the signal for transmission obtained by the conversion processing thereof to the unshown base station via the antenna 1114. The signal for transmission (e-mail) transmitted to the base station is supplied to a predetermined destination via the network and a mail server and so forth.

Also, for example, in the event that e-mail is received in the data communication mode, the cellular phone 1100 receives the signal transmitted from the base station at the transmission/reception circuit unit 1163 via the antenna 1114, amplifies, and further subjects to frequency conversion processing and analog/digital conversion processing. The cellular phone 1100 subjects the reception signal thereof to spectrum inverse spread processing to restore the original e-mail data at the modulation/demodulation circuit unit 1158. The cellular phone 1100 displays the restored e-mail data thereof on the liquid crystal display 1118 via the LCD control unit 1155.

Note that the cellular phone 1100 is also capable of recording (storing) the received e-mail data in the storage unit 1123 via the recording/playing unit 1162.

This storage unit 1123 is an arbitrary rewritable storage medium. The storage unit 1123 may be, for example, semiconductor memory such as RAM or built-in type flash memory or the like, or may be a hard disk, or may be a removable medium such as a magnetic disk, magneto-optical disk, optical disc, USB memory, memory card, or the like. It goes without saying that the storage unit 1123 may be other than these.

Further, for example, in the event that image data is transmitted in the data communication mode, the cellular phone 1100 generates image data at the CCD camera 1116 by imaging. The CCD camera 1116 includes optical devices such as a lens, diaphragm, and so forth, and CCD serving as a photoelectric conversion element, images a subject, converts the intensity of received light into an electrical signal, and generates the image data of a subject image. The CCD camera 1116 encodes the image data thereof at the image encoder 1153 via the camera I/F unit 1154, and converts into encoded image data.

The cellular phone 1100 uses the encoding device described above with reference to FIG. 1, FIG. 9, FIG. 14, or FIG. 18 as the image encoder 1153 which performs such processing. The image encoder 1053 encodes each of the multiple viewpoints of image data, and multiplexes these pieces of encoded data with a view switching flag, in the same way as with the cases of these encoding devices. Thus, the image encoder 1053 allows the decoding side to display an image that a contents producer intends using a view switching flag.

Note that, at this time, simultaneously, the cellular phone 1100 subjects the audio collected at the microphone (MIC) 1121 during imaging at the CCD camera 1116 to analog/digital conversion at the audio codec 1159, and further encodes.

The cellular phone 1100 multiplexes the encoded image data supplied from the image encoder 1153, and the digital audio data supplied from the audio codec 1159 at the multiplexing/separating unit 1157 using a predetermined method. The cellular phone 1100 subjects multiplexed data obtained as a result thereof to spectrum spread processing at the modulation/demodulation circuit unit 1158, and subjects to digital/analog conversion processing and frequency conversion processing at the transmission/reception circuit 1163. The cellular phone 1100 transmits signals for transmission obtained by the conversion processing thereof to the unshown base station via the antenna 1114. The signals for transmission (image data) transmitted to the base station are supplied to the call partner via the network or the like.

Note that, in the event of transmitting no image data, the cellular phone 1100 can display the image data generated at the CCD camera 1116 on the liquid crystal display 1118 not via the image encoder 1153 but via the LCD control unit 1155.

Also, for example, in the event of receiving the data of a moving image file linked to a simplified website or the like in the data communication mode, the cellular phone 1100 receives the signal transmitted from the base station at the transmission/reception circuit unit 1163 via the antenna 1114, amplifies, and further subjects to frequency conversion processing and analog/digital conversion processing. The cellular phone 1100 subjects the reception signal thereof to spectrum inverse spread processing at the modulation/demodulation circuit unit 1158 to restore the original multiplexed data. The cellular phone 1100 separates the multiplexed data thereof into encoded image data and audio data at the multiplexing/separating unit 1157.

The cellular phone 1100 decodes the encoded image data at the image decoder 1156 to generate playback moving image data, and displays this on the liquid crystal display 1118 via the LCD control unit 1155. Thus, for example, moving image data included in the moving image file linked to a simplified website is displayed on the liquid crystal display 1118.

The cellular phone 1100 uses the decoding device described above with reference to FIG. 5, FIG. 12, FIG. 16, or FIG. 21 as the image decoder 1156 which performs such processing. Specifically, in the same way as with the cases of these decoding devices, the image decoder 1156 selects and decodes the encoded data of image data to be displayed as a 2D image based on a view switching flag, or decodes basic encoded data encoded from basic image data to be used for 2D image display, which the encoding device generated while switching images based on specification by a view switching flag. Accordingly, the image decoder 1156 enables an image that the producer of a content made up of multiple viewpoints of image data intends to be displayed.

At this time, simultaneously, the cellular phone 1100 converts the digital audio data into analog audio signals at the audio codec 1159, and outputs these from the speaker 1117. Thus, for example, audio data included in a moving image file linked to a simplified website is played.

Note that, in the same way as with the case of e-mail, the cellular phone 1100 may record (store) the received data linked to a simplified website or the like in the storage unit 1123 via the recording/playing unit 1162.

Also, the cellular phone 1100 may cause the main control unit 1150 to analyze the 2D code imaged and obtained at the CCD camera 1116 to obtain information recorded in 2D code.

Further, the cellular phone 1100 may communicate with an external device at the infrared-ray communication unit 1181 using infrared rays.

The cellular phone 1100 allows the decoder side to display an image that a contents producer intends using a view switching flag by using the encoding device described above with reference to FIG. 1, FIG. 9, FIG. 14, or FIG. 18 as the image encoder 1153.

Also, the cellular phone 1100 enables an image that a the producer of a content made up of multiple viewpoints of image data intends to be displayed by using the decoding device described above with reference to FIG. 5, FIG. 12, FIG. 16, or FIG. 21 as an image decoder 1156.

Note that description has been made so far wherein the cellular phone 1100 uses the CCD camera 1116, but an image sensor (CMOS image sensor) using CMOS (Complementary Metal Oxide Semiconductor) may be employed instead of this CCD camera 1116. In this case as well, in the same way as with the case using the CCD camera 1116, the cellular phone 1100 may image a subject to generate the image data of a subject image.

Also, description has been made so far as the cellular phone 1100, but the above encoding device and decoding device may be applied to any kind of device in the same way as with the case of the cellular phone 1100, as long as it is a device having the same imaging function and communication function as with the cellular phone 1100, for example, such as a PDA (Personal Digital Assistants), a smart phone, a UMPC (Ultra Mobile Personal Computer), a net book, a note-type personal computer, or the like.

Figure 26:
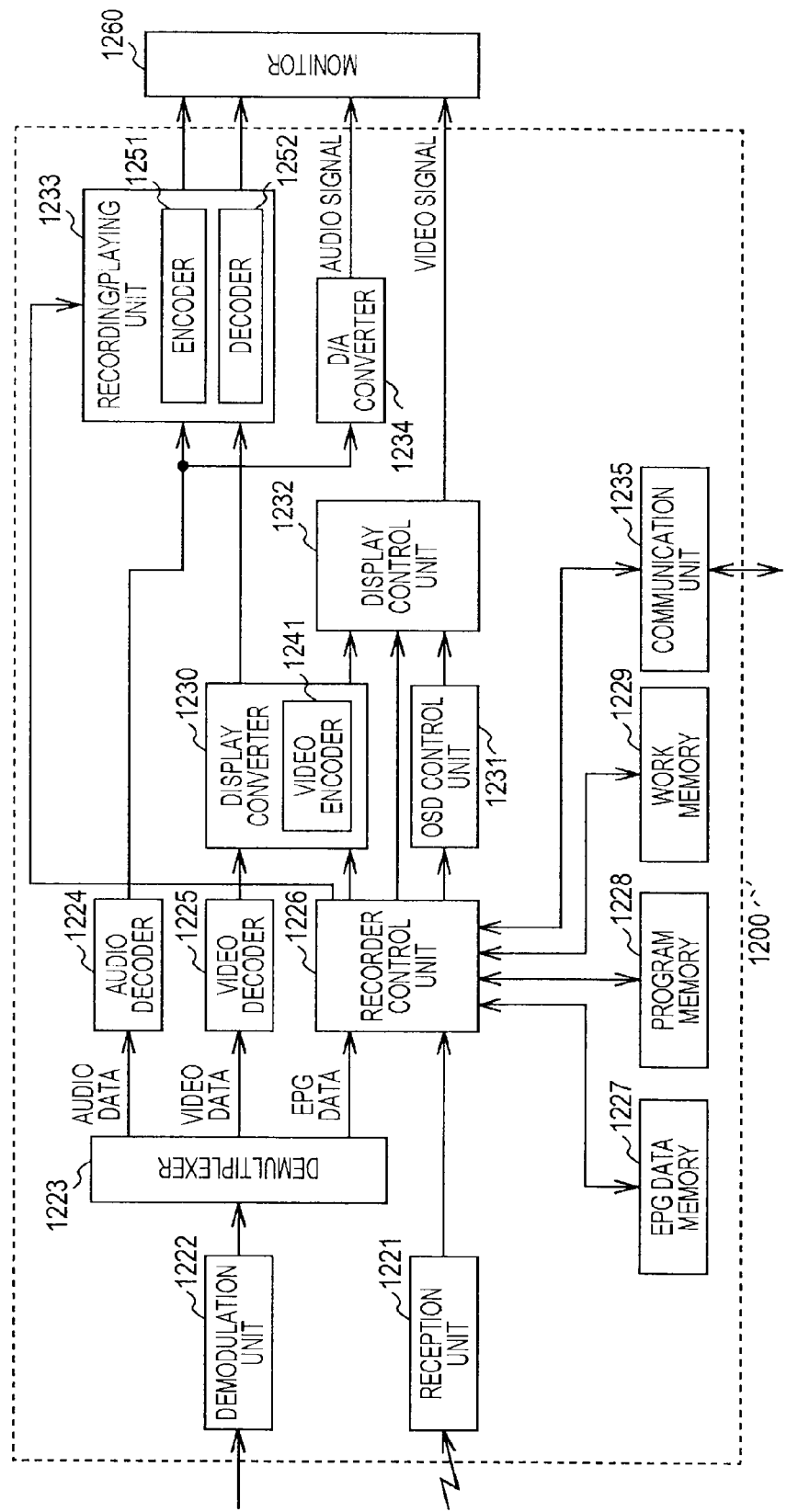
FIG. 26 is a block diagram illustrating a principal configuration example of a hard disk recorder to which the present invention has been applied.

FIG. 26 is a block diagram illustrating a principal configuration example of a hard disk recorder using the encoding device and decoding device to which the present invention has been applied.

The hard disk recorder (HDD recorder) 1200 illustrated in FIG. 26 is a device which saves the audio data and video data of a broadcast program included in broadcast wave signals (television signals) received by the tuner, which are transmitted by a satellite or ground-based antenna, in the built-in hard disk, and provides the saved data to the user at timing according to the user's instruction.

For example, an arrangement may be made wherein the hard disk recorder 1200 extracts audio data and video data from broadcast wave signals, decodes these as appropriate, and stores these in the built-in hard disk. Also, for example, an arrangement may be made wherein the hard disk recorder 1200 obtains audio data and video data from another device via the network, decodes these as appropriate, and stores these in the built-in hard disk.

Further, for example, an arrangement may be made wherein the hard disk recorder 1200 decodes audio data and video data recorded in the built-in hard disk, supplies to a monitor 1260, displays the image thereof on the screen of the monitor 1260, and outputs audio thereof from a speaker of the monitor 1260. Also, for example, an arrangement may be made wherein the hard disk recorder 1200 decodes audio data and video data extracted from the broadcast wave signals obtained via the tuner, or audio data and video data obtained from another device via the network, supplies to the monitor 1260, displays the image thereof on the screen of the monitor 1260, and outputs audio thereof from the speaker of the monitor 1260.

It goes without saying that operation other than the above may be available.

As illustrated in FIG. 26, the hard disk recorder 1200 includes a reception unit 1221, a demodulation unit 1222, a demultiplexer 1223, an audio decoder 1224, a video decoder 1225, and a recorder control unit 1226. The hard disk recorder 1200 further includes EPG data memory 1227, program memory 1228, work memory 1229, a display converter 1230, an OSD (On Screen Display) control unit 1231, a display control unit 1232, a recording/playing unit 1233, a D/A converter 1234, and a communication unit 1235.

Also, the display converter 1230 includes a video encoder 1241. The recording/playing unit 1233 includes an encoder 1251 and a decoder 1252.

The reception unit 1221 receives infrared-ray signals from a remote controller (not illustrated), converts into electrical signals, and outputs to the recorder control unit 1226. The recorder control unit 1226 is configured of, for example, a microprocessor or the like, and executes various types of processing in accordance with a program stored in the program memory 1228. At this time, the recorder control unit 1226 uses the work memory 1229 according to need.

The communication unit 1235 is connected to the network, and performs communication processing with another device via the network. For example, the communication unit 1235, which is controlled by the recorder control unit 1226, communicates with a tuner (not illustrated), and principally outputs a channel selection control signal to the tuner.

The demodulation unit 1222 demodulates the signal supplied form the tuner, and outputs to the demultiplexer 1223. The demultiplexer 1223 separates the data supplied from the demodulation unit 1222 into audio data, video data, and EPG data, and outputs to the audio decoder 1224, video decoder 1225, and recorder control unit 1226, respectively.

The audio decoder 1224 decodes the input audio data, and outputs to the recording/playing unit 1233. The vide decoder 1225 decodes the input video data, and outputs to the display converter 1230. The recorder control unit 1226 supplies and stores the input EPG data to the EPG data memory 1227.

The display converter 1230 encodes the video data supplied from the video decoder 1225 or recorder control unit 1226 to video data conforming to, for example, the NTSC (National Television Standards Committee) system, at the video encoder 1241, and outputs to the recording/playing unit 1233. Also, the display converter 1230 converts the size of the screen of the video data supplied from the video decoder 1225 or recorder control unit 1226 into a size corresponding to the size of the monitor 1260, converts into video data conforming to the NTSC system by the video encoder 1241, converts into analog signals, and outputs to the display control unit 1232.

The display control unit 1232 superimposes, under the control of the recorder control unit 1226, the OSD signals that the OSD (On Screen Display) control unit 1231 outputs on the video signals input from the display converter 1230 to output to the display of the monitor 1260 for display.

Also, the audio data that the audio decoder 1224 outputs is converted into analog signals by the D/A converter 1234, and is supplied to the monitor 1260. The monitor 1260 outputs the audio signals from the built-in speaker.

The recording/playing unit 1233 includes a hard disk as a storage medium for recording video data, audio data, and so forth.

The recording/playing unit 1233 encodes, for example, the audio data supplied from the audio decoder 1224 using the encoder 1251. Also, the recording/playing unit 1233 encodes the video data supplied from the video encoder 1241 of the display converter 1230 using the encoder 1251. The recording/playing unit 1233 synthesizes the encoded data of the audio data thereof, and the encoded data of the video data thereof using the multiplexer. The recording/playing unit 1233 subjects the synthesized data thereof to channel coding, amplifies, and writes the data thereof in the hard disk via a recording head.

The recording/playing unit 1233 plays the data recorded in the hard disk via a playing head, amplifies, and separates into audio data and video data using a demultiplexer. The recording/playing unit 1233 decodes the audio data and video data using the decoder 1252. The recording/playing unit 1233 subjects the decoded audio data to D/A conversion, and outputs to the speaker of the monitor 1260. Also, the recording/playing unit 1233 subjects the decoded video data to D/A conversion, and outputs to the display of the monitor 1260.

The recorder control unit 1226 reads out the latest EPG data from the EPG data memory 1227 based on the user's instruction indicated by the infrared-ray signals from the remote controller that is received via the reception unit 1221, and supplies this to the OSD control unit 1231. The OSD control unit 1231 generates image data corresponding to the input EPG data, and outputs to the display control unit 1232. The display control unit 1232 outputs the video data input from the OSD control unit 1231 to the display of the monitor 1260 for display. Thus, EPG (Electronic Program Guide) is displayed on the display of the monitor 1260.

Also, the hard disk recorder 1200 may obtain various types of data such as video data, audio data, EPG data, and so forth that are supplied from another device via the network such as the Internet or the like.

The communication unit 1235, which is controlled by the recorder control unit 1226, obtains encoded data such as video data, audio data, EPG data, and so forth that are transmitted from another device via the network, and supplies to the recorder control unit 1226. The recorder control unit 1226 supplies, for example, the encoded data of the obtained video data and audio data to the recording/playing unit 1233, and stores in the hard disk. At this time, the recorder control unit 1226 and recording/playing unit 1233 may perform processing such as re-encoding or the like according to need.

Also, the recorder control unit 1226 decodes the encoded data of the obtained video data and audio data, and supplies the obtained video data to the display converter 1230. The display converter 1230 processes, in the same way as with video data supplied from the video decoder 1225, the vide data supplied from the recorder control unit 1226, supplies to the monitor 1260 via the display control unit 1232, and displays an image thereof.

Also, in sync with this image display, the recorder control unit 1226 may supply the decoded audio data to the monitor 1260 via the D/A converter 1234 to output audio thereof from the speaker.

Further, the recorder control unit 1226 decodes the encoded data of the obtained EPG data, and supplies the decoded EPG data to the EPG data memory 1227.

The hard disk recorder 1200 thus configured uses the decoding device described above with reference to FIG. 5, FIG. 12, FIG. 16, or FIG. 21 as the video decoder 1225, decoder 1252 and a decoder housed in the recorder control unit 1226. That is to say, the video decoder 1225, decoder 1252, and the decoder housed in the recorder control unit 1226 selects and decodes the encoded data of image data to be displayed as a 2D image based on a view switching flag, or decodes basic encoded data encoded from basic image data to be used for 2D image display, which the encoding device generated while switching images based on specification by a view switching flag, in the same way as with these decoding devices. Accordingly, each of the video decoder 1225, decoder 1252, and the decoder housed in the recorder control unit 1226 enables an image that the producer of a content made up of multiple viewpoints of image data intends to be displayed.

Accordingly, the hard disk recorder 1200 enables, for example, at the time of receiving of video data (encoded data) by the tuner or communication unit 1235, or at the time of playback from the hard disk of video data (encoded data) by the recording/playing unit 1233, an image that the producer of a content made up of multiple viewpoints of image data intends to be displayed.

Also, the hard disk recorder 1200 uses the encoding device described above with reference to FIG. 1, FIG. 9, FIG. 14, or FIG. 18 as the encoder 1251. Accordingly, the encoder 1251 encodes, in the same way as with the cases of these encoding devices, each of multiple viewpoints of image data, and multiplexes the encoded data thereof with a view switching flag. Accordingly, the hard disk recorder 1200 allows, for example, the decoder side to display an image that the producer of the content intends using the view switching flag.

Note that description has been made so far regarding the hard disk recorder 1200 which records video data and audio data in the hard disk, but it goes without saying that the recording medium may be any kind of medium. The above encoding device and decoding device may be applied to even a recorder to which a recording medium other than the hard disk, for example, such as flash memory, optical disc, video tape, or the like is applied, in the same way as with the case of the above hard disk recorder 1200.

Figure 27:
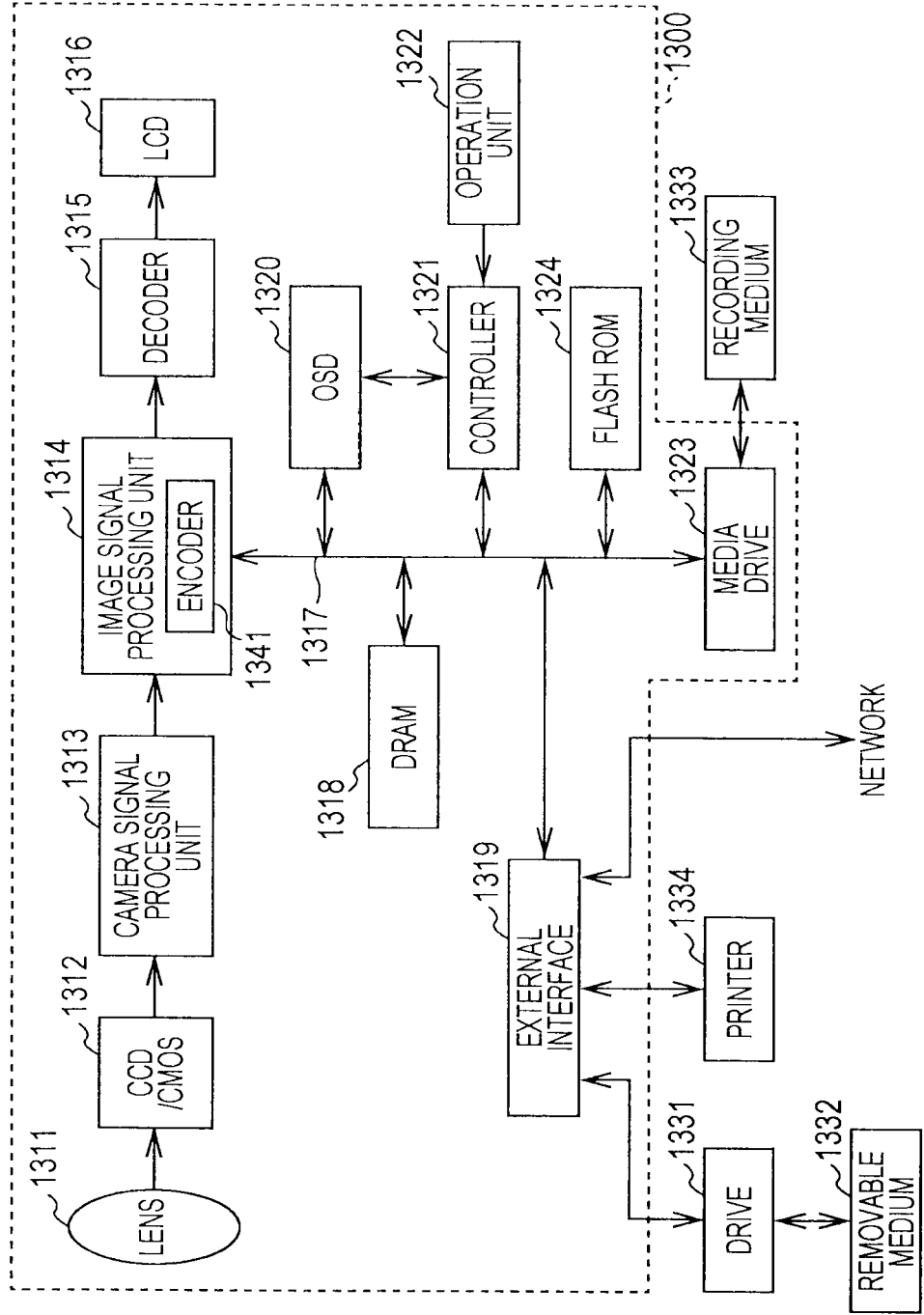
FIG. 27 is a block diagram illustrating a principal configuration example of a camera to which the present invention has been applied.

FIG. 27 is a block diagram illustrating a principal configuration example of a camera using the encoding device and decoding device to which the present invention has been applied.

The camera 1300 illustrated in FIG. 27 images a subject, displays an image of the subject on an LCD 1316, or records this in a recording medium 1333 as image data.

A lens block 1311 allows light (i.e., video of the subject) to input to a CCD/CMOS 1312. The CCD/CMOS 1312 is an image sensor using CCD or CMOS, converts the intensity of the received light into an electrical signal, and supplies to a camera signal processing unit 1313.

The camera signal processing unit 1313 converts the electrical signal supplied from the CCD/CMOS 1312 into color difference signals of Y, Cr, and Cb, and supplies to an image signal processing unit 1314. The image signal processing unit 1314 subjects, under the control of a controller 1321, the image signal supplied from the camera signal processing unit 1313 to predetermined image processing, or encodes the image signal thereof using an encoder 1341. The image signal processing unit 1314 supplies encoded data generated by encoding the image signal to a decoder 1315. Further, the image signal processing unit 1314 obtains data for display generate at an on-screen display (OSD) 1320, and supplies this to the decoder 1315.

With the above processing, the camera signal processing unit 1313 uses DRAM (Dynamic Random Access Memory) 1318 to be connected via a bus 1317 as appropriate, and holds image data, encoded data obtained by encoding image data thereof, and so forth in the DRAM 1318 thereof according to need.

The decoder 1315 decodes the encoded data supplied from the image signal processing unit 1314, and supplies the obtained image data (decoded image data) to an LCD 1316. Also, the decoder 1315 supplies the data for display supplied from the image signal processing unit 1314 to the LCD 1316. The LCD 1316 synthesizes the image of the decoded image data supplied from the decoder 1315, and the image of the data for display as appropriate, and displays a synthesized image thereof.

The on-screen display 1320 outputs, under the control of the controller 1321, data for display, such as a menu screen or icon or the like made up of a symbol, characters, and a figure, to the image signal processing unit 1314 via the bus 1317.

The controller 1321 executes various types of processing based on the signals indicating the content that the user instructed using an operation unit 1322, and also controls the image signal processing unit 1314, DRAM 1318, an external interface 1319, the on-screen display 1320, a media drive 1323, and so forth via the bus 1317. A program, data, and so forth necessary for the controller 1321 executing various types of processing are stored in FLASH ROM 1324.

For example, the controller 1321 can encode the image data stored in the DRAM 1318, or decode the encoded data stored in the DRAM 1318 instead of the image signal processing unit 1314 and decoder 1315. At this time, the controller 1321 may perform encoding and decoding processing according to the same system as the encoding and decoding system of the image signal processing unit 1314 and decoder 1315, or may perform encoding and decoding processing according to a system other than the systems that the image signal processing unit 1314 and decoder 1315 can handle.

Also, for example, in the event that start of image printing has been instructed from the operation unit 1322, the controller 1321 reads out image data from the DRAM 1318, and supplies this to a printer 1334 to be connected to the external interface 1319 via the bus 1317 for printing.

Further, for example, in the event that image recording has been instructed from the operation unit 1322, the controller 1321 reads out encoded data from the DRAM 1318, and supplies this to the recording medium 1333 to be mounted on the media drive 1323 via the bus 1317 for storage.

The recording medium 1333 is an arbitrary readable writable removable medium, for example, such as a magnetic disk, magneto-optical disk, optical disc, semiconductor memory, or the like. With regard to the recording medium 1333, it goes without saying that a type serving as a removable medium is arbitrary, may be a tape device, may be a disk, or may be a memory card. It goes without saying that this may be a non-contact IC card or the like.

Also, the media drive 1323 and the recording media 1333 may be integrated so as to be configured by a non-portable storage medium such as a built-in hard disk drive, an SSD (Solid State Drive), or the like.

The external interface 1319 is configured of, for example, a USB input/output terminal or the like, and is connected to the printer 1334 in the event of performing printing of an image. Also, a drive 1331 is connected to the external interface 1319 according to need, on which a removable medium 1332 such as a magnetic disk, optical disc, magneto-optical disk, or the like is mounted as appropriate, and a computer program read out therefrom is installed into the FLASH ROM 1324 according to need.

Further, the external interface 1319 includes a network interface to be connected to a predetermined network such as a LAN, the Internet, or the like. An arrangement may be made wherein the controller 1321 reads out encoded data from the DRAM 1318 in accordance with an instruction from the operation unit 1322, for example, and supplies this to another device to be connected via the network from the external interface 1319. Also, an arrangement may be made wherein the controller 1321 obtains via the external interface 1319 the encoded data or image data supplied from another device via the network, and holds this in the DRAM 1318 or supplies this to the image signal processing unit 1314.

The camera 1300 thus configured uses the decoding device described above with reference to FIG. 5, FIG. 12, FIG. 16, or FIG. 21 as the decoder 1315. That is to say, in the same way as with these decoding devices, the decoder 1315 selects and decodes the encoded data of image data to be displayed as a 2D image based on a view switching flag, or decodes basic encoded data encoded from basic image data to be used for 2D image display, which the encoding device generated while switching images based on specification by a view switching flag. Accordingly, the decoder 1315 enables an image that the producer of a content made up of multiple viewpoints of image data intends to be displayed.

Accordingly, the camera 1300 enables, for example, at the time of reading out the image data generated at the CCD/CMOS 1312, or the encoded data of the video data from the DRAM 1318 or recording medium 1333, or at the time of obtaining the encoded data of video data via the network, an image that the producer of a content made up of multiple viewpoints of image data intends to be displayed.

Also, the camera 1300 uses the encoding device described above with reference to FIG. 1, FIG. 9, FIG. 14, or FIG. 18 as the encoder 1341. The encoder 1341 encodes, in the same way as with the cases of these encoding devices, each of multiple viewpoints of image data, and multiplexes the encoded data thereof with a view switching flag. Thus, the encoder 1341 allows, for example, the decoder side to display an image that the producer of the content intends using the view switching flag.

Accordingly, the camera 1300 allows, for example, at the time of recording encoded data in the DRAM 1318 or recording medium 1333, or at the time of providing encoded data to another device, the decoder side to display an image that the producer of the content intends using the view switching flag.

Note that the decoding method of the above decoding device may be applied to the decoding processing that the controller 1321 performs. Similarly, the encoding method of the above encoding device may be applied to the encoding processing that the controller 1321 performs.

Also, image data that the camera 1300 images may be a moving image, or may be a still image.

It goes without saying that the above encoding device and decoding device may be applied to a device or system other than the above devices.

Extended Macro Block

Figure 28:
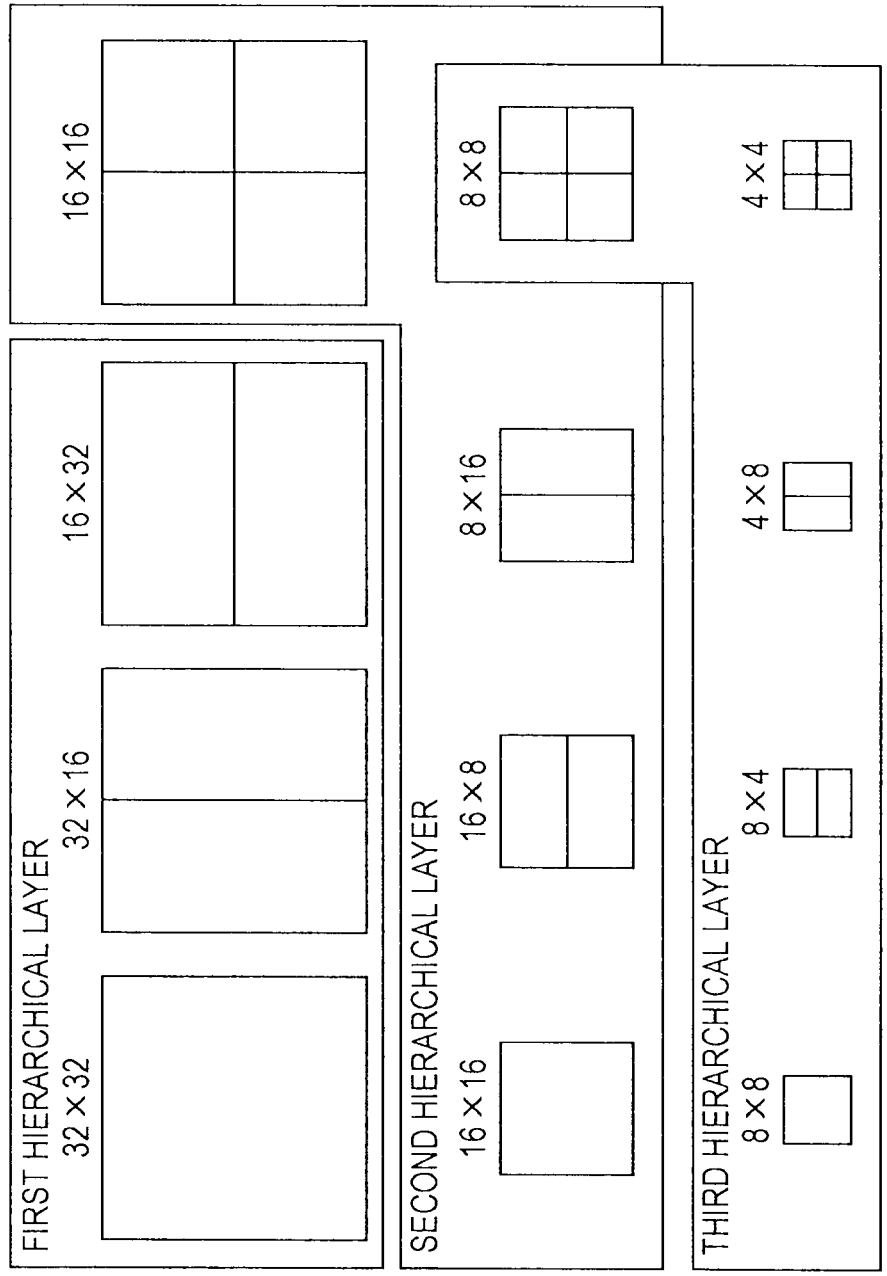
FIG. 28 is a diagram illustrating an example of a macro block size.

Also, the size of a macro block is arbitrary. The present invention may be applied to, for example, all sizes of macro block as illustrated in FIG. 28. For example, the present invention may be applied to not only a macro block such as usual 16×16 pixels but also a macro block that is extended (extended macro block) such as 32×32 pixels.

In FIG. 28, the upper stage sequentially illustrates macro blocks made up of 32×32 pixels divided into blocks (partitions) of 32×32 pixels, 32×16 pixels, 16×32 pixels, and 16×16 pixels from the left. Also, the middle stage sequentially illustrates macro blocks made up of 16×16 pixels divided into blocks (partitions) of 16×16 pixels, 16×8 pixels, 8×16 pixels, and 8×8 pixels from the left. Further, the lower stage sequentially illustrates macro blocks made up of 8×8 pixels divided into blocks (partitions) of 8×8 pixels, 8×4 pixels, 4×8 pixels, and 4×4 pixels from the left.

That is to say, with regard to the macro block of 32×32 pixels, processing in the blocks of 32×32 pixels, 32×16 pixels, 16×32 pixels, and 16×16 pixels illustrated in the upper stage is available.

With regard to the block of 16×16 pixels illustrated on the right side of the upper stage, in the same way as with the H.264/AVC system, the processing in the blocks of 16×16 pixels, 16×8 pixels, 8×16 pixels, and 8×8 pixels illustrated in the middle stage is available.

With regard to the block of 8×8 pixels illustrated on the right side of the middle stage, in the same way as with the H.264/AVC system, the processing in the blocks of 8×8 pixels, 8×4 pixels, 4×8 pixels, and 4×4 pixels illustrated in the lower stage is available.

These blocks can be classified into the following three hierarchies. Specifically, the blocks of 32×32 pixels, 32×16 pixels, and 16×32 pixels illustrated in the upper stage in FIG. 28 will be referred to as a first hierarchy. The block of 16×16 pixels illustrated on the right side of the upper stage, and the blocks of 16×16 pixels, 16×8 pixels, and 8×16 pixels illustrated in the middle stage will be referred to as a second hierarchy. The block of 8×8 pixels illustrated on the right side of the middle stage, and the blocks of 8×8 pixels, 8×4 pixels, 4×8, and 4×4 pixels illustrated in the lower stage will be referred to as a third hierarchy.

Such a hierarchical configuration is employed, whereby a greater block can be defined as a superset thereof regarding equal to or lower than a block of 16×16 pixels while maintaining compatibility with the H.264/AVC system.

For example, the encoding device and decoding device to which the present invention has been applied may calculate a filter coefficient for each hierarchy. Also, for example, the encoding device and decoding device to which the present invention has been applied may set a filter coefficient corresponding to the first hierarchy of which the block size is greater than the block size of the second hierarchy, as the second hierarchy. Further, for example, the encoding device and decoding device to which the present invention has been applied may set a filter coefficient as to the past same hierarchy.

Like the first hierarchy and the second hierarchy, a macro block where encoding is performed using a relatively large block size relatively excludes high-frequency components. On the other hand, like the third hierarchy, a macro block where encoding is performed using a relatively small block size is thought to relatively include high-frequency components.

Therefore, separately calculating a filter coefficient according to each hierarchy having a different block size enables improvement in encoding performance adapted to a local property that an image has, to be realized.

Note that the number of filter taps may differ for each hierarchy.

REFERENCE SIGNS LIST $11_1$ through $11_N$ encoding unit, 12 flag setting unit, 13 generating unit, 21 A/D conversion unit, 22 image sorting buffer, 23 computing unit, 24 orthogonal transform unit, 25 quantization unit, 26 lossless encoding unit, 27 accumulating buffer, 28 rate control unit, 29 inverse quantization unit, 30 inverse orthogonal transform unit, 31 computing unit, 32 frame memory, 33 intra prediction unit, motion prediction/motion compensation unit, 41 extraction unit, $42_1$ through $42_N$ decoding unit, 43 stereoscopic vision image transform unit, 44 selecting unit, decoding unit, 51 accumulating buffer, 52 lossless-code decoding unit, 53 inverse quantization unit, 54 inverse orthogonal transform unit, 55 computing unit, 56 frame memory, 57 intra prediction unit, 58 motion prediction/motion compensation unit, 59 image sorting buffer, 60 D/A conversion unit, 71 switching unit, 81 restoration unit, 101 bus, 102 CPU, 103 ROM, 104 RAM, 105 hard disk, 106 output unit, 107 input unit, 108 communication unit, 109 drive, 110 input/output interface, 111 removable recording medium

The invention claimed is:

1. An image processing device comprising:
   circuitry configured to:
   set a flag to specify an image data from N viewpoints of image data, the image data used to display a 2D image;
   transform, when the flag specifies the image data to display the 2D image, the N viewpoints of image data into one piece of basic image data and N−1 pieces of additional image data by switching one viewpoint of the image data of the N viewpoints of image data with another viewpoint of the N viewpoints of image data; and transmit the one piece of basic image data the N−1 pieces of additional image data and the flag, wherein N is more than one, and the one piece of basic image data is image data used to display the 2D image.

2. The image processing device according to claim 1, wherein the circuitry is further configured to encode the N viewpoints of image data to generate a bit stream.

3. The image processing device according to claim 1, wherein each viewpoint of the N viewpoints of image data includes one or more consecutive pictures, and the circuitry is further configured to set the flag for each of the one or more consecutive pictures.

4. The image processing device according to claim 1, wherein the N viewpoints of image data include viewpoint image data for a left eye of an observer and viewpoint image data for a right eye of the observer.

5. The image processing device according to claim 2, wherein the circuitry is further configured to:

attach the bit stream to the flag; and transmit the connected bit stream and flag.

6. An image processing method comprising:

setting, by circuitry, a flag to specify an image data from N viewpoints of image data, the image data used to display a 2D image;

transforming, by the circuitry, when the flag specifies the image data to display the 2D image, the N viewpoints of image data into one piece of basic image data and N−1 pieces of additional image data by switching one viewpoint of the image data of the N viewpoints of image data with another viewpoint of the N viewpoints of image data; and transmitting, by the circuitry, the one piece of basic image data, N−1 pieces of additional image data and the flag, wherein N is more than one, and the one piece of basic image data is image data used to display the 2D image.

7. An image processing device comprising:

circuitry configured to:

receive a flag, one piece of basic image data and N−1 pieces of additional image data, the flag specifying an image data from N viewpoints of image data used to display a 2D image, the one piece of basic image data being image data used to display the 2D image, and the one piece of basic image data and the N−1 pieces of additional image data obtained by switching one viewpoint of the image data of the N viewpoints of image data with another viewpoint of the image data of the N viewpoints of image data; and restore the one piece of basic image data and the N−1 pieces of additional image data to N viewpoints of image data after reception of the flag, wherein N is more than one.

8. The image processing device according to claim 7, wherein the circuitry is further configured to transform the N viewpoints of image data into stereoscopic vision image data for stereoscopic vision.

9. An image processing method comprising:

receiving a flag, one piece of basic image data and N−1 pieces of additional image data, the flag specifying an image data from N viewpoints of image data used to display a 2D image, the one piece of basic image data being image data used to display the 2D image, and the one piece of basic image data and the N−1 pieces of additional image data obtained by switching one viewpoint of the image data of the N viewpoints of image data with another viewpoint of the image data of the N viewpoints of image data; and restoring the one piece of basic image data and the N−1 pieces of additional image data to N viewpoints of image data after reception of the flag, wherein N is more than one.

10. An image processing device comprising:

circuitry configured to:

set a flag including a preset value to specify an image data from N viewpoints of image data, the image data used to display a 2D image; and transmit a bit stream and the flag, the bit stream obtained by encoding the N viewpoints of image data, wherein N is more than one.

11. The image processing device according to claim 10, wherein the circuitry is configured to:

attach the bit stream and the flag; and transmit the connected bit stream and flag.

12. The image processing device according to claim 10, wherein each viewpoint of the N viewpoints of image data includes one or more consecutive pictures, and the circuitry is configured to set the flag for each of the one or more consecutive pictures.

13. The image processing device according to claim 10, wherein the N viewpoints of image data include viewpoint image data for a left eye of an observer and viewpoint image data for a right eye of the observer.

14. The image processing device according to claim 10, wherein the circuitry is further configured to encode the N viewpoints of image data to generate the bit stream.

15. An image processing method comprising:

setting, by circuitry, a flag including a preset value to specify an image data from N viewpoints of image data, the image data used to display a 2D image; and transmitting, by the circuitry, a bit stream and a flag, the bit stream obtained by encoding the N viewpoints of image data, wherein N is more than one.

16. An image processing device comprising:

circuitry configured to:

receive a bit stream and a flag, the bit stream obtained by encoding N viewpoints of image data and the flag including a preset value to specify an image data used to display a 2D image from the N viewpoints of image data; and select the image data used to display the 2D image from the N viewpoints of image data included in the bit stream after reception of the flag, wherein N is more than one.

17. The image processing device according to claim 16, wherein the bit stream and the flag are connected.

18. The image processing device according to claim 15, wherein the circuitry is further configured to decode the selected image data.

19. An image processing method comprising:

receiving, by circuitry, a bit stream and a flag, the bit stream obtained by encoding N viewpoints of image data and the flag including a preset value to specify an image data used to display a 2D image from the N viewpoints of image data; and selecting, by the circuitry, the image data used to display the 2D image from the N viewpoints of image data included in the bit stream after reception of the flag, wherein N is more than one.

20. The image processing device according to claim 4, wherein the one piece of basic image data is a viewpoint image data for one of the left eye and the right eye of the observer.

\* \* \* \* \*